US009064331B2

(12) United States Patent
Yamashita et al.

(10) Patent No.: US 9,064,331 B2
(45) Date of Patent: *Jun. 23, 2015

(54) THREE-DIMENSIONAL IMAGE PROCESSING APPARATUS, THREE-DIMENSIONAL IMAGE PROCESSING METHOD, AND PROGRAM

(71) Applicant: Panasonic Intellectual Property Management Co., Ltd., Osaka-shi, Osaka (JP)

(72) Inventors: Haruo Yamashita, Osaka (JP); Takeshi Ito, Osaka (JP); Hiromichi Ono, Hyogo (JP); Yasuhiro Kuwahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,798

(22) Filed: Jun. 28, 2013

(65) Prior Publication Data

US 2013/0294683 A1 Nov. 7, 2013

Related U.S. Application Data

(63) Continuation-in-part of application No. PCT/JP2011/006202, filed on Nov. 7, 2011.

(30) Foreign Application Priority Data

Jan. 13, 2011 (JP) ................................ 2011-005295

(51) Int. Cl.
| | |
|---|---|
| G06K 9/00 | (2006.01) |
| G06T 15/00 | (2011.01) |
| H04N 13/00 | (2006.01) |
| G06T 5/00 | (2006.01) |
| G06T 5/50 | (2006.01) |
| H04N 5/228 | (2006.01) |

(52) U.S. Cl.
CPC ............ *G06T 15/00* (2013.01); *H04N 13/0018* (2013.01); *G06T 5/008* (2013.01); *G06T 5/50* (2013.01); *G06T 2207/10012* (2013.01); *G06T 2207/20012* (2013.01)

(58) Field of Classification Search
USPC ......... 382/100, 103, 106–107, 154, 162, 168, 382/173, 181, 194, 199, 219, 232, 254, 260, 382/274–276, 285, 291, 305, 312; 348/47, 348/252, 49, 208.13
See application file for complete search history.

(56) References Cited

U.S. PATENT DOCUMENTS

| 6,445,833 B1 * | 9/2002 | Murata et al. ................. 382/285 |
| 2001/0033327 A1 * | 10/2001 | Uomori et al. .................. 348/47 |

(Continued)

FOREIGN PATENT DOCUMENTS

| JP | H10-051811 A | 2/1998 |
| JP | 3157384 B2 | 4/2001 |

(Continued)

OTHER PUBLICATIONS

International Search Report for corresponding International Application No. PCT/JP2011/006202 mailed Jan. 24, 2012.

*Primary Examiner* — Seyed Azarian
(74) *Attorney, Agent, or Firm* — Shinjyu Global IP

(57) ABSTRACT

A three-dimensional image processing device for performing image correction processing on a three-dimensionally-viewed image includes a conversion unit and a composition unit. The conversion unit generates a converted image by performing tone conversion on a pixel value in an object included in the three-dimensionally-viewed image based on a relationship between a pixel value of a pixel of interest that is a processing target and a pixel value of a peripheral pixel of the pixel of interest. The composition unit synthesizes an n-th pixel in a first viewpoint image included in the three-dimensionally-viewed image and a corresponding pixel in a second viewpoint image included in the three-dimensionally-viewed image with a distribution ratio that is based on a subject distance of the n-th pixel. The corresponding pixel is located in the same spatial location as the n-th pixel.

15 Claims, 34 Drawing Sheets

(56) References Cited

U.S. PATENT DOCUMENTS

2012/0038800 A1* 2/2012 Jang et al. ..................... 348/252
2013/0195349 A1* 8/2013 Yamashita et al. ............. 382/154
2014/0232833 A1* 8/2014 Mizuta ............................ 348/49

FOREIGN PATENT DOCUMENTS

| JP | 2002-329198 A | 11/2002 |
| JP | 2005-026800 A | 1/2005 |
| JP | 2009-053748 A | 3/2009 |

* cited by examiner

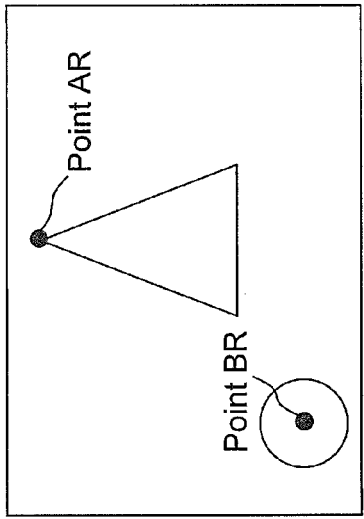
FIG. 6B
R image
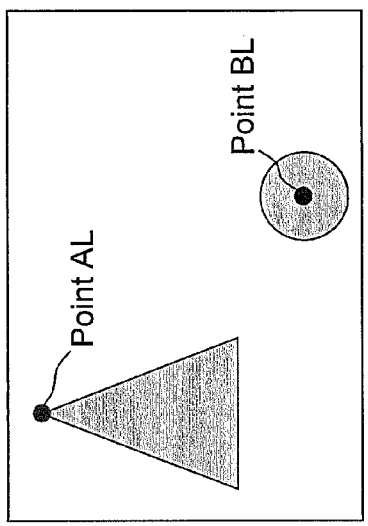
FIG. 6A
L image
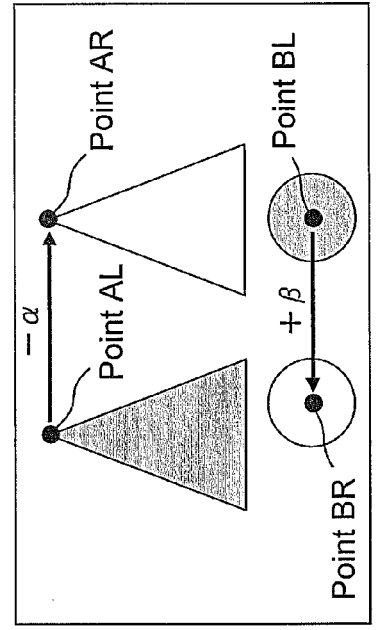
FIG. 6C

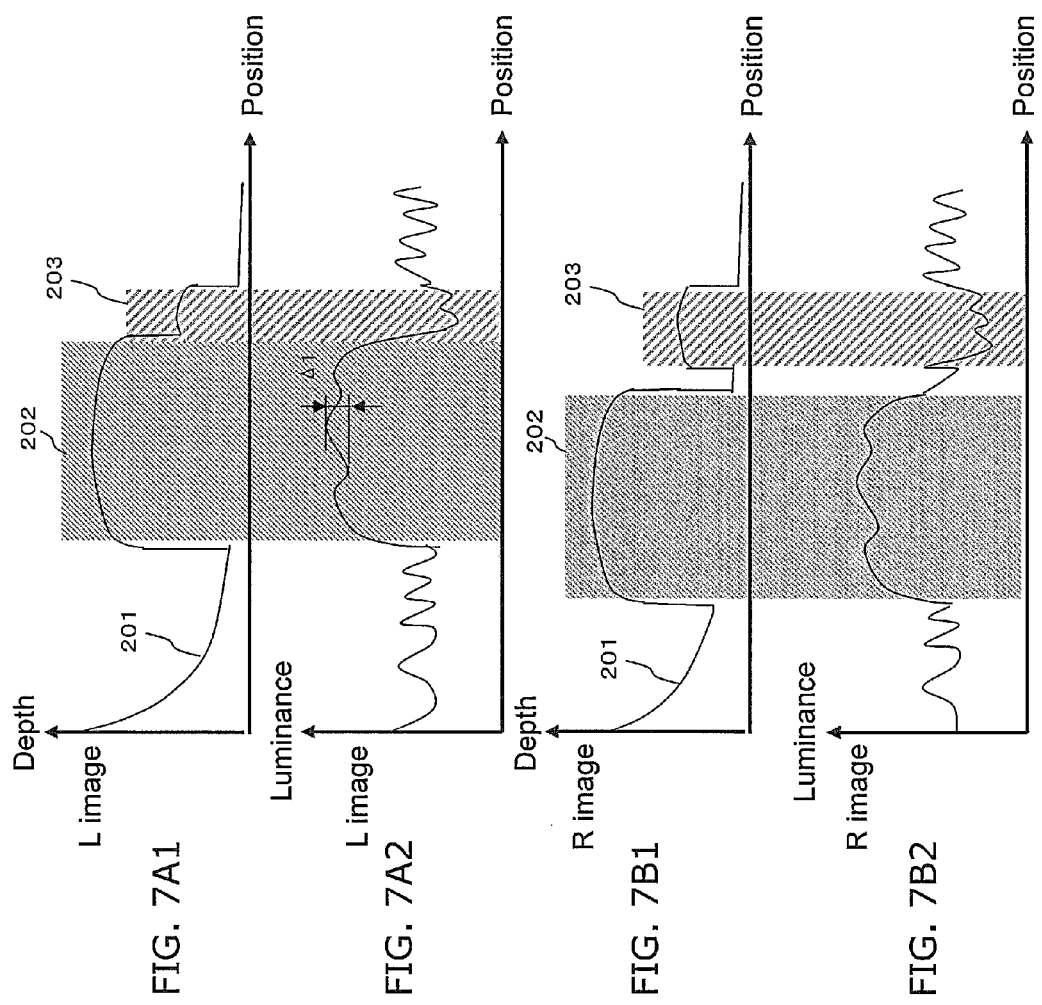

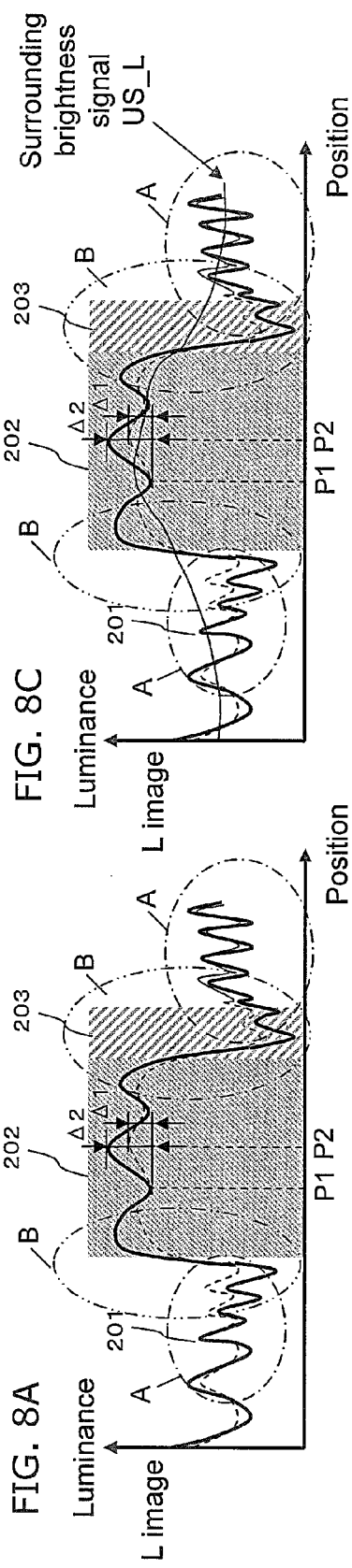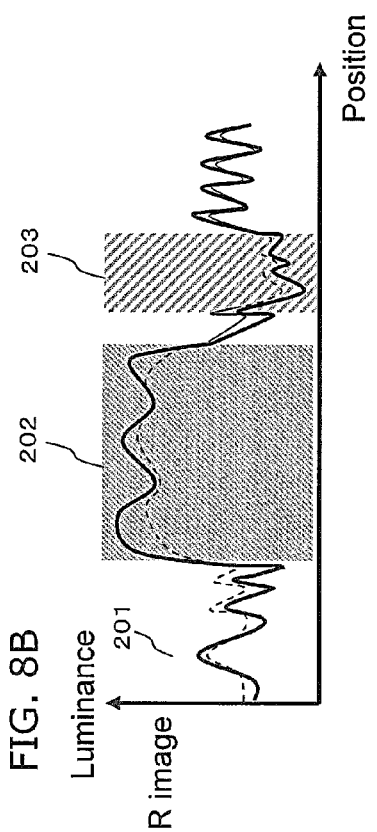

FIG. 12A1 L image
FIG. 12A2 L image
FIG. 12B1 R image
FIG. 12B2 R image

THREE-DIMENSIONAL IMAGE PROCESSING APPARATUS, THREE-DIMENSIONAL IMAGE PROCESSING METHOD, AND PROGRAM

CROSS-REFERENCE TO RELATED APPLICATIONS

This application is a continuation of PCT Application No. PCT/JP2011/006202 filed on Nov. 7, 2011 which claims priority to Japanese Patent Application No. 2011-005295 filed on Jan. 13, 2011. The entire disclosures of PCT Application No. PCT/JP2011/006202 and Japanese Patent Application No. 2011-005295 are hereby incorporated herein by reference.

BACKGROUND

1. Field of the Invention

The present invention relates to technology for raising the quality of three-dimensional images (three-dimensional stereoscopic images), and also relates to technology that is applicable to a wide range of devices that handle three-dimensional images (three-dimensional video), such as a camera (imaging device) that performs three-dimensional imaging, a display device that displays three-dimensional images (three-dimensional video), and an image processing device that processes three-dimensional images (three-dimensional video).

2. Description of the Related Art

There are known to be three-dimensional imaging devices that capture three-dimensional images (left eye images and right eye images) in a state in which binocular disparity exists in order to reproduce three-dimensional images by displaying three-dimensional images (left eye images and right eye images) with a display device that can project images to the left and right eyes independently (hereinafter, referred to as a "three-dimensional display device").

In three-dimensional imaging, three-dimensional images (left eye images and right eye images) acquired in a state in which the far scene (subject in the far scene) and the near scene (subject in the near scene) have a high degree of disparity are images for which three-dimensional viewing is difficult since the fusion limit in human three-dimensional vision is exceeded, or are images that cause the person viewing them to feel fatigued (fatiguing images). In order to avoid the generation of such poor three-dimensional images, there is technology for obtaining favorable three-dimensional images by performing disparity adjustment and stereo base adjustment (hereinafter, referred to as "SB adjustment"), and such technology is widely used in professional three-dimensional imaging for movies and the like.

Regarding disparity adjustment, with technology used mainly in the case where the far scene (subject in the far scene) exceeds the fusion limit, performing disparity adjustment in order to non-linearly compress the distance to the far scene (subject in the far scene) enables bringing the far scene (subject in the far scene) that was not easily viewable in three-dimensional viewing closer so as to acquire three-dimensional images that are easily viewable in three-dimensional viewing (easily three-dimensionally viewable three-dimensional images).

Also, stereo base adjustment enables reducing the dynamic range of disparity by reducing the gap between two cameras (a camera for capturing left eye images and a camera for capturing right eye images) (by reducing the stereo base (interaxial distance)). For this reason, performing three-dimensional imaging after performing stereo base adjustment as described above enables acquiring three-dimensional images in which the entirety of the image from the near scene (subject in the near scene) to the far scene (subject in the far scene) falls within the fusion area.

Also, in the case of displaying three-dimensional images with a small-sized display device as well, the far scene is compressed since the disparity of the three-dimensional images (left eye images and right eye images) is reduced. Accordingly, in this case, the three-dimensional images displayed with the small-sized display device are easily viewable three-dimensional images.

In three-dimensional imaging, taking advantage of the above-described imaging technology (disparity adjustment and stereo base adjustment) enables capturing three-dimensional images that are sufficiently easily viewable images (easily three-dimensionally viewable three-dimensional images) when three-dimensionally displayed in a predetermined display environment (e.g., see Japanese Patent No. 3157384).

However, with the above-described conventional technology, easily viewable three-dimensional images (easily three-dimensionally viewable three-dimensional images) are acquired by reducing desirable disparity (by reducing the disparity from the original value such that subjects serving as targets in three-dimensional imaging fall within the fusion area of three-dimensional vision) in consideration of the fusion limit of three-dimensional vision, and therefore such conventional technology is not desirable from the viewpoint of naturalness in three-dimensional appearance and sense of perspective in three-dimensional images. Accordingly, three-dimensional images acquired using the above-described conventional technology (technology using disparity adjustment and stereo base adjustment) have a problem related to three-dimensional image quality.

With technology using disparity adjustment, easily viewable (easily three-dimensionally viewable) three-dimensional images can be obtained, but since the distance to the far scene (distance from the position of the imaging device to the subject in the far scene) is non-linearly compressed, three-dimensional images that have been subjected to disparity adjustment are accompanied by a phenomenon in which the depth becomes flat (cardboard cutout effect).

Also, with technology using SB adjustment, the overall sense of perspective in acquired three-dimensional images is reduced (the distance from the nearest point (the position of the subject formed at the closest position in three-dimensional video display) to the most distant point (the position of the subject formed at the farthest position in three-dimensional video display) is reduced), thus producing a phenomenon in which the three-dimensional appearance of individual subjects is reduced.

Accordingly, when using the above-described conventional technology, in both cases the acquired three-dimensional images tend to be low-quality images that are poor in terms of three-dimensional appearance and sense of perspective.

In light of the above-described problems, an object of the present invention is to achieve a three-dimensional image processing device, a three-dimensional image processing method, and a program that obtain high-quality three-dimensional images by giving a natural three-dimensional appearance to images that were captured with little disparity and have a poor three-dimensional appearance.

SUMMARY

A first aspect of the invention is a three-dimensional image processing device for performing image correction processing on a first viewpoint image and a second viewpoint image included in a three-dimensional image obtained by a dual-lens technique or a multiple-viewpoint technique, including a depth obtainment unit and an image correction unit.

The depth obtainment unit acquires a subject distance that is distance information in a three-dimensional space with respect to a subject included in the first viewpoint image and the second viewpoint image.

The image correction unit, for each of the first viewpoint image and the second viewpoint image, performs shade or shadow enhancement processing for performing tone conversion on a pixel of interest that is a processing target, and that adjusts a degree of processing enhancement in the shade or shadow enhancement processing based on the subject distance of the pixel of interest.

With this three-dimensional image processing device, it is possible to adjust the degree of processing enhancement in the shade or shadow enhancement processing based on the subject distance of the pixel of interest. As a result, with this three-dimensional image processing device, (1) shade or shadow can be enhanced for a subject in the near scene that has a high probability of having contrast due to shade or shadow, and (2) it is possible to appropriately prevent shade or shadow from being enhanced more than necessary for a subject in the far scene that has a low possibility of having contrast due to shade or shadow.

Accordingly, with this three-dimensional image processing device, high-quality three-dimensional images are obtained by giving a natural three-dimensional appearance to an image that was captured with little disparity and is poor in terms of three-dimensional appearance.

Note that "distance information in a three-dimensional space" refers to the distance from the point (imaging point) in three-dimensional space that corresponds to the first viewpoint (e.g., the left eye viewpoint when acquiring the left eye image) or the second viewpoint (e.g., the right eye viewpoint when acquiring the right eye image) when assuming that a first viewpoint image or a second viewpoint image has been three-dimensionally captured for example, to a first pixel that is a pixel in the first viewpoint image, and to a point in three-dimensional space (imaging space when assuming that the first viewpoint image or the second viewpoint image has been three-dimensionally captured) that corresponds to a second pixel that is a pixel in the second viewpoint image that corresponds to the first pixel.

Also, the depth obtainment unit may acquire the distance information in the three-dimensional space with respect to a subject included in the first viewpoint image and the second viewpoint image from an external device.

A second aspect of the invention is the first aspect of the invention, in which for each of the first viewpoint image and the second viewpoint image, the image correction unit executes the shade or shadow enhancement processing by, based on a relationship between a pixel value of the pixel of interest that is the processing target and a representative pixel value indicating an image feature amount of a pixel value of a peripheral pixel of the pixel of interest, performing local shade or shadow enhancement processing for performing tone conversion on the pixel of interest, and adjusts the degree of processing enhancement in the shade or shadow enhancement processing based on the subject distance of the pixel of interest.

Accordingly, with this three-dimensional image processing device, it is possible to use "shade or shadow enhancement processing" as the "local shade or shadow enhancement processing", and to adjust the degree of processing enhancement in the shade or shadow enhancement processing based on the subject distance of the pixel of interest.

Note that "local shade or shadow enhancement processing" refers to processing for local adjustment of shade, shadow or the like according to an image feature amount of the pixel of interest and peripheral pixels thereof. One example of "local shade or shadow enhancement processing" is "local contrast conversion processing".

Here, "local contrast conversion processing" refers to processing for adjusting the contrast in a local area (local contrast) in an image based on the relationship between the pixel value "A" of the pixel of interest and the representative pixel value "B" of peripheral pixels thereof (e.g., the average value or weighted average value of the pixel values of the peripheral pixels). For example, in the case where the basic tone conversion characteristic of the local contrast conversion processing (tone conversion characteristic when A=B) is determined by a function F1(A), and the local contrast conversion intensity is determined by a function F2(A/B) (note that when A=B, F2(A/B)=1), the converted pixel value C obtained by the "local contrast conversion processing" is calculated according to the following.

$$C = F1(A) \times F2(A/B)$$

The following is one example.

$$F1(A) = A^\gamma$$

$$F2(A/B) = (A/B)^\alpha$$

In this case, when $\alpha+\gamma=1$, the local contrast is kept the same before and after conversion in the local contrast conversion processing, and when $\alpha+\gamma>1$, the local contrast is enhanced.

A third aspect of the invention is the first or second aspect of the invention, in which the image correction unit performs adjustment such that the degree of processing enhancement in the shade or shadow enhancement processing with respect to a pixel having a small subject distance is higher than the degree of processing enhancement in the shade or shadow enhancement processing with respect to a pixel having a large subject distance.

Accordingly, with this three-dimensional image processing device, it is possible to execute shade or shadow enhancement processing in which the degree of processing enhancement is higher for a pixel having a smaller subject distance, and therefore (1) shade or shadow can be enhanced for a subject in the near scene that has a high probability of having contrast due to shade or shadow, and (2) it is possible to appropriately prevent shade or shadow from being enhanced more than necessary for a subject in the far scene that has a low possibility of having contrast due to shade or shadow.

Accordingly, with this three-dimensional image processing device, high-quality three-dimensional images are obtained by giving a natural three-dimensional appearance to an image that was captured with little disparity and is poor in terms of three-dimensional appearance.

A fourth aspect of the invention is the third aspect of the invention, in which the image correction unit (1) subjects the pixel of interest to shade or shadow enhancement processing having a higher degree of processing enhancement the smaller the subject distance of the pixel of interest is, and (2) subjects the pixel of interest to shade or shadow enhancement processing having a lower degree of processing enhancement the larger the subject distance of the pixel of interest is.

Accordingly, with this three-dimensional image processing device, (1) shade or shadow can be enhanced for a subject in the near scene that has a high probability of having contrast due to shade or shadow, and (2) it is possible to appropriately prevent shade or shadow from being enhanced more than necessary for a subject in the far scene that has a low possibility of having contrast due to shade or shadow.

Accordingly, with this three-dimensional image processing device, high-quality three-dimensional images are obtained by giving a natural three-dimensional appearance to an image that was captured with little disparity and is poor in terms of three-dimensional appearance.

A fifth aspect of the invention is the first or second aspect of the invention, in which the image correction unit (1) subjects the pixel of interest to shade or shadow enhancement processing having a higher degree of processing enhancement the smaller a difference between the subject distance of the pixel of interest and the subject distance of the peripheral pixel of the pixel of interest is, and (2) subjects the pixel of interest to shade or shadow enhancement processing having a lower degree of processing enhancement the larger a difference between the subject distance of the pixel of interest and the subject distance of the peripheral pixel of the pixel of interest is.

Accordingly, with this three-dimensional image processing device, it is possible to perform intense shade or shadow enhancement processing in an image area having a small difference between the subject distance of the pixel of interest and the subject distance of the peripheral pixels of the pixel of interest. In other words, with this three-dimensional image processing device, it is possible to appropriately perform shade or shadow enhancement processing without being influenced by an image area that is near the pixel of interest and has a high subject distance difference.

Accordingly, with this three-dimensional image processing device, it is possible to appropriately prevent an image area in which the main subject is formed in a three-dimensional image from being subjected to the execution of shade or shadow enhancement that is influenced by the contrast of the background at a different distance (subject distance). Also, with this three-dimensional image processing device, it is possible to realize shade or shadow enhancement that is centered on contrast that is actually due to shade or shadow, and as a result, the three-dimensional images acquired by this three-dimensional image processing device are three-dimensional images in which the natural shade or shadow enhancement is realized.

A sixth aspect of the invention is the first or second aspect of the invention, in which the image correction unit performs contrast enhancement by correcting the pixel of interest so as to enhance a brightness contrast relative to an average brightness of peripheral pixels of the pixel of interest, and the average brightness of the peripheral pixels is calculated by obtaining an average of the brightness of pixels having a small depth difference with the pixel of interest.

Accordingly, with this three-dimensional image processing device, it is possible to appropriately prevent an image area in which the main subject is formed in a three-dimensional image from being subjected to the execution of shade or shadow enhancement that is influenced by the contrast of the background at a different distance (subject distance). Also, with this three-dimensional image processing device, it is possible to realize shade or shadow enhancement that is centered on contrast that is actually due to shade or shadow, and as a result, the three-dimensional images acquired by this three-dimensional image processing device are three-dimensional images in which the natural shade or shadow enhancement is realized.

A seventh aspect of the invention is the second aspect of the invention, in which the image correction unit includes a first-viewpoint-image image correction unit and a second-viewpoint-image image correction unit.

The first-viewpoint-image image correction unit includes a first viewpoint local tone conversion unit, a first viewpoint intensity generation unit, and a first viewpoint composition unit.

The second-viewpoint-image image correction unit includes a second viewpoint local tone conversion unit, a second viewpoint intensity generation unit, and a second viewpoint composition unit.

The first viewpoint local tone conversion unit performs the local shade or shadow enhancement processing on a first viewpoint image signal IS_R and acquires a first viewpoint converted image signal OS_R.

The first viewpoint intensity generation unit generates a degree of processing enhancement in the local shade or shadow enhancement processing based on a depth value acquired by the depth obtainment unit, the depth value being the subject distance of a pixel that corresponds to the first viewpoint image signal IS_R.

The first viewpoint composition unit acquires a first viewpoint output image signal Rout by compositing the first viewpoint image signal IS_R and the first viewpoint converted image signal OS_R based on the degree of processing enhancement generated by the first viewpoint intensity generation unit, the first viewpoint composition unit (1) compositing the first viewpoint image signal IS_R and the first viewpoint converted image signal OS_R such that an extent of compositing for the first viewpoint converted image signal OS_R is higher the smaller the subject distance of the pixel that corresponds to the first viewpoint image signal IS_R is, and (2) compositing the first viewpoint image signal IS_R and the first viewpoint converted image signal OS_R such that the extent of compositing for the first viewpoint converted image signal OS_R is lower the larger the subject distance of the pixel that corresponds to the first viewpoint image signal IS_R is.

The second viewpoint local tone conversion unit performs the local shade or shadow enhancement processing on a second viewpoint image signal IS_L and acquires a second viewpoint converted image signal OS_L.

The second viewpoint intensity generation unit generates a degree of processing enhancement in the local shade or shadow enhancement processing based on a depth value acquired by the depth obtainment unit, the depth value being the subject distance of a pixel that corresponds to the second viewpoint image signal IS_L.

The second viewpoint composition unit acquires a second viewpoint output image signal Lout by compositing the second viewpoint image signal IS_L and the second viewpoint converted image signal OS_L based on the degree of processing enhancement generated by the second viewpoint intensity generation unit, the second viewpoint composition unit (1) compositing the second viewpoint image signal IS_L and the second viewpoint converted image signal OS_L such that an extent of compositing for the second viewpoint converted image signal OS_L is higher the smaller the subject distance of the pixel that corresponds to the second viewpoint image signal IS_L is, and (2) compositing the second viewpoint image signal IS_L and the second viewpoint converted image signal OS_L such that the extent of compositing for the second viewpoint converted image signal OS_L is lower the larger the subject distance of the pixel that corresponds to the second viewpoint image signal IS_L is.

Accordingly, with this three-dimensional image processing device, (1) shade or shadow can be enhanced for a subject in the near scene that has a high probability of having contrast due to shade or shadow, and (2) it is possible to appropriately prevent shade or shadow from being enhanced more than necessary for a subject in the far scene that has a low possibility of having contrast due to shade or shadow.

Accordingly, with this three-dimensional image processing device, high-quality three-dimensional images are obtained by giving a natural three-dimensional appearance to an image that was captured with little disparity and is poor in terms of three-dimensional appearance.

An eighth aspect of the invention is any of the first to seventh aspects of the invention, in which the shade or shadow enhancement processing is contrast enhancement processing.

Accordingly, with this three-dimensional image processing device, (1) contrast can be enhanced for a subject in the near scene that has a high probability of having contrast due to shade or shadow, and (2) it is possible to appropriately prevent contrast from being enhanced more than necessary for a subject in the far scene that has a low possibility of having contrast due to shade or shadow.

Accordingly, with this three-dimensional image processing device, high-quality three-dimensional images are obtained by giving a natural three-dimensional appearance to an image that was captured with little disparity and is poor in terms of three-dimensional appearance.

A ninth aspect of the invention is any of the first to seventh aspects of the invention, in which the shade or shadow enhancement processing is local contrast enhancement processing by visual processing.

Accordingly, with this three-dimensional image processing device, (1) local contrast can be enhanced for a subject in the near scene that has a high probability of having contrast due to shade or shadow, and (2) it is possible to appropriately prevent local contrast from being enhanced more than necessary for a subject in the far scene that has a low possibility of having contrast due to shade or shadow.

Accordingly, with this three-dimensional image processing device, high-quality three-dimensional images are obtained by giving a natural three-dimensional appearance to an image that was captured with little disparity and is poor in terms of three-dimensional appearance.

A tenth aspect of the invention is any of the first to seventh aspects of the invention, in which the shade or shadow enhancement processing is processing for darkening shade or shadow.

Accordingly, with this three-dimensional image processing device, (1) shade or shadow can be darkened for a subject in the near scene that has a high probability of having contrast due to shade or shadow, and (2) it is possible to appropriately prevent shade or shadow from be darkened more than necessary for a subject in the far scene that has a low possibility of having contrast due to shade or shadow. In other words, with this three-dimensional image processing device, processing for darkening shade or shadow is performed, and therefore it is possible to selectively enhance a shade or shadow portion (it is possible to perform three-dimensional image processing for darkening shade or shadow).

Accordingly, with this three-dimensional image processing device, high-quality three-dimensional images are obtained by giving a natural three-dimensional appearance to an image that was captured with little disparity and is poor in terms of three-dimensional appearance.

An eleventh aspect of the invention is the tenth aspect of the invention, in which the first viewpoint local tone conversion unit includes a first viewpoint surrounding brightness detection unit and a first-viewpoint second dynamic tone correction unit, and the second viewpoint local tone conversion unit includes a second-viewpoint surrounding brightness detection unit and a second-viewpoint second dynamic tone correction unit.

The first viewpoint surrounding brightness detection unit detects a representative brightness value for a pixel of interest that is a pixel corresponding to the first viewpoint image signal IS_R and a peripheral pixel of the pixel of interest, and outputs a first viewpoint surrounding brightness signal US_R whose signal value is the detected representative brightness value.

The first-viewpoint second dynamic tone correction unit acquires a corrected first viewpoint image signal OS_R by performing dynamic tone correction processing based on the first viewpoint image signal IS_R and the first viewpoint surrounding brightness signal US_R, the dynamic tone correction processing being processing in which (1) in a case where (value of first viewpoint image signal IS_R)≤(value of first viewpoint surrounding brightness signal US_R), the corrected first viewpoint image signal OS_R is acquired by performing tone conversion processing according to a tone conversion characteristic in which, when the value of the first viewpoint image signal IS_R is fixed at a predetermined value in a predetermined input range of the first viewpoint image signal IS_R, the value of the corrected first viewpoint image signal OS_R decreases as the value of the first viewpoint surrounding brightness signal US_R increases, and (2) in a case where (value of first viewpoint image signal IS_R)>(value of first viewpoint surrounding brightness signal US_R), the corrected first viewpoint image signal OS_R is acquired by using the first viewpoint image signal IS_R as the corrected first viewpoint image signal OS_R.

The second-viewpoint surrounding brightness detection unit detects a brightness value for a pixel of interest that is a pixel corresponding to the second viewpoint image signal IS_L and a peripheral pixel of the pixel of interest, and outputs a second viewpoint surrounding brightness signal US_L whose signal value is the detected brightness value.

The second-viewpoint second dynamic tone correction unit acquires a corrected second viewpoint image signal OS_L by performing dynamic tone correction processing based on the second viewpoint image signal IS_L and the second viewpoint surrounding brightness signal US_L, the dynamic tone correction processing being processing in which (1) in a case where (value of second viewpoint image signal IS_L)≤(value of second viewpoint surrounding brightness signal US_L), the corrected second viewpoint image signal OS_L is acquired by performing tone conversion processing according to a tone conversion characteristic in which, when the value of the second viewpoint image signal IS_L is fixed at a predetermined value in a predetermined input range of the second viewpoint image signal IS_L, the value of the corrected second viewpoint image signal OS_L decreases as the value of the second viewpoint surrounding brightness signal US_L increases, and (2) in a case where (value of second viewpoint image signal IS_L)>(value of second viewpoint surrounding brightness signal US_L), the corrected second viewpoint image signal OS_L is acquired by using the second viewpoint image signal IS_L as the corrected second viewpoint image signal OS_L.

With this three-dimensional image processing device, the first-viewpoint second dynamic tone correction unit executes processing for enhancing local contrast only if (value of first viewpoint image signal IS_R)≤(value of first viewpoint surrounding brightness signal US_R) (processing with respect to the second viewpoint image is similar to the processing with respect to the first viewpoint image). In other words, with this three-dimensional image processing device, processing for enhancing local contrast is executed on pixels in a portion that is darker than its surroundings, thus making it possible to selectively enhance a shade or shadow component in an image. As a result, with this three-dimensional image processing device, it is possible to acquire three-dimensional images that more naturally reproduce a three-dimensional appearance and a sense of perspective.

A twelfth aspect of the invention is the tenth aspect of the invention, in which the first viewpoint local tone conversion unit includes a first-viewpoint second surrounding brightness detection unit and a first viewpoint dynamic tone correction unit, and the second viewpoint local tone conversion unit includes a second-viewpoint second surrounding brightness detection unit and a second viewpoint dynamic tone correction unit.

The first-viewpoint second surrounding brightness detection unit detects a representative brightness value for a pixel of interest that is a pixel corresponding to the first viewpoint image signal IS_R and a peripheral pixel of the pixel of interest, acquires a first viewpoint surrounding brightness signal US_R whose signal value is the detected representative brightness value, acquires a first viewpoint offset value ΔUS_R whose value is higher the more variation there is in the first viewpoint image signal ISR in a predetermined image area, and acquires a first viewpoint corrected surrounding brightness signal US_R' by adding the first viewpoint offset value ΔUS_R to the first viewpoint surrounding brightness signal US_R.

The first viewpoint dynamic tone correction unit acquires a corrected first viewpoint image signal OS_R by performing dynamic tone correction processing based on the first viewpoint image signal IS_R and the first viewpoint corrected surrounding brightness signal US_R', the dynamic tone correction processing being processing in which the corrected first viewpoint image signal OS_R is acquired by performing tone conversion processing according to a tone conversion characteristic in which, when the value of the first viewpoint image signal IS_R is fixed at a predetermined value in a predetermined input range of the first viewpoint image signal IS_R, the value of the corrected first viewpoint image signal OS_R decreases as the value of the first viewpoint corrected surrounding brightness signal US_R' increases.

The second-viewpoint second surrounding brightness detection unit detects a brightness value for a pixel of interest that is a pixel corresponding to the second viewpoint image signal IS_L and a peripheral pixel of the pixel of interest, acquires a second viewpoint surrounding brightness signal US_L whose signal value is the detected brightness value, acquires a second viewpoint offset value ΔUS_L whose value is higher the more variation there is in the second viewpoint image signal IS_L in a predetermined image area, and acquires a second viewpoint corrected surrounding brightness signal US_L' by adding the second viewpoint offset value ΔUS_L to the second viewpoint surrounding brightness signal US_L.

The second viewpoint dynamic tone correction unit acquires a corrected second viewpoint image signal OS_L by performing dynamic tone correction processing based on the second viewpoint image signal IS_L and the second viewpoint corrected surrounding brightness signal US_L', the dynamic tone correction processing being processing in which the corrected second viewpoint image signal OS_L is acquired by performing tone conversion processing according to a tone conversion characteristic in which, when the value of the second viewpoint image signal IS_L is fixed at a predetermined value in a predetermined input range of the second viewpoint image signal IS_L, the value of the corrected second viewpoint image signal OS_L decreases as the value of the second viewpoint corrected surrounding brightness signal US_L' increases.

With this three-dimensional image processing device, the first-viewpoint second surrounding brightness detection unit calculates the right eye offset value ΔUS_R whose value is higher the more variation there is in the first viewpoint image signal IS_R, and acquires the first viewpoint corrected surrounding brightness signal US_R' by adding the first viewpoint offset value ΔUS_R to the first viewpoint surrounding brightness signal US_R. Then, with this three-dimensional image processing device, tone conversion processing is executed according to the tone conversion characteristics shown in FIG. 4, for example, with use of the first viewpoint corrected surrounding brightness signal US_R' instead of the surrounding brightness signal US_R. As a result, with this three-dimensional image processing device, more intense local contrast enhancement processing is executed on a pixel that is darker than its surroundings. In other words, with this three-dimensional image processing device, processing for enhancing local contrast is executed on pixels in a portion that is darker than its surroundings, thus making it possible to selectively enhance a shade or shadow component in an image. As a result, with this three-dimensional image processing device, it is possible to acquire three-dimensional images that more naturally reproduce a three-dimensional appearance and a sense of perspective (processing with respect to second viewpoint is similar to processing with respect to first viewpoint).

Note that regarding "whose value is higher the more variation there is in the first viewpoint image signal IS_R", variation in the signal value of the first viewpoint image signal IS_R in a predetermined range is determined according to, for example, the extent to which the signal value varies relative to the average value in the predetermined range, and for example, the higher the variance value or the standard deviation value of the signal value of the first viewpoint image signal IS_R is in the predetermined range, "the more variation there is in the first viewpoint image signal IS_R".

A thirteenth aspect of the invention is the tenth aspect of the invention, in which the first viewpoint local tone conversion unit includes a first-viewpoint second surrounding brightness detection unit and a first viewpoint coefficient calculation processing unit, and the second viewpoint local tone conversion unit includes a second-viewpoint second surrounding brightness detection unit and a second viewpoint coefficient calculation processing unit.

The first-viewpoint second surrounding brightness detection unit detects a brightness value for a pixel of interest that is a pixel corresponding to the first viewpoint image signal IS_R and a peripheral pixel of the pixel of interest, acquires a first viewpoint surrounding brightness signal US_R whose signal value is the detected brightness value, acquires a first viewpoint offset value ΔUS_R whose value is higher the more variation there is in the first viewpoint image signal IS_R in a predetermined image area, and acquires a first viewpoint corrected surrounding brightness signal US_R' by adding the first viewpoint offset value ΔUS_R to the first viewpoint surrounding brightness signal US_R.

The first viewpoint coefficient calculation processing unit determines a coefficient k whose value is lower the higher the value of a difference ((IS_R)−(US_R')) is between the first viewpoint image signal IS_R and the first viewpoint corrected surrounding brightness signal US_R', and acquires a corrected first viewpoint image signal OS_R using the determined coefficient k according to the following $$OS\_R=IS\_R+k\times((IS\_R)-(US\_R')).$$

The second-viewpoint second surrounding brightness detection unit detects a representative brightness value for a pixel of interest that is a pixel corresponding to the second viewpoint image signal IS_L and a peripheral pixel of the pixel of interest, acquires a second viewpoint surrounding brightness signal US_L whose signal value is the detected representative brightness value, acquires a second viewpoint offset value ΔUS_L whose value is higher the more variation there is in the second viewpoint image signal IS_L in a predetermined image area, and acquires a second viewpoint corrected surrounding brightness signal US_L' by adding the second viewpoint offset value ΔUS_L to the second viewpoint surrounding brightness signal US_L.

The second viewpoint coefficient calculation processing unit determines a coefficient k whose value is lower the higher the value of a difference ((IS_L)-(US_L')) is between the second viewpoint image signal IS_L and the second viewpoint corrected surrounding brightness signal US_L', and acquires a corrected second viewpoint image signal OS_L using the determined coefficient k according to the following $$OS\_L=IS\_L+k\times((IS\_L)-(US\_L')).$$

With this three-dimensional image processing device, the first viewpoint coefficient calculation processing unit determines the coefficient k whose value is lower the higher the value of a difference ((IS_R)-(US_R')) is between the first viewpoint image signal IS_R and the first viewpoint corrected surrounding brightness signal US_R', and acquires the corrected first viewpoint image signal OS_R using the determined coefficient k according to the following.

$$OS\_R=IS\_R+k\times((IS\_R)-(US\_R'))$$

Accordingly, with this three-dimensional image processing device, more intense local contrast enhancement processing is executed on a pixel that is darker than its surroundings (the same follows for processing with respect to second viewpoint). In other words, with this three-dimensional image processing device, processing is executed so as to increase the extent of unsharp masking intensity for pixels in a portion that is darker than its surroundings, thus making it possible to selectively enhance a shade or shadow component in an image. As a result, with this three-dimensional image processing device, it is possible to acquire three-dimensional images that more naturally reproduce a three-dimensional appearance and a sense of perspective.

Note that "determines the coefficient k whose value is lower the higher the value of a difference ((IS_R)-(US_R')) is" (the same follows for the difference ((IS_L)-(US_L'))), includes not only the case where the coefficient k is determined by the solid line shown in FIG. 19, but also the case where the coefficient k is determined by the broken line shown in FIG. 19. In other words, it includes not only the case where the relationship between the coefficient k and the difference value ((IS_R)-(US_R')) is monotonic, but also the case where the relationship changes in steps (e.g., the case of the broken line in FIG. 19).

A fourteenth aspect of the invention is the tenth aspect of the invention, in which the first viewpoint local tone conversion unit includes a first-viewpoint second surrounding brightness detection unit and a first viewpoint coefficient calculation processing unit, and the second viewpoint local tone conversion unit includes a second-viewpoint second surrounding brightness detection unit and a second viewpoint coefficient calculation processing unit.

The first-viewpoint second surrounding brightness detection unit detects a representative brightness value for a pixel of interest that is a pixel corresponding to the first viewpoint image signal IS_R and a peripheral pixel of the pixel of interest, acquires a first viewpoint surrounding brightness signal US_R whose signal value is the detected representative brightness value, acquires a first viewpoint offset value ΔUS_R whose value is higher the more variation there is in the first viewpoint image signal IS_R in a predetermined image area, and acquires a first viewpoint corrected surrounding brightness signal US_R' by adding the first viewpoint offset value ΔUS_R to the first viewpoint surrounding brightness signal US_R.

The first viewpoint coefficient calculation processing unit determines a coefficient k whose value is lower the higher the value of a difference ((IS_R)-(US_R')) is between the first viewpoint image signal IS_R and the first viewpoint corrected surrounding brightness signal US_R', sets a coefficient p (p:0≤p≤1), acquires a signal LPF ((k+p)×(IS_R−US_R')) by performing band limitation processing on a signal acquired according to the following $$(k+p)\times(IS\_R-US\_R'), \text{ and}$$

acquires a corrected first viewpoint image signal OS_R using the acquired signal LPF ((k+p)×(IS_R−US_R')) according to the following $$OS\_R=IS\_R-p\times(IS\_R-US\_R')+LPF((k+p)\times(IS\_R-US\_R')).$$

The second-viewpoint second surrounding brightness detection unit detects a brightness value for a pixel of interest that is a pixel corresponding to the second viewpoint image signal IS_L and a peripheral pixel of the pixel of interest, acquires a second viewpoint surrounding brightness signal US_L whose signal value is the detected brightness value, acquires a second viewpoint offset value ΔUS_L whose value is higher the more variation there is in the second viewpoint image signal IS_L in a predetermined image area, and acquires a second viewpoint corrected surrounding brightness signal US_L' by adding the second viewpoint offset value ΔUS_L to the second viewpoint surrounding brightness signal US_L.

The second viewpoint coefficient calculation processing unit determines a coefficient k whose value is lower the higher the value of a difference ((IS_L)-(US_L')) is between the second viewpoint image signal IS_L and the second viewpoint corrected surrounding brightness signal US_L', sets a coefficient p (p:0≤p≤1), acquires a signal LPF ((k+p)×(IS_L−US_L')) by performing band limitation processing on a signal acquired according to the following $$(k+p)\times(IS\_L-US\_L'), \text{ and}$$

acquires a corrected second viewpoint image signal OS_L using the acquired signal LPF ((k+p)×(IS_L−US_L')) according to the following $$OS\_L=IS\_L-p\times(IS\_L-US\_L')+LPF((k+p)\times(IS\_L-US\_L')).$$

With this three-dimensional image processing device, the first viewpoint coefficient calculation processing unit acquires the corrected first viewpoint image signal OS_R by performing processing corresponding to the following.

$$OS\_R=IS\_R-p\times(IS\_R-US\_R')+LPF((k+p)\times(IS\_R-US\_R'))$$

Accordingly, with this three-dimensional image processing device, the extent of blurring of (the extent of band limitation processing on) the shade or shadow component included in the original image and the shade or shadow component to be added can be adjusted using the coefficient p (processing with respect to second viewpoint is similar to processing with respect to first viewpoint). Accordingly, this three-dimensional image processing device enables selectively enhancing a shade or shadow portion while appropriately blurring the shade or shadow portion. As a result, with this three-dimensional image processing device, it is possible to acquire three-dimensional images that more naturally reproduce a three-dimensional appearance and a sense of perspective.

A fifteenth aspect of the invention is the second aspect of the invention, in which the image correction unit includes a first-viewpoint-image image correction unit and a second-viewpoint-image image correction unit.

The first-viewpoint-image image correction unit includes a first viewpoint depth surrounding brightness detection unit and a first viewpoint dynamic tone correction unit.

The second-viewpoint-image image correction unit includes a second viewpoint depth surrounding brightness detection unit and a second viewpoint dynamic tone correction unit.

The first viewpoint depth surrounding brightness detection unit acquires a first viewpoint surrounding brightness signal US_R of a pixel of interest that is a pixel corresponding to the first viewpoint image signal IS_R by calculating a weighted average value based on a difference between a subject distance of the pixel of interest and a subject distance of a peripheral pixel of the pixel of interest that were acquired by the depth obtainment unit, the weighting being higher the lower a difference is between the subject distance of the pixel of interest and the subject distance of the peripheral pixel of the pixel of interest when calculating the weighted average value.

The first viewpoint dynamic tone correction unit acquires a first viewpoint output image signal Rout by performing local shade or shadow enhancement processing for performing tone conversion on the pixel of interest based on a relationship between the first viewpoint image signal IS_R and the first viewpoint surrounding brightness signal US_R.

The second viewpoint depth surrounding brightness detection unit acquires a second viewpoint surrounding brightness signal US_L of a pixel of interest that is a pixel corresponding to the second viewpoint image signal IS_L by calculating a weighted average value based on a difference between a subject distance of the pixel of interest and a subject distance of a peripheral pixel of the pixel of interest that were acquired by the depth obtainment unit, the weighting being higher the lower a difference is between the subject distance of the pixel of interest and the subject distance of the peripheral pixel of the pixel of interest when calculating the weighted average value.

The second viewpoint dynamic tone correction unit acquires a second viewpoint output image signal Lout by performing local shade or shadow enhancement processing for performing tone conversion on the pixel of interest based on a relationship between the second viewpoint image signal IS_L and the second viewpoint surrounding brightness signal US_L.

The shade or shadow enhancement processing is any one of (1) contrast enhancement processing, (2) local contrast enhancement processing by visual processing, and (3) processing for darkening shade or shadow.

Accordingly, with this three-dimensional image processing device, it is possible to perform intense shade or shadow enhancement processing in an image area having a small difference between the subject distance of the pixel of interest and the subject distance of the peripheral pixels of the pixel of interest. In other words, with this three-dimensional image processing device, it is possible to appropriately perform shade or shadow enhancement processing without being influenced by an image area that is near the pixel of interest and has a high subject distance difference.

Accordingly, with this three-dimensional image processing device, it is possible to appropriately prevent an image area in which the main subject is formed in a three-dimensional image from being subjected to the execution of shade or shadow enhancement that is influenced by the contrast of the background at a different distance (subject distance). Also, with this three-dimensional image processing device, it is possible to realize shade or shadow enhancement that is centered on contrast that is actually due to shade or shadow, and as a result, the three-dimensional images acquired by this three-dimensional image processing device are three-dimensional images in which the natural shade or shadow enhancement is realized.

A sixteenth aspect of the invention is the second aspect of the invention, in which the image correction unit includes a first-viewpoint-image image correction unit and a second-viewpoint-image image correction unit.

The first-viewpoint-image image correction unit includes a first viewpoint depth surrounding brightness detection unit and a first-viewpoint second dynamic tone correction unit. The second-viewpoint-image image correction unit includes a second viewpoint depth surrounding brightness detection unit and a second-viewpoint second dynamic tone correction unit.

The first viewpoint depth surrounding brightness detection unit acquires a first viewpoint surrounding brightness signal US_R of a pixel of interest that is a pixel corresponding to the first viewpoint image signal IS_R by calculating a weighted average value based on a difference between a subject distance of the pixel of interest and a subject distance of a peripheral pixel of the pixel of interest that were acquired by the depth obtainment unit, the weighting being higher the lower a difference is between the subject distance of the pixel of interest and the subject distance of the peripheral pixel of the pixel of interest when calculating the weighted average value.

The first-viewpoint second dynamic tone correction unit acquires a corrected first viewpoint image signal OS_R by performing dynamic tone correction processing on the first viewpoint image signal IS_R and the first viewpoint surrounding brightness signal US_R, the dynamic tone correction processing being processing in which (1) in a case where (value of first viewpoint image signal IS_R)≤(value of first viewpoint surrounding brightness signal US_R), the corrected first viewpoint image signal OS_R is acquired by performing tone conversion processing according to a tone conversion characteristic in which, when the value of the first viewpoint image signal IS_R is fixed at a predetermined value in a predetermined input range of the first viewpoint image signal IS_R, the value of the corrected first viewpoint image signal OS_R decreases as the value of the first viewpoint surrounding brightness signal US_R increases, and (2) in a case where (value of first viewpoint image signal IS_R)>(value of first viewpoint surrounding brightness signal US_R), the corrected first viewpoint image signal OS_R is acquired by using the first viewpoint image signal IS_R as the corrected first viewpoint image signal OS_R.

The second viewpoint depth surrounding brightness detection unit acquires a second viewpoint surrounding brightness signal US_L of a pixel of interest that is a pixel corresponding to the second viewpoint image signal IS_L by calculating a weighted average value based on a difference between a subject distance of the pixel of interest and a subject distance of a peripheral pixel of the pixel of interest that were acquired by the depth obtainment unit, the weighting being higher the lower a difference is between the subject distance of the pixel of interest and the subject distance of the peripheral pixel of the pixel of interest when calculating the weighted average value.

The second-viewpoint second dynamic tone correction unit acquires a corrected second viewpoint image signal OS_L by performing dynamic tone correction processing on the second viewpoint image signal IS_L and the second viewpoint surrounding brightness signal US_L, the dynamic tone correction processing being processing in which (1) in a case where (value of second viewpoint image signal IS_L)≤(value of second viewpoint surrounding brightness signal US_L), the corrected second viewpoint image signal OS_L is acquired by performing tone conversion processing according to a tone conversion characteristic in which, when the value of the second viewpoint image signal IS_L is fixed at a predetermined value in a predetermined input range of the second viewpoint image signal IS_L, the value of the corrected second viewpoint image signal OS_L decreases as the value of the second viewpoint surrounding brightness signal US_L increases, and (2) in a case where (value of second viewpoint image signal IS_L)>(value of second viewpoint surrounding brightness signal US_L), the corrected second viewpoint image signal OS_L is acquired by using the second viewpoint image signal IS_L as the corrected second viewpoint image signal OS_L.

With this three-dimensional image processing device, the first-viewpoint second dynamic tone correction unit executes processing for enhancing local contrast only if (value of first viewpoint image signal IS_R)≤(value of first viewpoint surrounding brightness signal US_R) (processing with respect to the second viewpoint image is similar to the processing with respect to the first viewpoint image). In other words, with this three-dimensional image processing device, processing for enhancing local contrast is executed on pixels in a portion that is darker than its surroundings, thus making it possible to selectively enhance a shade or shadow component in an image. As a result, with this three-dimensional image processing device, it is possible to acquire three-dimensional images that more naturally reproduce a three-dimensional appearance and a sense of perspective.

Note that with this three-dimensional image processing device, the first viewpoint depth surrounding brightness detection unit executes processing using the first viewpoint surrounding brightness signal US_R that is acquired using a weighted average value that is based on the difference between the subject distance of the pixel of interest and the subject distance of the peripheral pixels of the pixel of interest. As a result, with this three-dimensional image processing device, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

A seventeenth aspect of the invention is the second aspect of the invention, in which the image correction unit includes a first-viewpoint-image image correction unit and a second-viewpoint-image image correction unit.

The first-viewpoint-image image correction unit includes a first-viewpoint second depth surrounding brightness detection unit and a first viewpoint dynamic tone correction unit. The second-viewpoint-image image correction unit includes a second-viewpoint second depth surrounding brightness detection unit and a second viewpoint dynamic tone correction unit.

The first-viewpoint second depth surrounding brightness detection unit (1) acquires a first viewpoint surrounding brightness signal US_R by calculating a weighted average value of a pixel value of a pixel of interest that is a pixel corresponding to the first viewpoint image signal IS_R and a pixel value of a peripheral pixel of the pixel of interest, the weighting being higher the lower a difference is between a subject distance of the pixel of interest and a subject distance of the peripheral pixel that were acquired by the depth obtainment unit, and (2) acquires a first viewpoint offset value $\Delta US\_R$ whose value is higher the more variation there is in the first viewpoint image signal IS_R in a predetermined image area, and acquires a first viewpoint corrected surrounding brightness signal US_R' by adding the first viewpoint offset value $\Delta US\_R$ to the first viewpoint surrounding brightness signal US_R.

The first viewpoint dynamic tone correction unit acquires a corrected first viewpoint image signal OS_R by performing dynamic tone correction processing based on the first viewpoint image signal IS_R and the first viewpoint corrected surrounding brightness signal US_R', the dynamic tone correction processing being processing in which the corrected first viewpoint image signal OS_R is acquired by performing tone conversion processing according to a tone conversion characteristic in which, when the value of the first viewpoint image signal IS_R is fixed at a predetermined value in a predetermined input range of the first viewpoint image signal IS_R, the value of the corrected first viewpoint image signal OS_R decreases as the value of the first viewpoint corrected surrounding brightness signal US_R' increases.

The second-viewpoint second depth surrounding brightness detection unit (1) acquires a second viewpoint surrounding brightness signal US_L by calculating a weighted average value of a pixel value of a pixel of interest that is a pixel corresponding to the second viewpoint image signal IS_L and a pixel value of a peripheral pixel of the pixel of interest, the weighting being higher the lower a difference is between a subject distance of the pixel of interest and a subject distance of the peripheral pixel that were acquired by the depth obtainment unit, and (2) acquires a second viewpoint offset value $\Delta US\_L$ whose value is higher the more variation there is in the second viewpoint image signal IS_L in a predetermined image area, and acquires a second viewpoint corrected surrounding brightness signal US_L' by adding the second viewpoint offset value $\Delta US\_L$ to the second viewpoint surrounding brightness signal US_L.

The second viewpoint dynamic tone correction unit acquires a corrected second viewpoint image signal OS_L by performing dynamic tone correction processing based on the second viewpoint image signal IS_L and the second viewpoint corrected surrounding brightness signal US_L', the dynamic tone correction processing being processing in which the corrected second viewpoint image signal OS_L is acquired by performing tone conversion processing according to a tone conversion characteristic in which, when the value of the second viewpoint image signal IS_L is fixed at a predetermined value in a predetermined input range of the second viewpoint image signal IS_L, the value of the corrected second viewpoint image signal OS_L decreases as the value of the second viewpoint corrected surrounding brightness signal US_L' increases.

With this three-dimensional image processing device, the first-viewpoint second depth surrounding brightness detection unit calculates the right eye offset value ΔUS_R whose value is higher the more variation there is in the first viewpoint image signal IS_R, and acquires the first viewpoint corrected surrounding brightness signal US_R' by adding the first viewpoint offset value ΔUS_R to the first viewpoint surrounding brightness signal US_R. Then, with this three-dimensional image processing device, tone conversion processing is executed according to the tone conversion characteristics shown in FIG. 4, for example, with use of the first viewpoint corrected surrounding brightness signal US_R' instead of the surrounding brightness signal US_R. As a result, with this three-dimensional image processing device, more intense local contrast enhancement processing is executed on a pixel that is darker than its surroundings. In other words, with this three-dimensional image processing device, processing for enhancing local contrast is executed on pixels in a portion that is darker than its surroundings, thus making it possible to selectively enhance a shade or shadow component in an image. As a result, with this three-dimensional image processing device, it is possible to acquire three-dimensional images that more naturally reproduce a three-dimensional appearance and a sense of perspective (processing with respect to second viewpoint is similar to processing with respect to first viewpoint).

Note that with this three-dimensional image processing device, the first-viewpoint second depth surrounding brightness detection unit executes processing using the first viewpoint surrounding brightness signal US_R that is acquired using a weighted average value that is based on the difference between the subject distance of the pixel of interest and the subject distance of the peripheral pixels of the pixel of interest. As a result, with this three-dimensional image processing device, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

An eighteenth aspect of the invention is the second aspect of the invention, in which the image correction unit includes a first-viewpoint-image image correction unit and a second-viewpoint-image image correction unit.

The first-viewpoint-image image correction unit includes a first-viewpoint second depth surrounding brightness detection unit and a first viewpoint coefficient calculation processing unit. The second-viewpoint-image image correction unit includes a second-viewpoint second depth surrounding brightness detection unit and a second viewpoint coefficient calculation processing unit.

The first-viewpoint second depth surrounding brightness detection unit (1) acquires a first viewpoint surrounding brightness signal US_R by calculating a weighted average value of a pixel value of a pixel of interest that is a pixel corresponding to the first viewpoint image signal IS_R and a pixel value of a peripheral pixel of the pixel of interest, the weighting being higher the lower a difference is between a subject distance of the pixel of interest and a subject distance of the peripheral pixel that were acquired by the depth obtainment unit, and (2) acquires a first viewpoint offset value ΔUS_R whose value is higher the more variation there is in the first viewpoint image signal IS_R in a predetermined image area, and acquires a first viewpoint corrected surrounding brightness signal US_R' by adding the first viewpoint offset value ΔUS_R to the first viewpoint surrounding brightness signal US_R.

The first viewpoint coefficient calculation processing unit determines a coefficient k whose value is lower the higher the value of a difference ((IS_R)−(US_R')) is between the first viewpoint image signal IS_R and the first viewpoint corrected surrounding brightness signal US_R', and uses the determined coefficient k to acquire a corrected first viewpoint image signal OS_R according to the following $$OS\_R = IS\_R + k \times ((IS\_R) - (US\_R')).$$

The second-viewpoint second depth surrounding brightness detection unit (1) acquires a second viewpoint surrounding brightness signal US_L by calculating a weighted average value of a pixel value of a pixel of interest that is a pixel corresponding to the second viewpoint image signal IS_L and a pixel value of a peripheral pixel of the pixel of interest, the weighting being higher the lower a difference is between a subject distance of the pixel of interest and a subject distance of the peripheral pixel that were acquired by the depth obtainment unit, and (2) acquires a second viewpoint offset value ΔUS_L whose value is higher the more variation there is in the second viewpoint image signal IS_L in a predetermined image area, and acquires a second viewpoint corrected surrounding brightness signal US_L' by adding the second viewpoint offset value ΔUS_L to the second viewpoint surrounding brightness signal US_L.

The second viewpoint coefficient calculation processing unit determines a coefficient k whose value is lower the higher the value of a difference ((IS_L)−(US_L')) is between the second viewpoint image signal IS_L and the second viewpoint corrected surrounding brightness signal US_L', and uses the determined coefficient k to acquire a corrected second viewpoint image signal OS_L according to the following $$OS\_L = IS\_L + k \times ((IS\_L) - (US\_L')).$$

With this three-dimensional image processing device, the first viewpoint coefficient calculation processing unit determines the coefficient k whose value is lower the higher the value of a difference ((IS_R)−(US_R')) is between the first viewpoint image signal IS_R and the first viewpoint corrected surrounding brightness signal US_R', and acquires the corrected first viewpoint image signal OS_R using the determined coefficient k according to the following.

$$OS\_R = IS\_R + k \times ((IS\_R) - (US\_R'))$$

Accordingly, with this three-dimensional image processing device, more intense local contrast enhancement processing is executed on a pixel that is darker than its surroundings (the same follows for processing with respect to second viewpoint). In other words, with this three-dimensional image processing device, processing is executed so as to increase the extent of unsharp masking intensity for pixels in a portion that is darker than its surroundings, thus making it possible to selectively enhance a shade or shadow component in an image. As a result, with this three-dimensional image processing device, it is possible to acquire three-dimensional images that more naturally reproduce a three-dimensional appearance and a sense of perspective.

Note that with this three-dimensional image processing device, the first-viewpoint second depth surrounding brightness detection unit executes processing using the first viewpoint surrounding brightness signal US_R that is acquired using a weighted average value that is based on the difference between the subject distance of the pixel of interest and the subject distance of the peripheral pixels of the pixel of interest. As a result, with this three-dimensional image processing device, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

A nineteenth aspect of the invention is the second aspect of the invention, in which the image correction unit includes a first-viewpoint-image image correction unit and a second-viewpoint-image image correction unit.

The first-viewpoint-image image correction unit includes a first-viewpoint second depth surrounding brightness detection unit and a first viewpoint coefficient calculation processing unit. The second-viewpoint-image image correction unit includes a second-viewpoint second depth surrounding brightness detection unit and a second viewpoint coefficient calculation processing unit.

The first-viewpoint second depth surrounding brightness detection unit (1) acquires a first viewpoint surrounding brightness signal US_R by calculating a weighted average value of a pixel value of a pixel of interest that is a pixel corresponding to the first viewpoint image signal IS_R and a pixel value of a peripheral pixel of the pixel of interest, the weighting being higher the lower a difference is between a subject distance of the pixel of interest and a subject distance of the peripheral pixel that were acquired by the depth obtainment unit, and (2) acquires a first viewpoint offset value $\Delta US\_R$ whose value is higher the more variation there is in the first viewpoint image signal IS_R in a predetermined image area, and acquires a first viewpoint corrected surrounding brightness signal US_R' by adding the first viewpoint offset value $\Delta US\_R$ to the first viewpoint surrounding brightness signal US_R.

The first viewpoint coefficient calculation processing unit determines a coefficient k whose value is lower the higher the value of a difference ((IS_R)−(US_R')) is between the first viewpoint image signal IS_R and the first viewpoint corrected surrounding brightness signal US_R', sets a coefficient p ($p: 0 \le p \le 1$), acquires a signal LPF ((k+p)×(IS_R−US_R')) by performing band limitation processing on a signal acquired according to the following $$(k+p) \times (IS\_R - US\_R'), \text{ and}$$

acquires a corrected first viewpoint image signal OS_R using the acquired signal LPF ((k+p)×(IS_R−US_R')) according to the following $$OS\_R = IS\_R - p \times (IS\_R - US\_R') + LPF((k+p) \times (IS\_R - US\_R')).$$

The second-viewpoint second depth surrounding brightness detection unit (1) acquires a second viewpoint surrounding brightness signal US_L by calculating a weighted average value of a pixel value of a pixel of interest that is a pixel corresponding to the second viewpoint image signal IS_L and a pixel value of a peripheral pixel of the pixel of interest, the weighting being higher the lower a difference is between a subject distance of the pixel of interest and a subject distance of the peripheral pixel that were acquired by the depth obtainment unit, and (2) acquires a second viewpoint offset value $\Delta US\_L$ whose value is higher the more variation there is in the second viewpoint image signal IS_L in a predetermined image area, and acquires a second viewpoint corrected surrounding brightness signal US_L' by adding the second viewpoint offset value $\Delta US\_L$ to the second viewpoint surrounding brightness signal US_L.

The second viewpoint coefficient calculation processing unit determines a coefficient k whose value is lower the higher the value of a difference ((IS_L)−(US_L')) is between the second viewpoint image signal IS_L and the second viewpoint corrected surrounding brightness signal US_L', sets a coefficient p ($p: 0 \le p \le 1$), acquires a signal LPF ((k+p)×(IS_L−US_L')) by performing band limitation processing on a signal acquired according to the following $$(k+p) \times (IS\_L - US\_L'), \text{ and}$$

acquires a corrected second viewpoint image signal OS_L using the acquired signal LPF ((k+p)×(IS_L−US_L')) according to the following $$OS\_L = IS\_L - p \times (IS\_L - US\_L') + LPF((k+p) \times (IS\_L - US\_L')).$$

With this three-dimensional image processing device, the first viewpoint coefficient calculation processing unit acquires the corrected first viewpoint image signal OS_R by performing processing corresponding to the following.

$$OS\_R = IS\_R - p \times (IS\_R - US\_R') + LPF((k+p) \times (IS\_R - US\_R'))$$

Accordingly, with this three-dimensional image processing device, the extent of blurring of (the extent of band limitation processing) the shade or shadow component included in the original image and the shade or shadow component to be added can be adjusted using the coefficient p (processing with respect to second viewpoint is similar to processing with respect to first viewpoint). Accordingly, this three-dimensional image processing device enables selectively enhancing a shade or shadow portion while appropriately blurring the shade or shadow portion. As a result, with this three-dimensional image processing device, it is possible to acquire three-dimensional images that more naturally reproduce a three-dimensional appearance and a sense of perspective.

Note that with this three-dimensional image processing device, the first-viewpoint second depth surrounding brightness detection unit executes processing using the first viewpoint surrounding brightness signal US_R that is acquired using a weighted average value that is based on the difference between the subject distance of the pixel of interest and the subject distance of the peripheral pixels of the pixel of interest. As a result, with this three-dimensional image processing device, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

A twentieth aspect of the invention is a three-dimensional imaging device including the three-dimensional image processing device according to any of the first to nineteenth aspects of the invention.

This enables realizing a three-dimensional imaging device that includes the three-dimensional image processing device according to any of the first to nineteenth aspects of the invention.

A twenty-first aspect of the invention is a three-dimensional image processing method for performing image correction processing on a three-dimensional image including a first viewpoint image and a second viewpoint image obtained by a dual-lens technique or a multiple-viewpoint technique, including a depth obtainment step and an image correction step.

The depth obtainment step is a step of acquiring a subject distance that is distance information in a three-dimensional space with respect to a subject included in the first viewpoint image and the second viewpoint image.

The image correction step is a step of, for each of the first viewpoint image and the second viewpoint image, performing shade or shadow enhancement processing for performing tone conversion on a pixel of interest that is a processing target, and adjusting a degree of processing enhancement in the shade or shadow enhancement processing based on the subject distance of the pixel of interest.

This enables realizing a three-dimensional image processing method that has effects similar to those of the first aspect of the invention.

A twenty-second aspect of the invention is a program for causing a computer to execute a three-dimensional image processing method for performing image correction processing on a three-dimensional image including a first viewpoint image and a second viewpoint image obtained by a dual-lens technique or a multiple-viewpoint technique, including a depth obtainment step and an image correction step.

The depth obtainment step is a step of acquiring a subject distance that is distance information in a three-dimensional space with respect to a subject included in the first viewpoint image and the second viewpoint image.

The image correction step is a step of, for each of the first viewpoint image and the second viewpoint image, performing shade or shadow enhancement processing for performing tone conversion on a pixel of interest that is a processing target, and adjusting a degree of processing enhancement in the shade or shadow enhancement processing based on the subject distance of the pixel of interest.

This enables realizing a program that causes a computer to execute a three-dimensional image processing method that has effects similar to those of the first aspect of the invention.

According to the present invention, it is possible to acquire high-quality three-dimensional images by giving a natural three-dimensional appearance to an image that was captured with little disparity and is poor in terms of three-dimensional appearance.

BRIEF DESCRIPTION OF THE DRAWINGS

FIG. 6A, FIG. 6B, and FIG. 6C is a diagram for describing a method for acquiring depth information using disparity matching.

FIG. 7A1, FIG. 7A2, FIG. 7B1, and FIG. 7B2 show processing results of an image correction unit according to conventional technology.

FIG. 8A, FIG. 8B, and FIG. 8C show examples of image quality correction by performing local contrast enhancement processing.

FIG. 12A1, FIG. 12A2, FIG. 12B1, and FIG. 12B2 show processing results of an image correction unit according to the first embodiment.

FIG. 16A1, FIG. 16A2, FIG. 16A3, FIG. 16B1, and FIG. 16B2 show processing results of the image correction unit according to the second embodiment.

DETAILED DESCRIPTION

The following describes embodiments of a three-dimensional image processing device and a three-dimensional image processing method according to the present invention with reference to the drawings. It will be apparent to those skilled in the art from this disclosure that the following descriptions of the embodiments are provided for illustration only and not for the purpose of limiting the invention as defined by the appended claims and their equivalents.

First Embodiment

The first embodiment is described below taking the example of a dual-lens three-dimensional imaging device (digital camera, video camera, or the like) as a three-dimensional image processing device.

1.1: Configuration of Three-Dimensional Imaging Device

Figure 1:
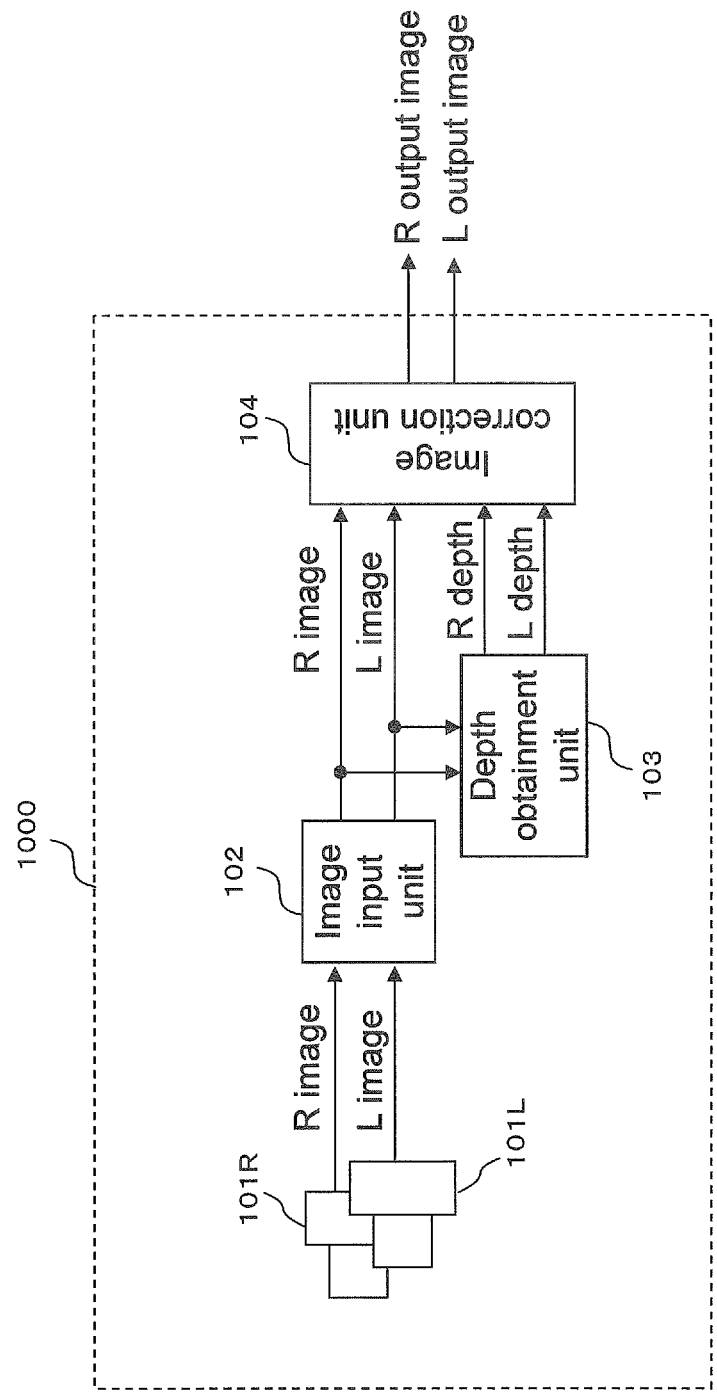
FIG. 1 is a schematic configuration diagram of a three-dimensional imaging device according to a first embodiment.

FIG. 1 shows a schematic diagram of a three-dimensional imaging device 1000 according to the first embodiment.

As shown in FIG. 1, the three-dimensional imaging device 1000 includes a first imaging unit 101R that collects subject light from a first viewpoint and acquires a first image signal (e.g., a right eye image signal (R image signal)), a second imaging unit 101L that collects subject light from a second viewpoint and acquires a second image signal (e.g., a left eye image signal (L image signal)), and an image input unit 102 that converts the first image signal (e.g., R image signal) and the second image signal (e.g., L image signal) into digital signals.

The three-dimensional imaging device 1000 also includes a depth obtainment unit 103 that calculates subject distance information from the first image signal (e.g., R image signal) and the second image signal (e.g., L image signal) that were converted into digital signals and outputs the subject distance information as first depth information (e.g., R depth information) and second depth information (e.g., L depth information), and an image correction unit 104 that performs image correction processing on the first image signal (e.g., R image signal) and the second image signal (e.g., L image signal) using the first depth information (e.g., R depth information) and the second depth information (e.g., L depth information).

Note that for the sake of convenience in the description, the following describes the case where right eye images (video) are captured by the first imaging unit 101R, and left eye images (video) are captured by the second imaging unit 101L.

The first imaging unit 101R is disposed at a first viewpoint and includes an optical system that collects subject light and an imaging element that acquires a first image signal (right eye image signal (R image signal)) from the collected subject light through photoelectric conversion. The first imaging unit 101R then outputs the acquired first image signal (R image signal) to the image input unit 102.

The second imaging unit 101L is disposed at a second viewpoint that is at a different position from the first viewpoint, and includes an optical system that collects subject light and an imaging element that acquires a second image signal (left eye image signal (L image signal)) from the collected subject light through photoelectric conversion. The second imaging unit 101L then outputs the acquired second image signal (L image signal) to the image input unit 102.

The image input unit 102 receives the first image signal (R image signal) acquired by the first imaging unit 101R, performs A/D conversion on the input first image signal, and outputs the first image signal (R image signal) resulting from the A/D conversion to a depth obtainment unit 103 and the image correction unit 104.

The image input unit 102 also receives the second image signal (L image signal) acquired by the second imaging unit 101L, performs A/D conversion on the input second image signal, and outputs the second image signal (L image signal) resulting from the A/D conversion to the depth obtainment unit 103 and the image correction unit 104.

The depth obtainment unit 103 receives the first image signal (R image signal) and the second image signal (L image signal) that are output from the image input unit 102. The depth obtainment unit 103 acquires first depth information (R depth information), which is first image (R image) depth information, and second depth information (L depth information), which is second image (L image) depth information, from a first image (R image) formed by the first image signal (R image signal) and a second image (L image) formed by the second image signal (L image signal). The depth obtainment unit 103 then outputs the acquired first depth information (R depth information) and second depth information (L depth information) to the image correction unit 104.

Note that it is preferable that the depth information is generated by disparity matching, for example.

Figure 2:
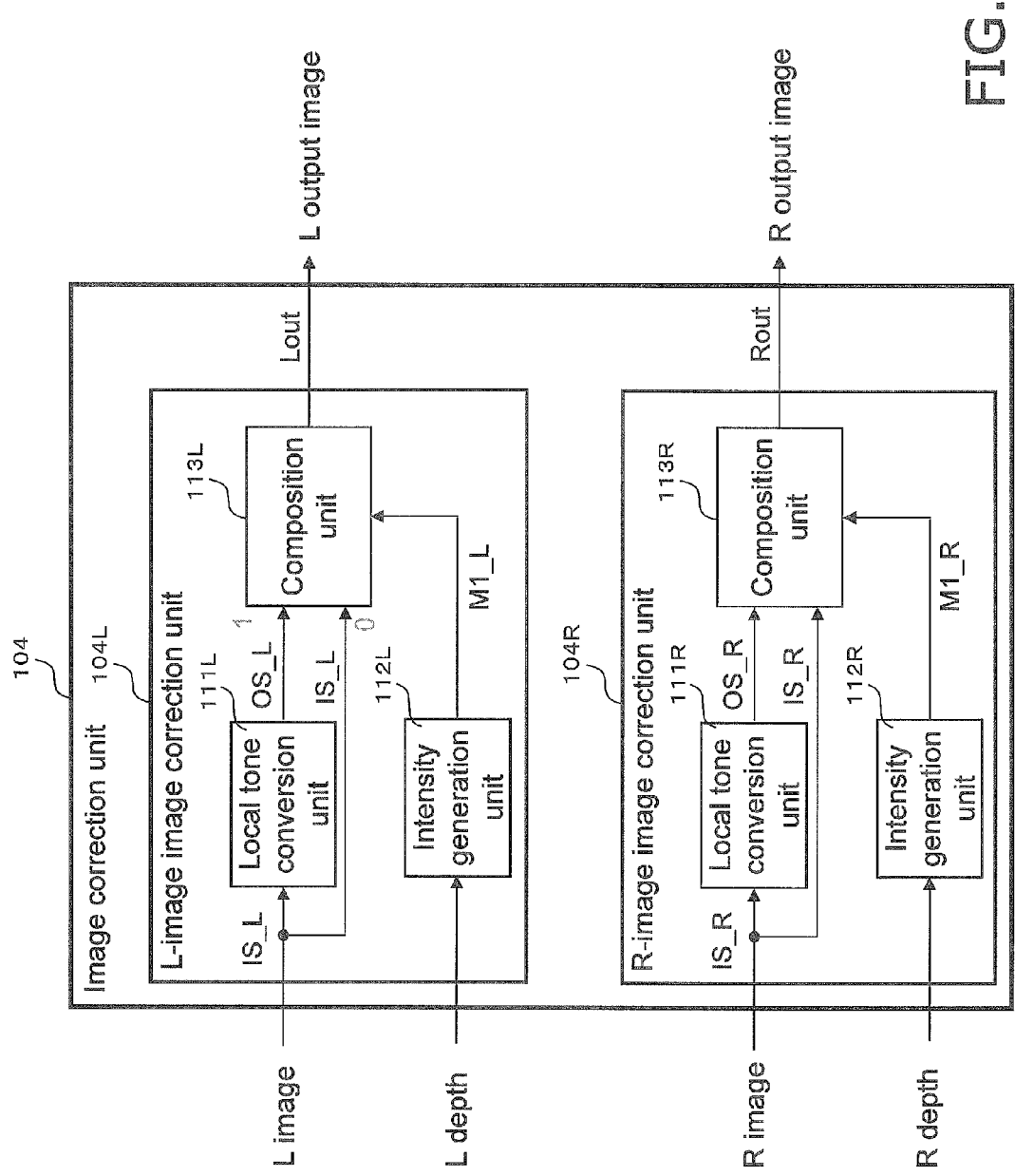
FIG. 2 is a configuration diagram of an image correction unit according to the first embodiment.

As shown in FIG. 2, the image correction unit 104 includes an L-image image correction unit 104L and an R-image image correction unit 104R. The image correction unit 104 receives the first image signal (R image signal) and the second image signal (L image signal) that are output from the image input unit 102, and also the first depth information (R depth information) and the second depth information (L depth information) that are output from the depth obtainment unit 103. The image correction unit 104 performs correction processing on the first image signal (R image signal) based on the first depth information (R depth information), and outputs a first image signal (R image signal) resulting from the correction processing. The image correction unit 104 also performs correction processing on the second image signal (L image signal) based on the second depth information (L depth information), and outputs a second image signal (L image signal) resulting from the correction processing.

Note that although it is preferable that the first depth information (R depth information) and the second depth information (L depth information) are obtained as the depth information as described above, it is not necessarily necessary to obtain two pieces of depth information since one can be indirectly obtained from the other.

As shown in FIG. 2, the L-image image correction unit 104L includes a local tone conversion unit 111L, an intensity generation unit 112L, and a composition unit 113L.

Figure 3:
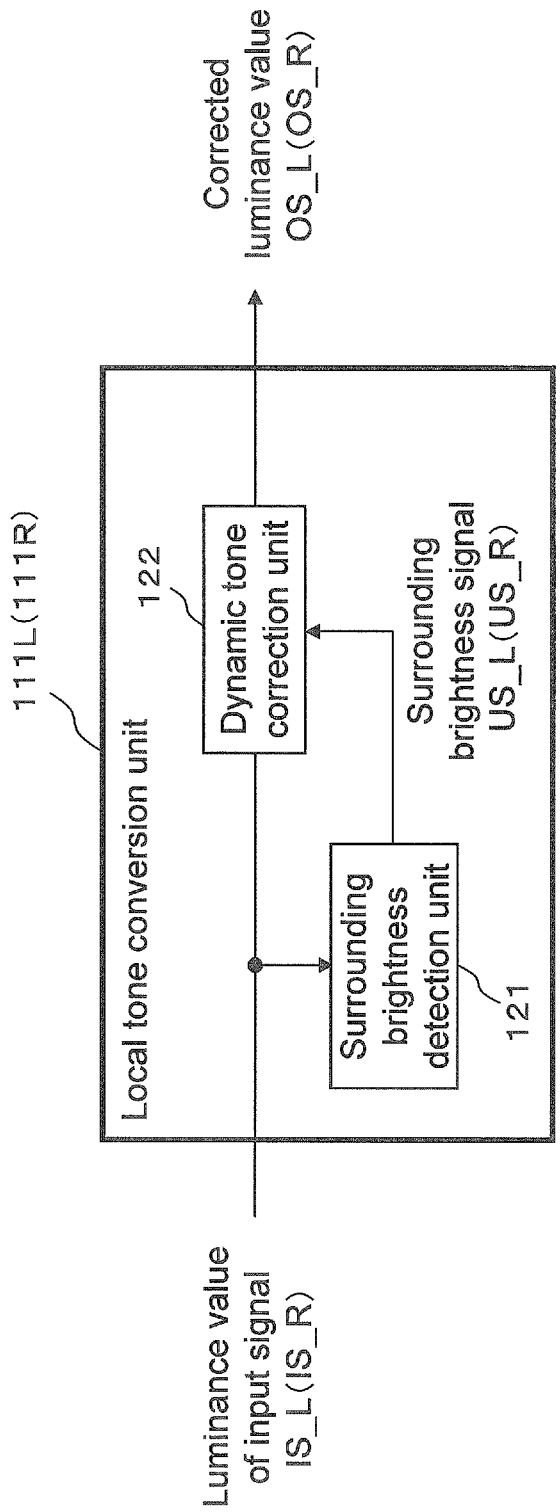
FIG. 3 is a configuration diagram of a local tone conversion unit according to the first embodiment.

As shown in FIG. 3, the local tone conversion unit 111L includes a surrounding brightness detection unit 121 and a dynamic tone correction unit 122.

The surrounding brightness detection unit 121 receives the L image signal (luminance value IS_L of the L image signal) that was output from the image input unit 102 and can form an L image, and calculates a representative brightness value for an area surrounding the pixel of interest that corresponds to the luminance value IS_L of the L image signal (peripheral image area of the pixel of interest in the L image (processing target pixel in the L image)). For example, the surrounding brightness detection unit 121 calculates the average luminance value of all of the pixels included in the surrounding area. The surrounding brightness detection unit 121 then outputs the calculated representative brightness value for the peripheral image area of the pixel of interest to the dynamic tone correction unit 122 as a surrounding brightness signal US_L.

The dynamic tone correction unit 122 receives the L image signal (luminance value IS_L of the L image signal) that was output from the image input unit 102 and can form an L image, and also the surrounding brightness signal US_L that was output from the surrounding brightness detection unit 121. The dynamic tone correction unit 122 performs tone conversion processing on the luminance value IS_L of the L image signal using a tone conversion characteristic that is determined based on the value of the surrounding brightness signal US_L. Examples of tone conversion characteristics of the dynamic tone correction unit 122 are shown in FIG. 4.

Figure 4:
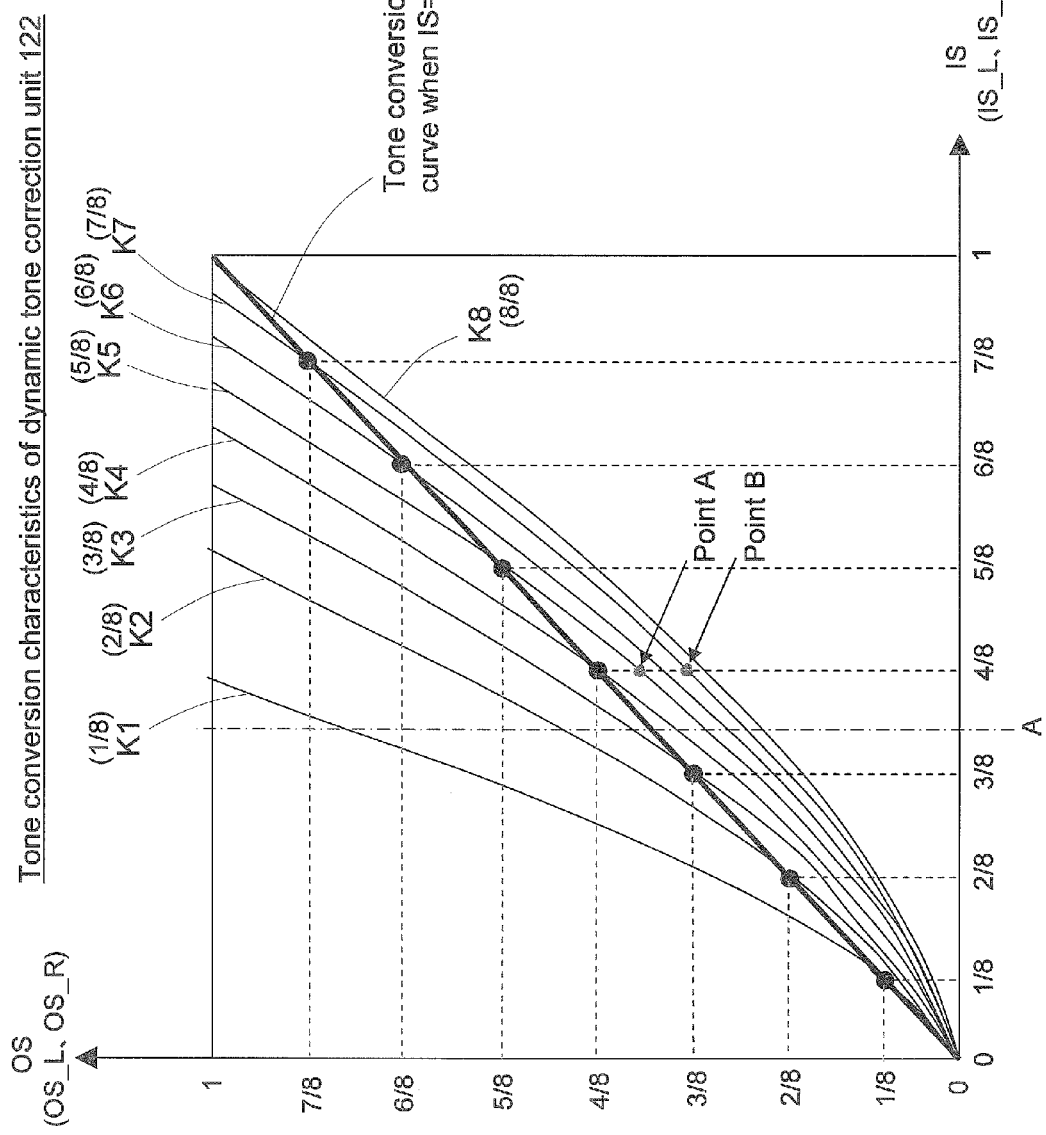
FIG. 4 is graph of conversion characteristics of a dynamic tone correction unit according to the first embodiment.

The following describes the tone conversion characteristics of the dynamic tone correction unit 122 with reference to FIG. 4.

FIG. 4 is a graph of tone conversion characteristic curves K1 to K8 that are determined by the value of the surrounding brightness signal US_L (or US_R), the value of an IS signal that is the input signal (luminance value IS_L of the L image signal or luminance value IS_R of the R image signal) being plotted on the horizontal axis, and the value of an OS signal that is the output signal (tone-converted luminance value OS_L of the L image signal or tone-converted luminance value OS_R of the R image signal) being plotted on the vertical axis.

Note that in the graph of FIG. 4, the value of the IS signal, the value of the OS signal, and the value US of the surrounding brightness signal (US_L or US_R) are normalized in the range of [0:1].

The tone conversion characteristic curves Kn (n being an integer from 1 to 8) are a group of tone conversion characteristic curves when the value US of the surrounding brightness signal (US_L or US_R) is "n/8" (n being an integer from 1 to 8), and the tone conversion characteristic curves K1 to K8 are set such that when the value of the IS signal is fixed to a predetermined value (e.g., fixed to the value A in FIG. 4), the output value OS decreases monotonically as the value US of the surrounding brightness signal increases. Note that although there are eight tone conversion characteristic curves in FIG. 4, it goes without saying that the number of tone conversion characteristic curves is not limited to this. Also, a configuration is possible in which a predetermined number of tone conversion characteristic curves are set in the dynamic tone correction unit 122 (e.g., a predetermined number of pieces of data specifying the tone conversion characteristic curves are held in a LUT), and tone conversion characteristic curves other than the pre-set tone conversion characteristic curves are realized by performing interpolation processing or the like. (For example, in the case of FIG. 4, the tone conversion characteristic curve for when US=3/16 can be derived by performing interpolation processing or the like using the tone conversion characteristic curve K1 for when US=1/8 and the tone conversion characteristic curve K2 for when US=2/8.)

By performing tone conversion on the value of the IS signal that is the input signal (luminance value IS_L of the L image signal or luminance value IS_R of the R image signal) based on the tone conversion characteristics in FIG. 4, it is possible to keep the overall brightness of the tone-converted image constant while enhancing local contrast. (If the value of IS and the value of US are the same, tone conversion processing that corresponds to a point at a black circle shown in FIG. 4 will be executed, and therefore the value of IS and the value of OS will match. As a result, the overall brightness of the image will be kept constant between before and after tone conversion.)

As described above, the dynamic tone correction unit 122 acquires the OS signal (tone-converted luminance value OS_L of the L image signal or tone-converted luminance value OS_R of the R image signal) by performing dynamic tone correction processing on the IS signal (luminance value IS_L of the L image signal or luminance value IS_R of the R image signal) using tone conversion characteristics such as those shown in FIG. 4. The dynamic tone correction unit 122 then outputs the OS signal (tone-converted luminance value OS_L of the L image signal or tone-converted luminance value OS_R of the R image signal) to the composition unit 113L (to the composition unit 113R in the case of the R image signal).

The intensity generation unit 112L receives the second depth information (L depth information) that is output from the depth obtainment unit 103, and generates a first intensity signal M1_L that determines the intensity of the local tone conversion processing (visual-spatial processing) based on the second depth information (L depth information) (details of the method for generating the first intensity signal M1_L will be described later). The intensity generation unit 112L then outputs the generated first intensity signal M1_L to the composition unit 113L.

The composition unit 113L receives the L image signal (luminance value IS_L of the L image signal) that was output from the image input unit 102 and can form an L image, the OS_L signal that was output from the local tone conversion unit 111L, and the first intensity signal M1_L that was output from the intensity generation unit 112L. The composition unit 113L synthesizes the IS_L signal and the OS_L signal based on the first intensity signal M1_L. Accordingly, the composition unit 113L acquires an L image signal Lout that has been subjected to local tone conversion processing (visual-spatial processing) at the intensity determined by the first intensity signal M1_L. The composition unit 113L then outputs the acquired L image signal Lout.

The L-image image correction unit 104L is configured as described above.

Note that the R-image image correction unit 104R has a configuration similar to that of the L-image image correction unit 104L, and the only difference from the L-image image correction unit 104L is that the signals input thereto are the R image signal and the R depth information.

1.2: Operation of Three-Dimensional Imaging Device

The following describes the operation of the three-dimensional imaging device 1000 configured as described above.

Figure 5:
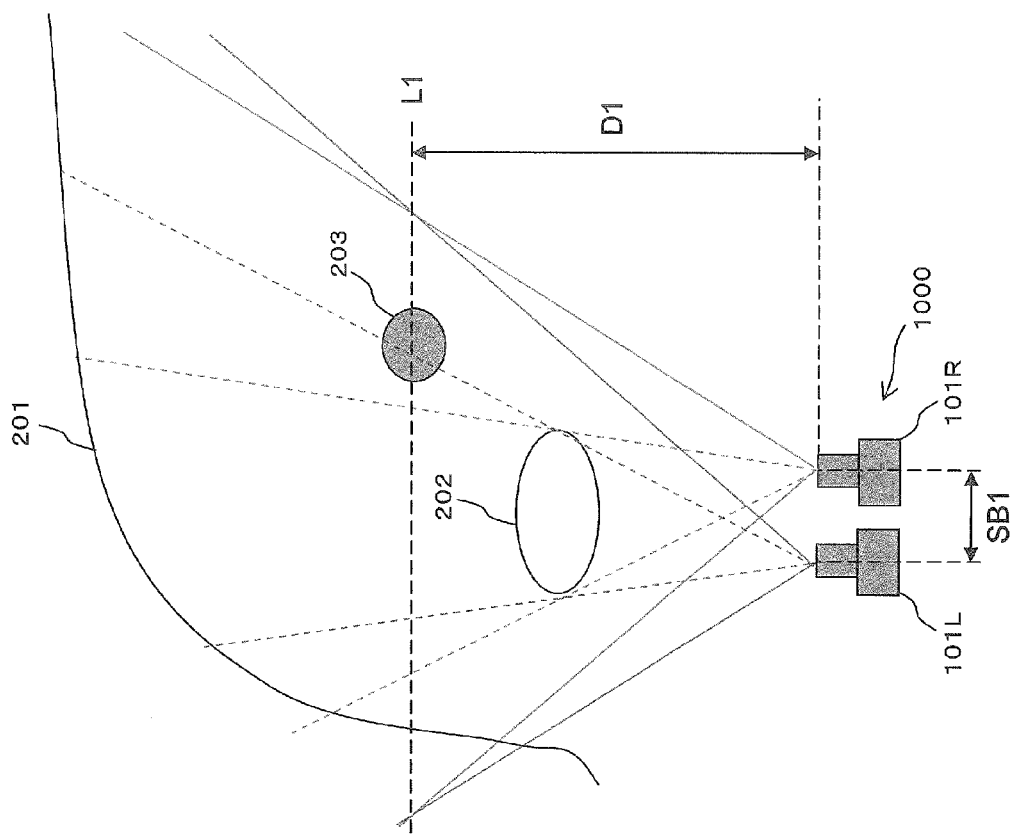
FIG. 5 is a diagram for describing a relationship between an imaging environment and subjects.

FIG. 5 is a diagram showing the positional relationship between a subject scene including a background and two imaging units (first imaging unit 101R and second imaging unit 101L) of the three-dimensional imaging device 1000, as seen from above.

It is assumed that a subject 201 is a wall in the background, a subject 202 is a main subject such as a person, and a subject 203 is a sub subject such as a column. It is assumed that as shown in FIG. 5, the main subject 202 and the sub subject 203 are both substantially elliptical objects that have a predetermined width when viewed from above.

The following describes operations of the three-dimensional imaging device 1000 in the exemplary case where the three-dimensional imaging device 1000 captures images of the subject scene shown in FIG. 5.

The first imaging unit 101R and the second imaging unit 101L are arranged separated by an interaxial distance (stereo base length) (distance SB1 in FIG. 5) in the three-dimensional imaging device 1000 so that three-dimensional images (left eye images and right eye images) can be acquired.

In order to simplify the description, it is assumed that the angle of convergence is set such that the optical axes intersect at the distance at which the sub subject 203 exists (dashed line L1). Specifically, the subject at the distance indicated by the dashed line (the subject at a subject distance D1 shown in FIG. 5) does not have disparity in the images captured by the second imaging unit 101L and the first imaging unit 101R, and is positioned on a display screen (virtual screen) that is not shown. In other words, if three-dimensional images acquired due to the subject scene in FIG. 5 being three-dimensionally imaged by the three-dimensional imaging device 1000 are three-dimensionally displayed by a display device, the subject at the subject distance D1 will be positioned on the display screen of the display device.

The main subject 202 in front of the dashed line L1 is positioned in front of the display screen due to having disparity in the protruding direction. The portion of the background 201 in which the subject distance is less than D1 (the portion of the background 201 on the left side) is positioned in front of the display screen, and the portion of the background 201 in which the subject distance is greater than D1 (the portion of the background 201 on the right side) is positioned behind the display screen.

In the case where the subject scene in FIG. 5 is imaged by the three-dimensional imaging device 1000, the first image signal (R image signal) output from the first imaging unit 101R and the second image signal (L image signal) output from the second imaging unit 101L are input to the image input unit 102 and converted into digital signals by the image input unit 102. The first image signal (R image signal) and the second image signal (L image signal) resulting from the conversion into digital signals are then output to the depth obtainment unit 103 and the image correction unit 104.

The depth obtainment unit 103 acquires, through disparity matching for example, first depth information (R depth information), which is first image (R image) depth information, and second depth information (L depth information), which is second image (L image) depth information, from a first image (R image) formed by the first image signal (R image signal) and a second image (L image) formed by the second image signal (L image signal).

The following describes a method for acquiring the first depth information (R depth information) and the second depth information (L depth information) through disparity matching with reference to FIG. 6.

FIG. 6 is a diagram schematically showing three-dimensional images when the three-dimensional imaging device 1000 performs three-dimensional imaging on an imaging scene in which a triangular object is disposed in the background and a circular object is disposed in the foreground. FIG. 6A schematically shows an L image (left eye image), FIG. 6B schematically shows an R image (right eye image), and FIG. 6C shows the case where the R image and the L image are displayed superimposed on each other to form one image.

The method for acquiring the first depth information (R depth information) and the second depth information (L depth information) through disparity matching is realized by executing the processing of (1) to (3) below, for example.

(1) First, the depth obtainment unit 103 detects, using the L image (left eye image) and the R image (right eye image), that a subject A (vertex of the triangle in FIG. 6) corresponding to a point AL in the L image in FIG. 6A corresponds to a point AR in the R image in FIG. 6B.

(2) The depth obtainment unit 103 then calculates a deviation amount (disparity) Diff(A) between the two detected points AL and AR.

Note that the disparity has a plus or minus sign depending on the direction of deviation. For example, if a point in the R image is deviated from a point in the L image in the leftward direction, the disparity is positive, and the disparity is negative in the opposite case.

For example, in the example in FIG. 6, letting the absolute value of disparity for the subject A be $\alpha$ ($\geq 0$), the point AR in the R image is deviated from the point AL in the L image in the rightward direction, and therefore the disparity for the subject A is calculated as "$-\alpha$". Letting the absolute value of disparity for the subject B (center point of the circle in FIG. 6) be $\beta$ ($\geq 0$), a point BR in the R image is deviated from a point BL in the L image in the leftward direction, and therefore the disparity for the subject B is calculated as "$+\beta$".

(3) The depth obtainment unit 103 performs the processing of (1) and (2) on all of the points (all of the pixels) in the images, and generates a disparity image whose pixel values are the calculated deviation amounts (disparities). Then the disparity image generated by using the disparities calculated for each pixel in the L image as pixel values is used as the L depth information (L depth information image (left eye image distance image)), and the disparity image generated by using the disparities calculated for each pixel in the R image as pixel values is used as the R depth information (R depth information image (right eye image distance image)).

For example, in the L depth information (L depth information image (left eye image distance image)), the value of the pixel corresponding to the point AL in the L image in FIG. 6A becomes $-\alpha$, which is the disparity of the subject A, and in the R depth information (R depth information image (right eye image distance image)), the value of the pixel corresponding to the point AR in the R image in FIG. 6B becomes $-\alpha$, which is the disparity of the subject A.

Note that a "distance image" is an image in which the value mapped to each pixel is a value that is correlated with the distance between the actual position of the subject corresponding to the pixel (position in three-dimensional space) and the position of the three-dimensional imaging device 1000.

Note that the above-described method for acquiring the first depth information (R depth information) and the second depth information (L depth information) through disparity matching is one example, and there is no limitation to this. For example, the signs may be assigned to the disparities in the opposite manner. Also, the depth obtainment unit 103 may use another method in order to acquire the left eye image distance image and the right eye image distance image and acquire the L depth information and the R depth information.

The L depth information and the R depth information acquired as described above are output to the image correction unit 104.

<<Natural Enhancement of Three-Dimensional Appearance>>

The following describes the natural enhancement of three-dimensional appearance in three-dimensional images, taking the exemplary case of three-dimensionally imaging the subject scene in FIG. 5.

The above description of positions in FIG. 5 applies here as well.

Furthermore, it is assumed that the color of the main subject 202 is bright, and that the color of the sub subject 203 is dark. It is also assumed that the light-dark change of both the main subject 202 and the sub subject 203 has a small amplitude. When viewed from the three-dimensional imaging device 1000, the background 201 is something like a curved wall whose left-hand side is in the front and whose right-hand side is in the back, and the main subject 202 and the sub subject 203 have an intermediate brightness and a slightly large amount of light-dark change FIG. 7 is a diagram showing the relationship between luminance and the horizontal position in three-dimensional images (L image and R image) captured by the second imaging unit 101L and the first imaging unit 101R, and the relationship between depth information and the horizontal position in the three-dimensional images (L image and R image).

Specifically, FIG. 7A2 shows the relationship between luminance and the horizontal position in the L image, and FIG. 7B2 shows the relationship between luminance and the horizontal position in the R image. The three-dimensional images having the luminance distributions in FIG. 7 correspond to output images obtained by a conventional three-dimensional imaging device.

Also, FIG. 7A1 shows the relationship between the horizontal position and L depth information acquired by the depth obtainment unit 103 using three-dimensional images (L image and R image) acquired by the second imaging unit 101L and the first imaging unit 101R. Also, FIG. 7B1 shows the relationship between the horizontal position and R depth information acquired by the depth obtainment unit 103 using three-dimensional images (L image and R image) acquired by the second imaging unit 101L and the first imaging unit 101R.

Note that in FIGS. 7A1 and 7A2, the horizontal position is indicated on the horizontal axis, and the depth value is indicated on the vertical axis. Here, it is assumed that the depth value increases the more the position is in the near scene (the smaller the subject distance is), and is closer to "0" the more the position is in the far scene (the larger the subject distance is).

Also, FIGS. 7A1 to 7B2 show the state in which the horizontal positions are the same as each other.

Note that in order to simplify the description, the background 201, the main subject 202, and the sub subject 203 are described as having a smooth surface free of recessions and projections and having a pattern of light and dark stripes drawn thereon, but there is no limitation to this type of subject, and the subjects may have recessions and projections. Also, although it is described that the main subject 202 is bright and the sub subject 203 is dark, there is no limitation to this, and the subjects may have any brightness.

It is assumed that the angle of convergence of the first imaging unit 101R and the second imaging unit 101L of the three-dimensional imaging device 1000 is set such that there is no disparity at the subject distance of the sub subject 203, that is to say, the subject distance D1 shown in FIG. 5. Accordingly, when the three-dimensional images acquired by three-dimensionally imaging the imaging scene in FIG. 5 are displayed by a display device (three-dimensional image display device), the sub subject 203 is positioned on the display screen plane (not shown) (display screen plane of the three-dimensional image display device), and the main subject 202 is displayed in front of the display screen plane (display screen plane of the three-dimensional image display device).

As is understood from the relationship between the luminance and the depth value at horizontal positions in the L image shown in FIGS. 7A1 and 7A2, when viewing the subject scene in FIG. 5 from the second imaging unit 101L (left eye viewpoint), the left half of the sub subject 203 is hidden by the shadow of the main subject 202, and therefore the position of the main subject 202 (dense hatching in FIG. 7 (hatched portion indicated by 202 in FIG. 7)) and the position of the sub subject 203 (sparse hatching in FIG. 7 (hatched portion indicated by 203 in FIG. 7)) are continuous with each other, and the background 201 is not visible between the main subject 202 and the sub subject 203.

On the other hand, as is understood from the relationship between the luminance and the depth value at horizontal positions in the R image shown in FIGS. 7B1 and 7B2, when viewing the subject scene in FIG. 5 from the first imaging unit 101R (right eye viewpoint), the position of the main subject 202 and the position of the sub subject 203 are separated from each other, and the background 201 is visible between the main subject 202 and the sub subject 203.

The following considers causes for an insufficiency of three-dimensional appearance and sense of perspective in the three-dimensional images acquired by three-dimensional imaging.

The following are examples of cases where there is an insufficiency of three-dimensional appearance and sense of perspective in the three-dimensional images acquired by three-dimensional imaging in the environment shown in FIG. 5:

(1) the case where three-dimensional captured images are acquired by performing three-dimensional imaging with a narrow gap between the first imaging unit 101R and the second imaging unit 101L, (2) the case where three-dimensional captured images are acquired by performing three-dimensional imaging with respect to the arrangement of the subjects 202, 203, and 201 with a wide gap between the first imaging unit 101R and the second imaging unit 101L (the subject distance is large), and (3) the case of a small-sized display for displaying three-dimensional images.

In particular, in order to capture three-dimensional images that are easily viewable from the near scene to the far scene, imaging needs to be performed with a narrow camera gap (gap between the first imaging unit 101R and the second imaging unit 101L) (a short stereo base (interaxial distance)) and a low binocular disparity, and this is often a cause for insufficient three-dimensional appearance.

There are cases where the three-dimensional appearance will appear to increase if shade or shadow is enhanced in three-dimensional images that have an insufficiency of three-dimensional appearance due to a cause such as that described above. Here, "shade or shadow" is a concept that includes the case where there is a change in the brightness of the subject when the subject is illuminated from a certain direction. Shade or shadow appears on the subject when the brightness of the subject changes according to the angle of the surface of the subject, for example. This enables a person to recognize the shape of the subject and recessions and projections on the surface of the subject.

It is therefore conceivable that enhancing such shade or shadow (change in brightness) will enable causing the person to sense an increase in the depth of the shape of the subject and the depth of the recessions and projections.

Although there are various known techniques for enhancing shade or shadow (shade or shadow enhancement processing), the following describes shade or shadow enhancement processing taking the example of using local contrast enhancement processing that can perform natural contrast enhancing by enhancing visual brightness contrast characteristics through image processing (e.g., the local contrast enhancement processing (visual-spatial processing) disclosed in WO 2005/027043 or WO 2007/043460). Shade or shadow enhancement processing that uses local contrast enhancement processing can be realized using the local tone conversion unit 111L (111R) shown in FIG. 3, for example.

FIG. 8 is a diagram showing examples of image quality correction carried out by performing the above-described local contrast enhancement processing on an L image and an R image acquired by three-dimensionally imaging the subject scene in FIG. 5.

Specifically, FIG. 8A shows the relationship between luminance and the horizontal position in the L image obtained by image quality correction. Also, FIG. 8B shows the relationship between luminance and the horizontal position in the R image obtained by image quality correction. Furthermore, FIG. 8C is a diagram in which the surrounding brightness signal US_L is displayed superimposed on FIG. 8B.

As a result of executing local contrast enhancement processing on the L image and the R image, the luminance difference increases at a predetermined place in the main subject 202 (in the densely hatched portion 202 in FIG. 8), and the shade or shadow on the main subject 202 is enhanced. For example, letting Δ1 be the difference between the luminance value at a horizontal position P1 and the luminance value at a horizontal position P2 before executing the local contrast enhancement processing, and Δ2 be the difference between the luminance value at the horizontal position P1 and the luminance value at the horizontal position P2 after executing the local contrast enhancement processing, the following relationship is satisfied, and it is understood that the shade or shadow on the main subject 202 is enhanced.

$$\Delta 2 > \Delta 1$$

In this way, as a result of executing the local contrast enhancement processing on the L image and the R image, the depth of recessions and projections appears large inside the main subject 202 object (the area within the outline portion of the main subject 202), and therefore it is expected that the apparent three-dimensional appearance will be improved.

However, although the shade or shadow is enhanced when actually observing images subjected to local contrast enhancing, the contrast other than the shade or shadow is also likewise enhanced. For this reason, the three-dimensional images (L image and R image) subjected to local contrast enhancement processing are images that have variation and enhanced contrast over the entirety of the screen, but this does not necessarily mean that the three-dimensional appearance and the sense of perspective are increased, and it is often the case that the three-dimensional appearance and the sense of perspective do not appear to have increased in three-dimensional images (L image and R image) that have been subjected to local contrast enhancement processing.

The following causes (1) and (2) are conceivable.

(1) Contrast enhancement is also performed for the far scene likewise to the near scene.

The perception (human perception) of three-dimensional appearance due to shade or shadow is, in the first place, more intense for a subject that is close, and is not very present for a subject that is far away. With shade or shadow enhancement processing through the above-described local contrast enhancement processing that does not take this fact into consideration, processing is performed on the entirety of an image uniformly, regardless of the subject distance. For this reason, the contrast of the portions A (portions enclosed in dashed-dotted lines) in FIG. 8 is unnaturally enhanced. As a result, the processing executed on the three-dimensional images in order to enhance shade or shadow is thought to end up being unnatural processing that does not appear to enhance shade or shadow, contrary to the intention of the processing.

(2) Contrast enhancement is also performed on the area between objects.

Regardless of the fact that shade or shadow expresses bulging, recessions, and projections on a subject object, in the shade or shadow enhancement processing that uses the above-mentioned local contrast enhancement processing, if there is a luminance difference in a border area between objects at different distances, processing for enhancing contrast is performed on the border area between the objects at different distances so as to intensify the brightness contrast effect. For example, contrast enhancement processing is performed in portions B (portions enclosed by dashed double-dotted lines) in FIG. 8 (border area between the main subject 202 and the background 201).

For this reason, inter-object color differences that are not originally shade or shadow are enhanced. As a result, the processing executed on the three-dimensional images in order to enhance shade or shadow is thought to end up being unnatural processing that does not appear to enhance shade or shadow, contrary to the intention of the processing. In FIG. 8, the main subject 202 is adjacent to the different dark subject 203 and the background 201, and therefore as a result of performing processing to intensify the brightness contrast effect through local contrast enhancement processing, it is thought that the luminance of the edge of the main subject 202 rises, and the shade or shadow that had expressed the roundness in the subject (the portion of shade or shadow that had expressed the roundness of the subject object in the edge portion of the main subject 202 (in the edge portion of the main subject 202, the portion where the luminance smoothly decreases from the inner side of the subject object toward the outside)) becomes flat, thus causing a phenomenon in which the three-dimensional appearance is impaired.

The three-dimensional imaging device 1000 of the present embodiment solves the problem that occurs due to the aforementioned cause (1), and realizes processing for naturally enhancing three-dimensional appearance in three-dimensional images.

1.2.1: Operation of Image Correction Unit 104

The following describes the operation of the image correction unit 104.

Note that the L-image image correction unit 104L executes processing on the L image using the L depth information, and the R-image image correction unit 104R executes processing on the R image using the R depth information, and since their processing content is the same, the following description focuses on the L-image image correction unit 104L.

<<Operation of Intensity Generation Unit 112>>

First, the operation of the intensity generation unit 112L of the L-image image correction unit 104L will be described.

Note that the operation of the intensity generation unit 112B of the R-image image correction unit 104B is similar to that of the intensity generation unit 112L.

FIG. 7A shows the relationship between the pixel position in the L image and the depth value (distance information). It is assumed that the depth value is a smaller value the more the position is in the far scene (the greater the subject distance is), and is a larger value the more the position is in the near scene (the smaller the subject distance is).

Accordingly, the depth value of the sub subject 203 is smaller than the depth value of the main subject 202, and is larger than the depth value of the background 201 on the right-hand side.

Figure 9:
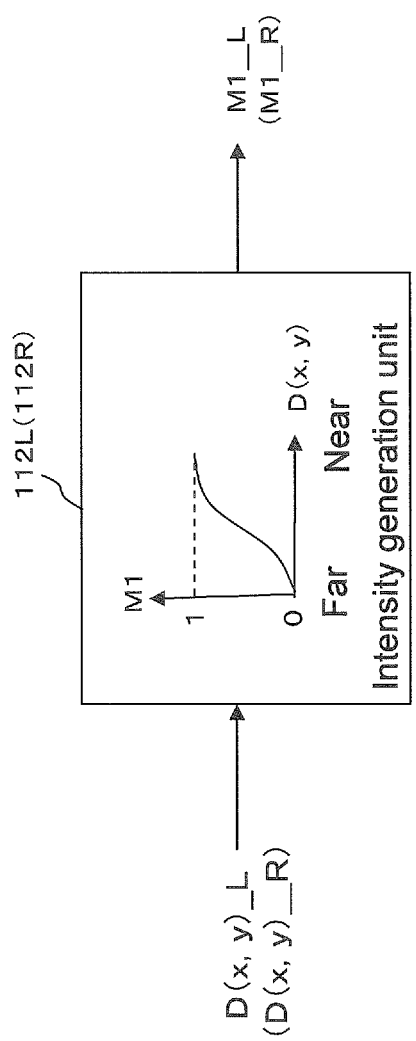
FIG. 9 is a diagram illustrating an intensity generation unit according to the first embodiment.

As shown in FIG. 9, the intensity generation unit 112L shown in FIG. 2 generates the first intensity signal M1_L by performing input/output conversion on the input L depth information using a linear or non-linear continuous function. The input/output conversion characteristic (L depth information D(x,y))–(first intensity signal M1_L) in the intensity generation unit 112L is assumed to be a characteristic according to which, as shown in FIG. 9 for example, the value of the output first intensity signal M1_L (0≤M1_L≤1) rises monotonically relative to the input L depth information D(x,y). In other words, it is sufficient that the input/output conversion characteristic (L depth information D(x,y))–(first intensity signal M1_L) is set in the intensity generation unit 112L such that more intense shade or shadow enhancement processing (e.g., local tone conversion processing) is performed the smaller (the more in the near scene) the subject distance indicated by the L depth information D(x,y) is.

The first intensity signal M1 (L-image first intensity signal M1_L) generated by the intensity generation unit 112L is output to the composition unit 113L.

Note that the processing performed by the intensity generation unit 112R on the R depth information is similar to the processing performed by the intensity generation unit 112L on the L depth information.

<<Operation of Local Tone Conversion Unit 111>>

Next, the operation of the local tone conversion unit 111L of the L-image image correction unit 104L will be described.

Note that the operation of the local tone conversion unit 111R of the R-image image correction unit 104R is similar to that of the local tone conversion unit 111L.

The local tone conversion unit 111L executes local tone conversion processing through visual-spatial processing on the input L image signal (which corresponds to the pixel of interest in the L image). Specifically, as shown in FIG. 3, the surrounding brightness detection unit 121 of the local tone conversion unit 111L calculates a representative brightness value for the peripheral image area of the pixel of interest (e.g., the average brightness value (average luminance value) of the peripheral image area), and outputs the calculated representative brightness value to the dynamic tone correction unit 122 as the surrounding brightness signal US_L.

The following describes the method by which the surrounding brightness detection unit 121 acquires the surrounding brightness signal US_L with reference to the diagrams.

Figure 10:
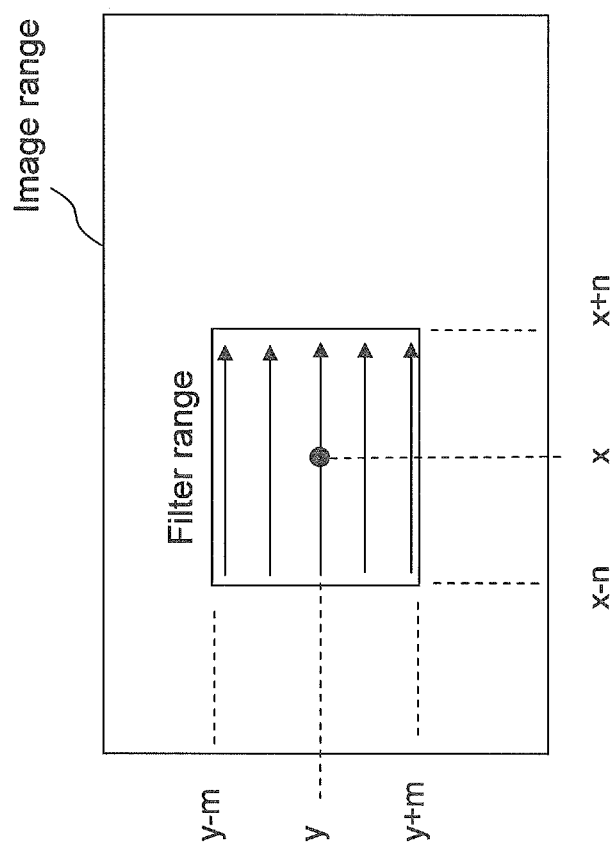
FIG. 10 shows a filter range of a surrounding brightness detection unit according to the first embodiment.

FIG. 10 is a diagram for describing the range in which the surrounding brightness detection unit 121 extracts the brightness around the pixel of interest at the coordinates (x,y) (x being the x coordinate in the image, and y being the y coordinate in the image).

In order to perform local contrast enhancement with characteristics suited to visual characteristics, the local tone conversion unit 111L needs to extract the brightness from a quite large area in the image (e.g., in the case where the processing target image is of the XGA (1024×768) size, it is preferable that the peripheral pixel area is set to an area of 80×80 pixels or larger). Here, the brightness extraction range is the range of 2n+1 pixels (n being a natural number) in the horizontal direction and 2m+1 pixels (m being a natural number) in the vertical direction. Also, in view of the fact that the influence of the surrounding brightness decreases as the distance from the pixel of interest increases, it is preferable that the surrounding brightness information has less weight as the distance from the pixel of interest increases as with a Gaussian filter.

Figure 11:
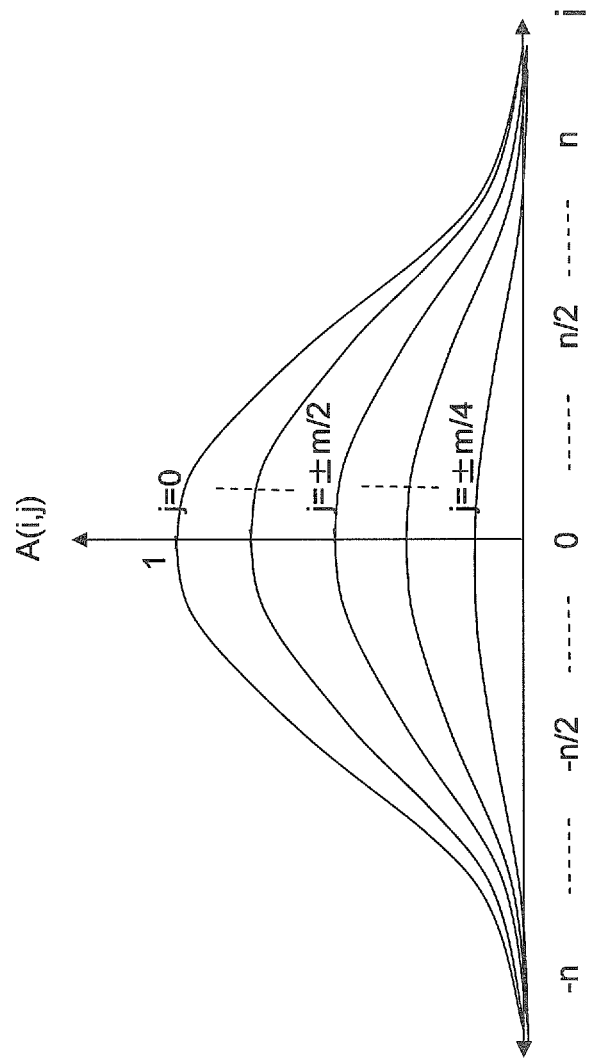
FIG. 11 shows filter characteristics of the surrounding brightness detection unit according to the first embodiment.

FIG. 11 is a graph showing an example of a weighting factor A(i,j) for extracting surrounding brightness values. Here, i and j indicate the distance from the pixel of interest.

When the above-described weighting factor is used, the surrounding brightness Us can be calculated according to Expression 1 below.

$$Us(x, y) = \frac{\sum_{i,j} A(i, j) \cdot Is(x + i, y + j)}{\sum_{i,j} A(i, j)} \quad \text{[Exp. 1]}$$

Note that in the above Expression 1, Is(x+i,y+i) is the pixel value of the pixel at the coordinates (x+i,y+i) (which corresponds to the luminance value of the input signal IS_L (or IS_R)).

The surrounding brightness detection unit 121 executes processing corresponding to the above Expression 1 on the pixel of interest (pixel at the coordinates (x,y)) so as to calculate the surrounding brightness Us(x,y) for the pixel of interest. This processing is executed for all of the pixels that form the image.

By performing the above processing, the surrounding brightness detection unit 121 generates the surrounding brightness signal US_L (or US_R), and outputs the generated surrounding brightness signal US_L (or US_R) to the dynamic tone correction unit 122.

The dynamic tone correction unit 122 determines a tone conversion characteristic for tone conversion to be executed on the input L image signal (pixel of interest in the L image), based on the surrounding brightness signal US_L output from the surrounding brightness detection unit 121. Specifically, this determination is made by, in accordance with the value of the surrounding brightness signal US_L, selecting a tone conversion characteristic curve for performing tone conversion on the pixel of interest from among the tone conversion characteristic curves K1 to K8 shown in FIG. 4, or deriving a tone conversion characteristic curve by performing interpolation processing or the like using the tone conversion characteristic curves K1 to K8. Tone conversion using the tone conversion characteristic curve determined by the dynamic tone correction unit 122 is then performed on the pixel of interest, thus acquiring a tone-converted L image signal as OS_L. The tone-converted L image signal OS_L that was acquired is then output to the composition unit 113L.

<<Operation of Composition Unit 113>>

In the composition unit 113L, the tone-converted L image signal OS_L that was output from the local tone conversion unit 111L and the L image signal IS_L (L image signal not subjected to tone conversion processing) that was output from the image input unit 102 are synthesized in accordance with the value of the L-image first intensity signal M1_L.

The following is performed in the composition unit 113L:

(1) the L image signal IS_L is synthesized with a greater weight the farther the subject distance is and the smaller the depth value is, and (2) the tone-converted L image signal OS_L is synthesized with a greater weight the closer the subject distance is and the greater the depth value is.

Although it is convenient to use linear internal division in the compositing technique used by the composition unit 113L, a more complicated non-linear technique can be used.

The following describes the compositing technique performed by the composition unit 113L using linear internal division processing.

The input/output conversion characteristic (L depth information D(x,y))–(first intensity signal M1_L) in the intensity generation unit 112L is assumed to be a characteristic according to which, as shown in FIG. 9 for example, the value of the output first intensity signal M1_L (0≤M1_L≤1) rises monotonically relative to the input L depth information D(x,y).

The composition unit 113L then generates the L output image signal Lout by composition according to the following expression, using the value of the first intensity signal M1_L ($0 \leq M1\_L \leq 1$) as the internal division ratio.

$$Lout = M1\_L \times OS\_L + (1-M1\_L) \times IS\_L$$

In other words, by compositing the L image signal IS_L and the tone-converted L image signal OS_L using the first intensity signal M1_L as the internal division ratio as described above:

(1) the L image signal IS_L is synthesized with a greater weight the farther the subject distance is and the smaller the depth value is (the closer the value of the first intensity signal M1_L is to "0"), and (2) the tone-converted L image signal OS_L is synthesized with a greater weight the closer the subject distance is and the greater the depth value is (the closer the value of the first intensity signal M1_L is to "1").

Figure 12:
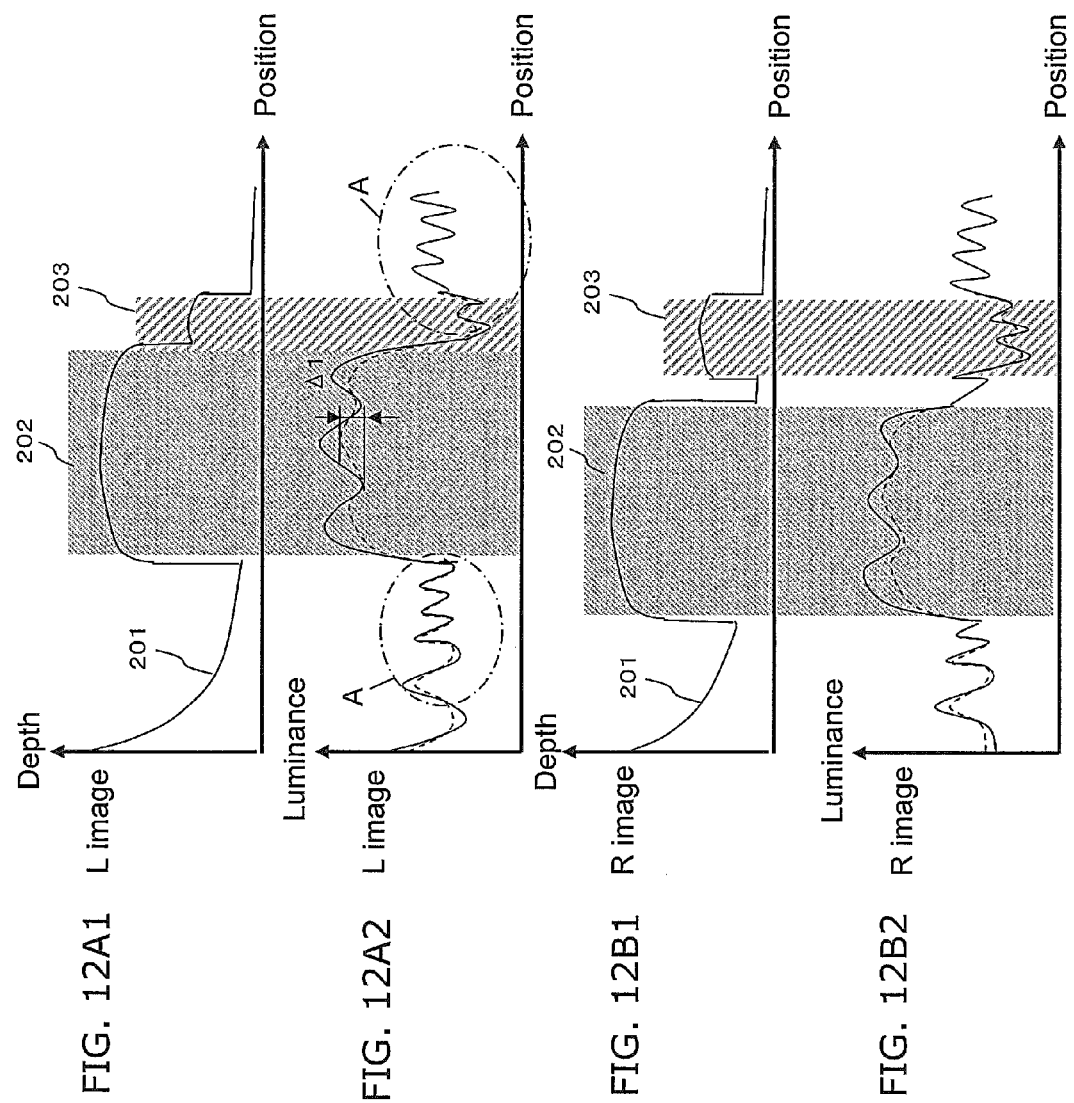

As a result of the composition unit 113L operating as described above, in the image correction unit 104, (1) the image signal in the densely hatched area (area corresponding to the main subject 202) shown in FIG. 12 is subjected to intense local tone conversion processing, and (2) the right-hand portion of the background 201 (portion in which the subject distance is large (far)) is subjected to only weak local tone conversion processing, or is not subjected to any local tone conversion processing.

Furthermore, as a result of the composition unit 113L operating as described above, in the image correction unit 104, the sparsely hatched area (area corresponding to the sub subject 203) in FIG. 12 is subjected to weak local tone conversion processing at the above-described intermediate level intensity (the intermediate level intensity that is between the intensity used for the area corresponding to the main subject 202 and the intensity used for the right-hand portion of the background 201 (portion in which the subject distance is large (far)).

Accordingly, as a result of executing the above-described processing in the three-dimensional imaging device 1000, (1) the amount of local contrast enhancement can be raised for a subject in the near scene whose local tone change in the image is due to shade or shadow and is large to a certain degree, and (2) the amount of local contrast enhancement can be reduced for a subject in the far scene whose local tone change is due to shade or shadow and is small to a certain degree.

As is understood from a comparison of FIG. 8 (results of processing according to conventional technology) and FIG. 12 (results of processing by the three-dimensional imaging device of the present embodiment), unnecessary local contrast enhancement is suppressed in the area A in the figure that is positioned in the far scene in FIG. 12, compared with the area A in FIG. 8.

In other words, with the three-dimensional imaging device 1000, contrast can be enhanced for a subject in the near scene that has a high probability of having contrast due to shade or shadow, and the contrast is not enhanced more than necessary for a subject in the far scene that has a low possibility of having contrast due to shade or shadow.

Accordingly, the three-dimensional images acquired by the three-dimensional imaging device 1000 are three-dimensional images in which only shade or shadow is perceived to have been naturally enhanced. As a result, the three-dimensional images acquired by the three-dimensional imaging device 1000 are three-dimensional images in which natural enhancement of three-dimensional appearance is realized.

Furthermore, the sense of sharpness is improved in the near scene relative to the far scene in the three-dimensional images acquired by the three-dimensional imaging device 1000, thus increasing the amount of sensed contrast difference between the far scene and the near scene. As a result, the three-dimensional images acquired by the three-dimensional imaging device 1000 are three-dimensional images in which an improvement in the sense of perspective is realized at the same time.

Second Embodiment

The following describes a second embodiment.

The object of the second embodiment is to address the cause (2) for the lack of the appearance of an increase in three-dimensional appearance and sense of perspective by merely performing local contrast enhancement as described in the first embodiment (problem due to contrast enhancement being performed on the area between objects as well). In order to simplify the description, the present embodiment omits a description of the solution to the problem that arises due to the cause (1) described in the first embodiment (problem due to contrast enhancement being performed on the far scene likewise to the near scene).

Similarly to the three-dimensional imaging device 1000 of the first embodiment, the three-dimensional imaging device of the second embodiment includes a first imaging unit 101R, a second imaging unit 101L, an image input unit 102, and a depth obtainment unit 103, and descriptions of these function units will be omitted since they are similar to those of the first embodiment shown in FIG. 1.

Figure 13:
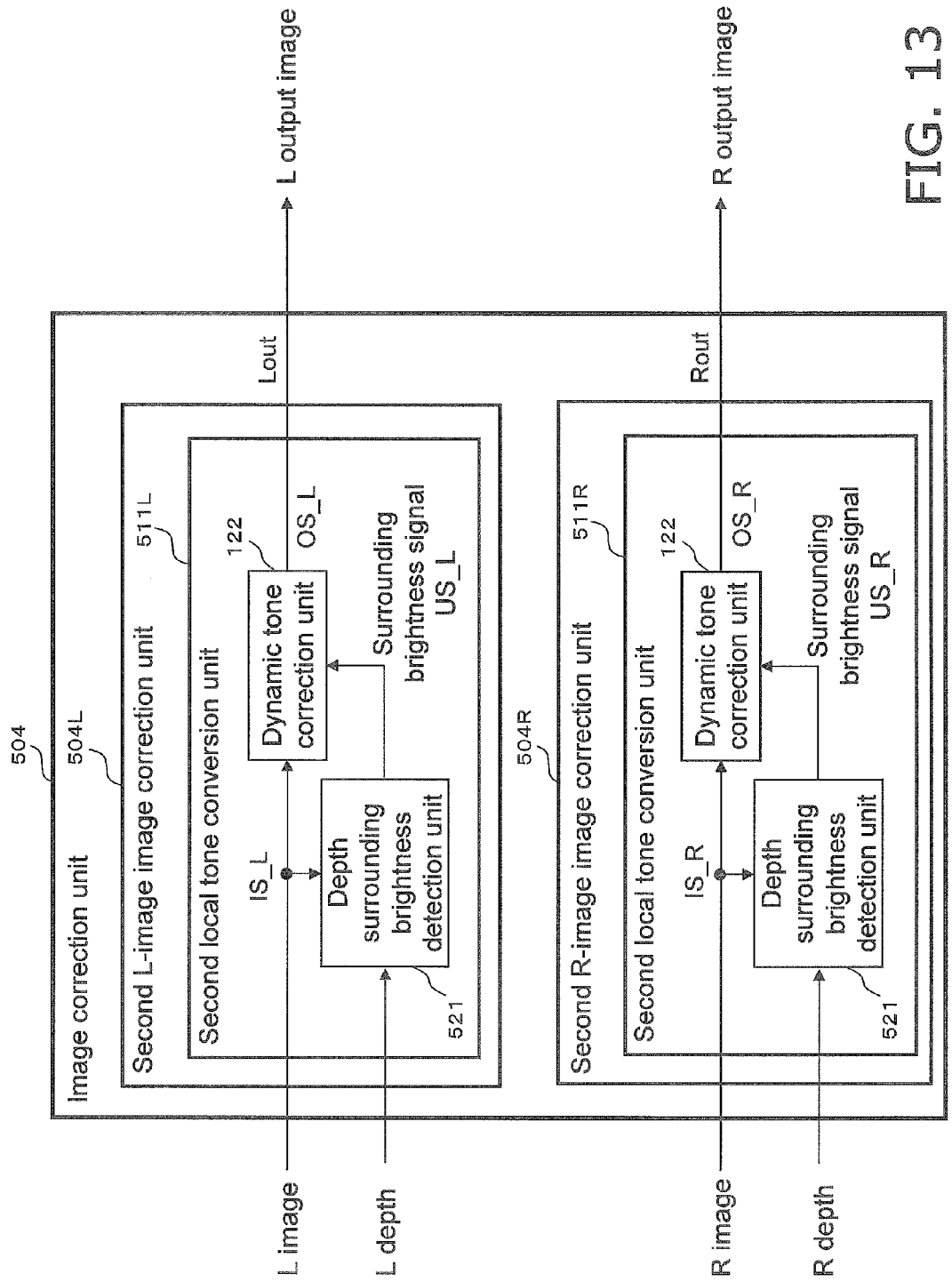
FIG. 13 is a configuration diagram of an image correction unit according to a second embodiment.

The three-dimensional imaging device of the second embodiment has a configuration in which the image correction unit 104 in the three-dimensional imaging device 1000 of the first embodiment is replaced with an image correction unit 504 shown in FIG. 13. The three-dimensional imaging device of the second embodiment and the three-dimensional imaging device 1000 of the first embodiment only differ in this point.

Other aspects of the three-dimensional imaging device of the second embodiment will not be described in detail since they are similar to those of the three-dimensional imaging device 1000 of the first embodiment.

As shown in FIG. 13, the image correction unit 504 includes a second L-image image correction unit 504L and a second R-image image correction unit 504R.

The image correction unit 504L performs correction processing on the second image signal (L image signal) based on the second depth information (L depth information), and outputs a second image signal (L image signal) resulting from the correction processing.

The second R-image image correction unit 504R performs correction processing on the first image signal (R image signal) based on the first depth information (R depth information), and outputs the first image signal (R image signal) resulting from the correction processing.

Note that in the three-dimensional imaging device of the present embodiment, although it is preferable that both the first depth information (R depth information) and the second depth information (L depth information) are obtained as the depth information as described above, it is not necessarily necessary to obtain two pieces of depth information since one can be indirectly obtained from the other.

Note that since the L image processing and the R image processing are similar to each other, the following only describes the L image processing.

As shown in FIG. 13, the second L-image image correction unit 504L includes a second local tone conversion unit 511L.

As shown in FIG. 13, the second local tone conversion unit 511L includes a depth surrounding brightness detection unit 521 and the dynamic tone correction unit 122.

The dynamic tone correction unit 122 is the same as that in the first embodiment.

The depth surrounding brightness detection unit 521 receives the L image signal (IS_L) and calculates a representative brightness value for an area surrounding the pixel of interest (processing target pixel in the L image) (e.g., calculates the average luminance value of all of the pixels included in the surrounding area), and there is a difference from the surrounding brightness detection unit 121 in the first embodiment in that the L image depth information is referenced when calculating the representative brightness value.

When calculating the representative brightness value, at the time of integrating the pixel values surrounding the pixel of interest while performing weighting as shown in FIG. 11, the depth surrounding brightness detection unit 521 (1) uses a large weighting factor in the case where there is a small difference between the depth values of the surrounding pixels and the depth value of the pixel of interest (the case where there is a small distance between the subject corresponding to the surrounding pixels and the subject corresponding to the pixel of interest), and (2) uses a small weighting factor in the case where there is a large difference between the depth values of the surrounding pixels and the depth value of the pixel of interest (the case where there is a large distance between the subject corresponding to the surrounding pixels and the subject corresponding to the pixel of interest).

As a result of the depth surrounding brightness detection unit 521 performing the above processing, pixels whose depths are far from the pixel of interest (pixels having a depth value whose difference from the depth value of the pixel of interest is large) are qualitatively not likely to be included in the representative brightness value (e.g., the weighted average value). For this reason, the representative brightness value of the area surrounding the pixel of interest (here, the average luminance value) is a value (average value (weighted average value)) that excludes pixels whose depth value is far in the filter range in FIG. 10 (a value with a reduced amount of influence from pixels whose depth value is far).

Figure 14:
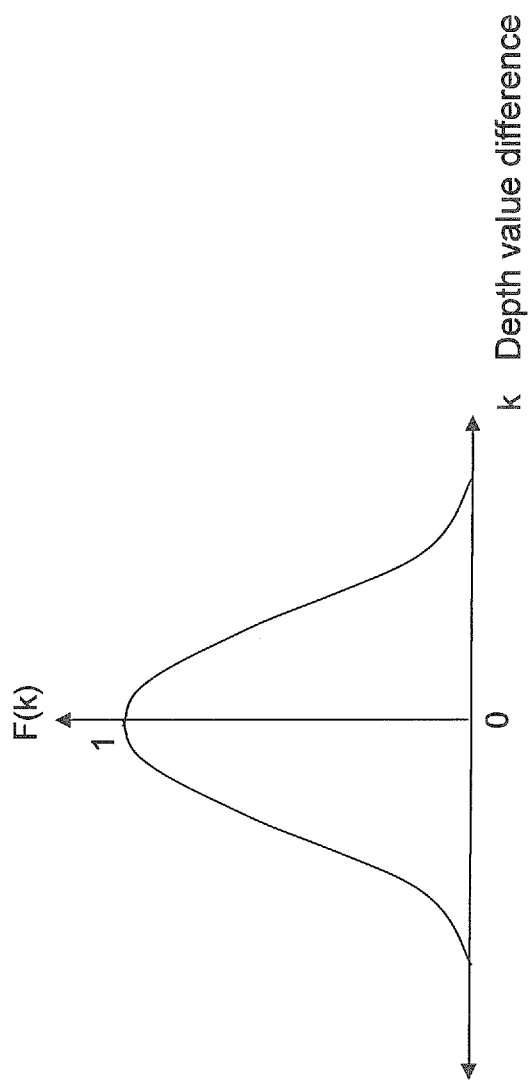
FIG. 14 is a graph showing weighting factors in a depth surrounding brightness detection unit according to the second embodiment.

FIG. 14 is a graph showing an example of a function for calculating the weighting factor. In FIG. 14, the horizontal axis shows the difference k between the depth value of a surrounding pixel and the depth value of the pixel of interest. The vertical axis shows a value F(k) of the weighting factor for the pixel surrounding the pixel of interest.

The depth surrounding brightness detection unit 521 performs processing corresponding the following expression using the function F for calculating the weighting factor, so as to calculate the representative brightness value for the peripheral image area of the pixel of interest (pixel at the coordinates (x,y)).

$$Us(x, y) = \frac{\sum_{i,j} A(i, j) \cdot F(D(x + i, y + j) - D(x, y)) \cdot Is(x + i, y + j)}{\sum_{i,j} A(i, j) \cdot F(D(x + i, y + j) - D(x, y))} \quad [\text{Exp. 2}]$$

The depth surrounding brightness detection unit 521 then outputs the value Us(x,y) calculated using the above expression to the dynamic tone correction unit 122 as the surrounding brightness signal US_L.

The processing corresponding to Expression 2 above that is performed in the depth surrounding brightness detection unit 521 will be described below with reference to FIG. 15.

Figure 15:
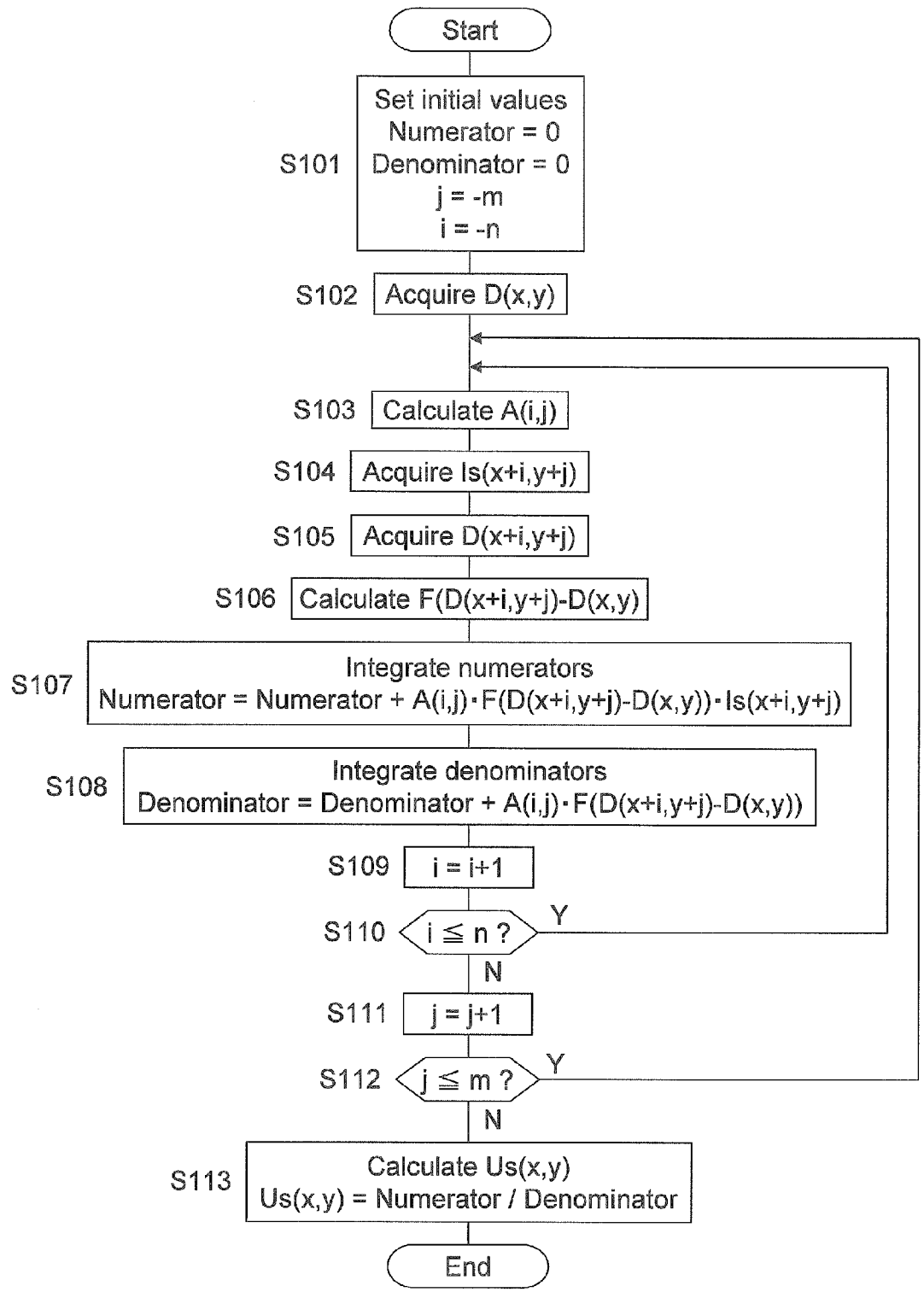
FIG. 15 is a flowchart showing processing performed by the surrounding brightness detection unit according to the second embodiment.

FIG. 15 is a flowchart for describing the processing corresponding to Expression 2 above that is performed in the depth surrounding brightness detection unit 521. In the following, the case of calculating the representative brightness value Us(x,y) according to Expression 2 using the filter range in FIG. 10 (area y−m≤y≤y+m, x−n≤x≤x+n) as the peripheral image area, will be described with reference to the flowchart of FIG. 15.

(S101):
In step S101, the depth surrounding brightness detection unit 521 sets initial values. Specifically, "0" is set for Numerator, which corresponds to the numerator items in Expression 2, and for Denominator, which corresponds to the denominator items in Expression 2. Also, j is set to −m and i is set to −n (m and n being natural numbers).

(S102):
In step S102, the depth surrounding brightness detection unit 521 acquires the depth value D(x,y) (depth value D(x,y) acquired by the depth obtainment unit 103) of the pixel of interest (pixel at the coordinates (x,y)).

(S103):
In step S103, the depth surrounding brightness detection unit 521 acquires the value of A(i,j) using the function A(i,j) demonstrating the characteristics shown in FIG. 11, for example.

(S104):
In step S104, the depth surrounding brightness detection unit 521 acquires the input image signal value of the pixel at the coordinates (x+i,y+j) (in the case of the L image, the signal value corresponding to the pixel at the coordinates (x+i,y+j) in the signal IS_L).

(S105):
In step S105, the depth surrounding brightness detection unit 521 acquires the depth value D(x+i,y+j) of the pixel at the coordinates (x+i,y+j).

(S106):
In step S106, the depth surrounding brightness detection unit 521 calculates F(D(x+i,y+j)−D(x,y)) using the function F(k) shown in FIG. 14, for example (S107):
In step S107, the depth surrounding brightness detection unit 521 integrates Numerator, which corresponds to the numerator items in Expression 2. Specifically, the depth surrounding brightness detection unit 521 uses the following expression to perform integration processing on Numerator, which corresponds to the numerators in Expression 2.

$$\text{Numerator} = \text{Numerator} + A(i,j) \cdot F(D(x+i,y+j) - D(x,y)) \cdot Is(x+i,y+j)$$

(S108):
In step S108, the depth surrounding brightness detection unit 521 integrates Denominator, which corresponds to the denominator items in Expression 2. Specifically, the depth surrounding brightness detection unit 521 uses the following expression to perform integration processing on Denominator, which corresponds to the denominators in Expression 2.

$$\text{Denominator} = \text{Denominator} + A(i,j) \cdot F(D(x+i,y+j) - D(x,y))$$

(S109, S110):
The depth surrounding brightness detection unit 521 increments (adds "1" to) the value of i in step S108, and determines whether the value of i is less than or equal to n in step S109.

If the value of i is less than or equal to n, the procedure returns to step S103, and the processing of S103 to S108 is repeated.

If the value of i is not less than or equal to n, the procedure moves to step S111.

(S111, S112):
The depth surrounding brightness detection unit 521 increments (adds "1" to) the value of j in step S111, and determines whether the value of j is less than or equal to m in step S112.

If the value of j is less than or equal to in, the procedure returns to step S103, and the processing of S103 to S110 is repeated.

If the value of j is not less than or equal to m, the procedure moves to step S113.

(S113):

In step S113, the depth surrounding brightness detection unit 521 calculates the representative brightness value Us(x, y) using the following expression.

$$Us(x,y) = \text{Numerator/Denominator}$$

As described above, the depth surrounding brightness detection unit 521 can execute processing corresponding to Expression 2. The depth surrounding brightness detection unit 521 then outputs the value Us(x,y) calculated using the above processing to the dynamic tone correction unit 122 as the surrounding brightness signal US_L.

It is thought that the surrounding brightness signal US_L output by the depth surrounding brightness detection unit 521 is qualitatively the average value of the luminance values in the subject whose depth values are close to the depth value of the pixel of interest. In other words, the value of the surrounding brightness signal US_L that is output by the depth surrounding brightness detection unit 521 is thought to be a value that is close to the average value of the pixel values (luminance values) of the pixels (peripheral pixels) that correspond to an area that surrounds the pixel of interest in the L image (R image) and is an area in which the subject distance is substantially equal to the point in three-dimensional space that corresponds to the pixel of interest.

Accordingly, with the three-dimensional imaging device of the present embodiment, even if the background having a different depth value (background having a different subject distance) is dark, the surrounding brightness signal US_L is not likely to include the darkness of the background (not likely to be influenced by the darkness of the background). As a result, with the three-dimensional imaging device of the present embodiment, contrast enhancement processing is not executed such that there is an increase in the brightness contrast between the brightness of the main subject and the darkness of the background, and it is possible to appropriately prevent the main subject from becoming unnecessarily brighter. Note that with the three-dimensional imaging device of the present embodiment, even if the background is brighter than the main subject for example, the background is not likely to have an influence similarly to the case described above.

Figure 16:
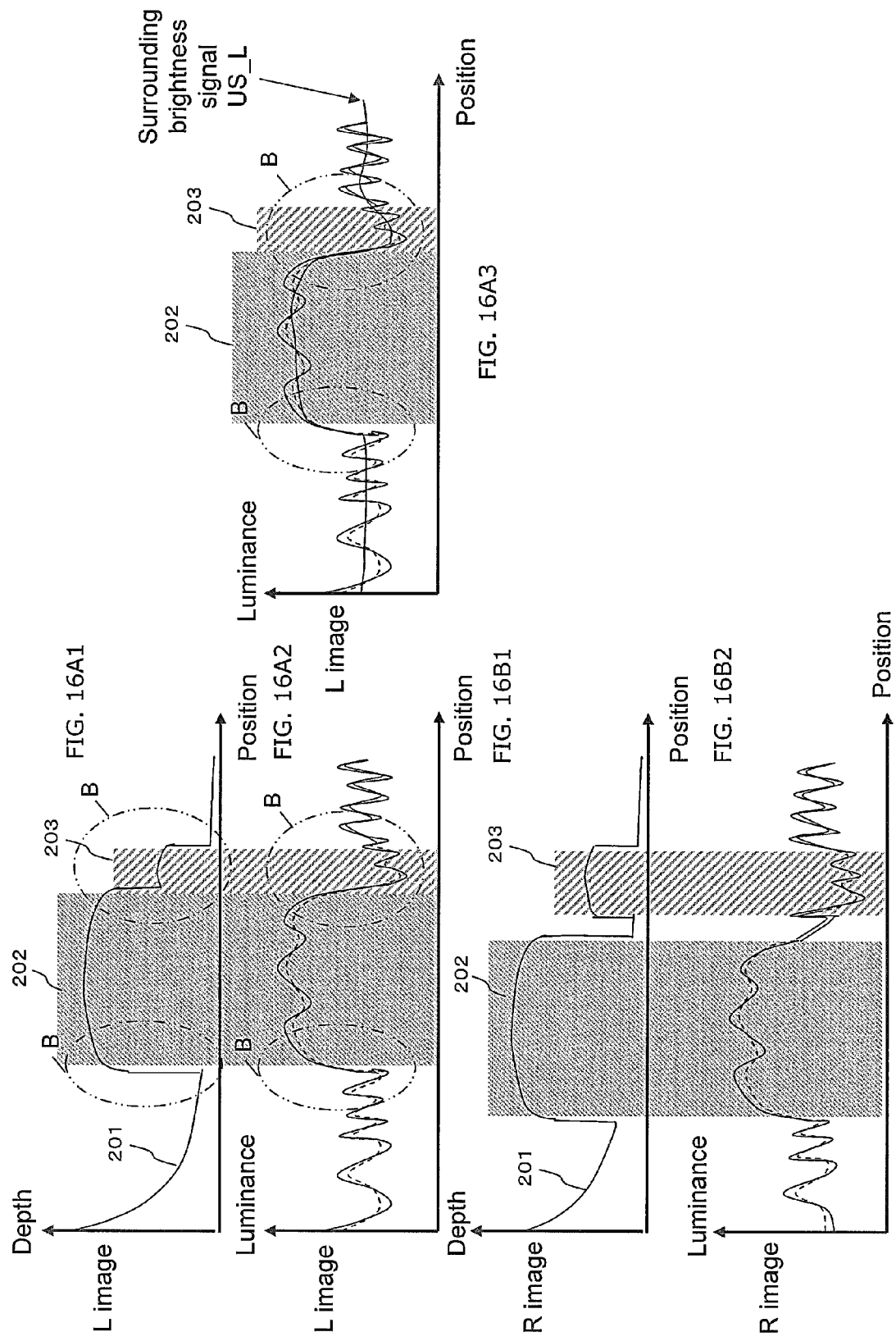

As is understood from a comparison of FIG. 8 (results of processing according to conventional technology) and FIG. 16 (results of processing by the three-dimensional imaging device of the present embodiment), the enhancement of contrast that accompanies a depth difference is suppressed in the area B in the FIG. 16 that has a large depth difference, compared with the area B in FIG. 8.

(Although FIG. 16A3 shows the surrounding brightness signal US_L superimposed on FIG. 16A2, the surrounding brightness signal US_L in FIG. 16A3 is a signal that has appropriate values in the area B, unlike the surrounding brightness signal US_L in FIG. 8C.)

In other words, with the three-dimensional imaging device of the present embodiment, in three-dimensional images, it is possible to appropriately prevent the image area in which the main subject 202 is formed from being subjected to the execution of contrast enhancement that is influenced by the contrast of the background at a different distance (subject distance). Also, with the three-dimensional imaging device of the present embodiment, it is possible to realize shade or shadow enhancement that is centered on contrast that is actually due to shade or shadow, and as a result, the three-dimensional images acquired by the three-dimensional imaging device of the present embodiment are three-dimensional images in which the natural shade or shadow enhancement is realized.

Third Embodiment

The first embodiment described a means for solving (method for solving) the problem that arises due to the cause (1) (the problem due to contrast enhancement being performed on the far scene likewise to the near scene) in which local contrast enhancement does not lead to natural shade or shadow enhancement.

Also, the second embodiment described a means for solving (method for solving) the problem that arises due to the cause (2) (the problem due to contrast enhancement being performed on the area between objects) in which local contrast enhancement does not lead to natural shade or shadow enhancement.

In order to naturally enhance three-dimensional appearance by natural shade or shadow enhancement, it is clear that it is best for a three-dimensional imaging device to include a configuration that realizes both the solving means (solving method) described in the first embodiment and the solving means (solving method) described in the second embodiment.

In order to achieve this, it is sufficient to replace the local tone conversion units 111 (111L and 111R) of the first embodiment shown in FIG. 2 with the second local tone conversion units 511 (511L and 511R) of the second embodiment. Note that in this case, the L depth information and the R depth information are input to the second local tone conversion units 511 (511L and 511R) used for replacement.

The three-dimensional imaging device of the present embodiment includes a configuration that realizes both the solving means (solving method) described in the first embodiment and the solving means (solving method) described in the second embodiment. The three-dimensional imaging device of the present embodiment has a configuration in which the local tone conversion units 111 (111L and 111R) of the first embodiment shown in FIG. 2 have been replaced with the second local tone conversion units 511 (511L and 511R) of the second embodiment, and the L depth information and the R depth information are input to the second local tone conversion units 511 (511L and 511R) used for replacement.

Figure 17:
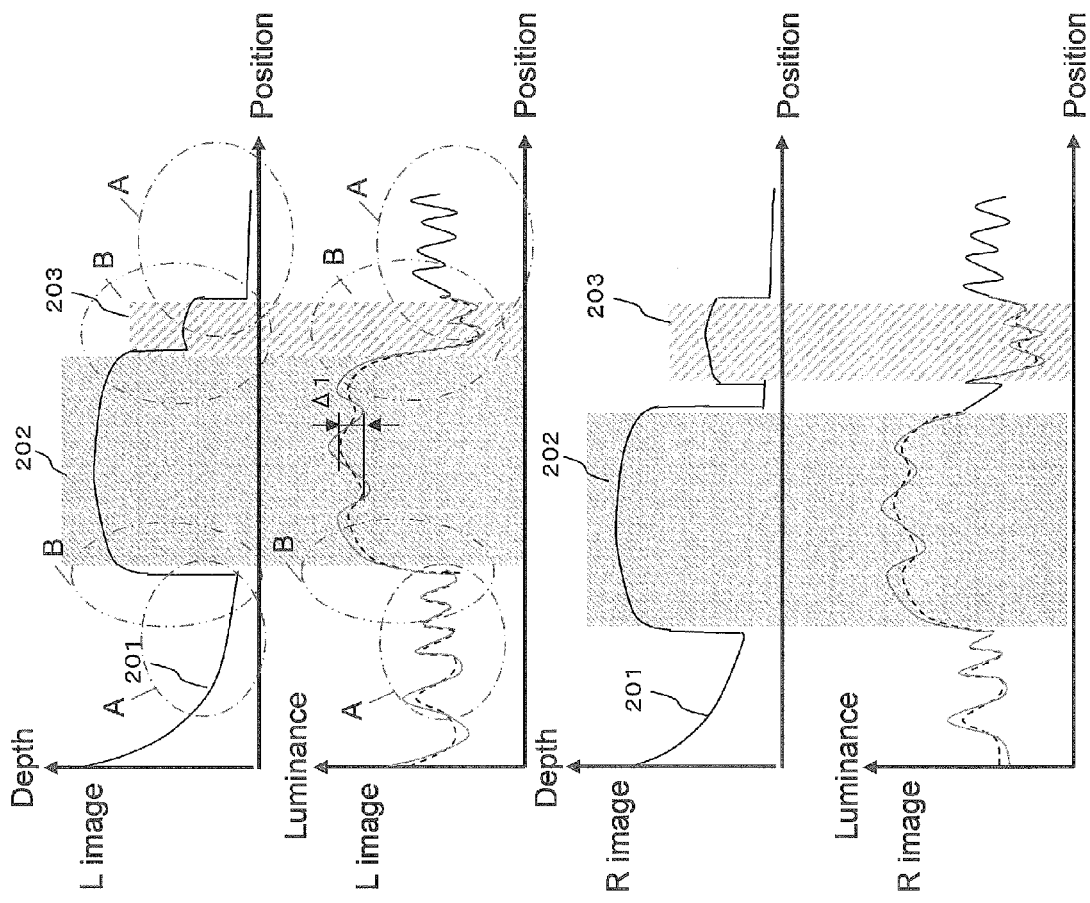
FIG. 17 shows processing results of an image correction unit according to a third embodiment.

FIG. 17 shows the results of processing performed by the three-dimensional imaging device of the third embodiment.

As is understood from FIG. 17, with the three-dimensional imaging device of the third embodiment, it is not only possible to (1) appropriately suppress local contrast enhancement in the far scene area (e.g., area A) in which the proportion of contrast occupied by shade or shadow is low, but also it is possible to (2) appropriately suppress contrast enhancement that accompanies a depth difference even in an area (area B or the like) that has a large depth difference.

Accordingly, with the three-dimensional imaging device of the third embodiment, it is possible to selectively (appropriately) enhance contrast arising from shade or shadow without enhancing contrast not arising from shade or shadow, thus making it possible to realize very natural shade or shadow enhancement. As a result, three-dimensional images acquired by the three-dimensional imaging device of the third embodiment are three-dimensional images in which very natural three-dimensional appearance enhancement is realized.

Fourth Embodiment

The following describes a fourth embodiment.

The present embodiment describes technology for realizing three-dimensional image processing for darkening shade or shadow.

Shade or shadow is enhanced in the technology in the above-described embodiments due to being technology for enhancing brightness contrast, but the brightness of portions other than shade or shadow is also enhanced.

The inventors of the present invention found that it is effective to enhance only shade or shadow portions in order to naturally enhance the three-dimensional appearance and sense of perspective in three-dimensional images (in order to realize natural three-dimensional appearance and sense of perspective).

In order to improve three-dimensional appearance, it is desirable to enhance shade or shadow in as natural a manner as possible. In order to increase the sense of height in three-dimensional appearance (recessions and projections), it is very natural and effective to enhance only the amount of shade or shadow that is due to recessions and projections on an object surface.

Since the technique for enhancing local contrast described in the previous embodiments is a technique for enhancing brightness contrast, shade or shadow is certainly enhanced, but portions other than shade or shadow is also enhanced. For example, since local light variations are enhanced in the technique for enhancing local contrast, not only shadows are enhanced, but also brightness is enhanced. Also, with the technique for enhancing local contrast, elements unrelated to shade or shadow such as color variations and light-dark variations (variations in reflectivity) on the object surface are also enhanced. For this reason, with three-dimensional images acquired using the technique for enhancing local contrast, shade or shadow does not appear to have been enhanced when viewed by a person, and there is a tendency for it to appear that merely the scene is overall sharper, rather than the three-dimensional appearance being increased.

In light of the above situation, the present embodiment describes three-dimensional image processing technology that can acquire three-dimensional images in which more natural three-dimensional appearance and sense of perspective are realized by selectively enhancing shade or shadow portions (by performing three-dimensional image processing for darkening shade or shadow).

Note that similarly to the above-described embodiments, the fourth embodiment is also described taking the example of a dual-lens three-dimensional imaging device (digital camera, video camera, or the like) as a three-dimensional image processing device. Note that the three-dimensional image processing device is not limited to being a dual-lens three-dimensional imaging device, and the three-dimensional image processing device may be a multi-view three-dimensional imaging device, for example.

The configuration of the three-dimensional imaging device of the fourth embodiment is similar to the configuration of the three-dimensional imaging device 1000 of the first embodiment.

The three-dimensional imaging device of the fourth embodiment has a configuration in which the local tone conversion units 111L and 111R of the image correction unit 104 in the three-dimensional imaging device 1000 of the first embodiment have been replaced with local tone conversion units 111AL and 111AR. The three-dimensional imaging device of the fourth embodiment is different from the three-dimensional imaging device 1000 of the first embodiment in this aspect. Other aspects of the three-dimensional imaging device of the fourth embodiment are similar to those of the three-dimensional imaging device of the first embodiment.

Accordingly, the following describes the configuration and processing content of the local tone conversion units 111AL and 111AR in the three-dimensional imaging device of the present embodiment.

Note that similarly to the first embodiment, processing with respect to an R image is similar to processing with respect to an L image, and therefore the following describes mainly L-image processing.

<4.1: Local Tone Conversion Unit 111AL>

Figure 18:
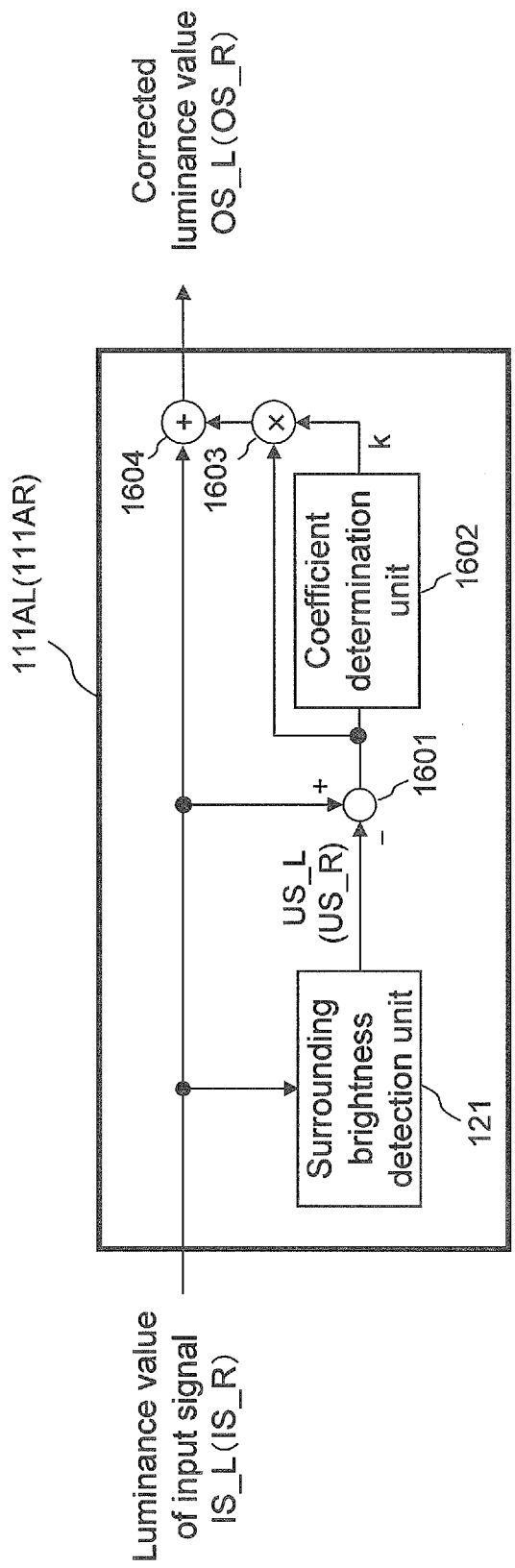
FIG. 18 is a configuration diagram of a local tone conversion unit according to a fourth embodiment.

As shown in FIG. 18, the local tone conversion unit 111AL includes the surrounding brightness detection unit 121, a subtractor 1601, a coefficient determination unit 1602, a multiplier 1603, and an adder 1604.

The surrounding brightness detection unit 121 is similar to the surrounding brightness detection unit 121 of the above-described embodiments. The surrounding brightness detection unit 121 receives the L image signal (luminance value IS_L of the L image signal) that was output from the image input unit 102 and can form an L image, and calculates a representative brightness value for an area surrounding the pixel of interest that corresponds to the luminance value IS_L of the L image signal (peripheral image area of the pixel of interest in the L image (processing target pixel in the L image)). For example, the surrounding brightness detection unit 121 calculates the average luminance value of all of the pixels included in the surrounding area. The surrounding brightness detection unit 121 then outputs the calculated representative brightness value for the peripheral image area of the pixel of interest to the subtractor 1601 as a surrounding brightness signal US_L.

The subtractor 1601 receives the luminance value IS_L of the L image signal and the surrounding brightness signal US_L, and performs subtraction processing corresponding to the following.

$$(IS\_L) - (US\_L)$$

The subtractor 1601 then outputs the difference signal ((IS_L)−(US_L)) acquired by the subtraction processing to the coefficient determination unit 1602 and the multiplier 1603.

The coefficient determination unit 1602 receives the difference signal ((IS_L)−(US_L)), and performs the following processing in accordance with the value of the difference signal.

(1) If the signal value of the difference signal ((IS_L)−(US_L)) is negative (if IS_L<US_L), k is set to k1, and the set coefficient k (=k1) is output to the multiplier 1603.

(2) If the signal value of the difference signal ((IS_L)−(US_L)) is not negative (if IS_L≥US_L), k is set to k2 (note that k2<k1), and the set coefficient k (=k2) is output to the multiplier 1603.

The multiplier 1603 receives the difference signal ((IS_L)−(US_L)) output from the surrounding brightness detection unit 121 and the coefficient k output from the coefficient determination unit 1602, and performs multiplication processing that corresponds to the following.

$$k \times ((IS\_L) - (US\_L))$$

The multiplier 1603 then outputs the multiplication signal (k×((IS_L)−(US_L))) acquired by the multiplication processing to the adder 1604.

The adder 1604 receives the luminance value IS_L of the L image signal and the multiplication signal (k×((IS_L)−(US_L))) output from the multiplier 1603, and acquires a corrected luminance value OS_L by adding the two together.

In other words, the adder 1604 acquires the corrected luminance value OS_L by performing processing that corresponds to the following.

$$OS\_L = IS\_L + k \times ((IS\_L) - (US\_L))$$

The following is performed in the local tone conversion unit 111AL.

(1) If the signal value of the difference signal ((IS_L)–(US_L)) is negative (if IS_L<US_L), the corrected luminance value OS_L is acquired by executing processing that corresponds to the following.

$$OS\_L = IS\_L + k1 \times ((IS\_L) - (US\_L))$$

(2) If the signal value of the difference signal ((IS_L)–(US_L)) is not negative (if IS_L≥US_L), the corrected luminance value OS_L is acquired by executing processing that corresponds to the following.

$$OS\_L = IS\_L + k2 \times ((IS\_L) - (US\_L))$$

(note that k2<k1)

In other words, in the above processing:

(1) if the brightness (luminance value) of the processing target pixel is darker than the brightness in the periphery of the processing target pixel (e.g., the average luminance value), the value of the coefficient k is set to the large value k1 (>k2), and the extent of unsharp masking enhancement is increased, and (2) if the brightness (luminance value) of the processing target pixel is brighter than the brightness in the periphery of the processing target pixel (e.g., the average luminance value), the value of the coefficient k is set to the small value k2 (<k1), and the extent of unsharp masking enhancement is decreased.

Accordingly, it is possible to realize image processing for darkening shade or shadow in the three-dimensional image processing device of the present embodiment.

Specifically, in the three-dimensional image processing device of the present embodiment, if the brightness (luminance value) of the processing target pixel is darker than the brightness in the periphery of the processing target pixel (e.g., the average luminance value), the value of the coefficient k is set to the large value k1 (>k2), and therefore there is an increase in the amount that is added to the amount of variation ((IS_L)–(US_L)) in the image area that includes the processing target pixel. The extent of unsharp masking enhancement therefore increases. As a result, the shade or shadow portion of the three-dimensional images is enhanced (three-dimensional image processing is executed such that shade or shadow becomes darker). (In the L-image correction unit 104L of the three-dimensional image processing device of the present embodiment, processing is executed using the corrected luminance value OS_L in which the shade or shadow portion is enhanced, and therefore the shade or shadow portion in the three-dimensional image is enhanced.)

On the other hand, in the three-dimensional image processing device of the present embodiment, if the brightness (luminance value) of the processing target pixel is brighter than the brightness in the periphery of the processing target pixel (e.g., the average luminance value), the value of the coefficient k is set to the small value k2 (<k1), and therefore there is a decrease in the amount that is added to the amount of variation ((IS_L)–(US_L)) in the image area that includes the processing target pixel. The extent of unsharp masking enhancement therefore decreases (the effect of the unsharp masking decreases). As a result, portions other than shade or shadow in the three-dimensional image (e.g., bright portions) are not enhanced very much.

Note that in case (2) of the above processing, the effect of the unsharp masking can be set to "none" by setting the value of the coefficient k to "0". Specifically, in this case, unsharp masking processing is executed only if the brightness (luminance value) of the processing target pixel is darker than the brightness in the periphery of the processing target pixel (e.g., the average luminance value), and only processing for darkening the pixel value of the processing target pixel is executed (processing for enhancing the shade or shadow portion is executed) in the three-dimensional image processing device of the present embodiment.

Figure 19:
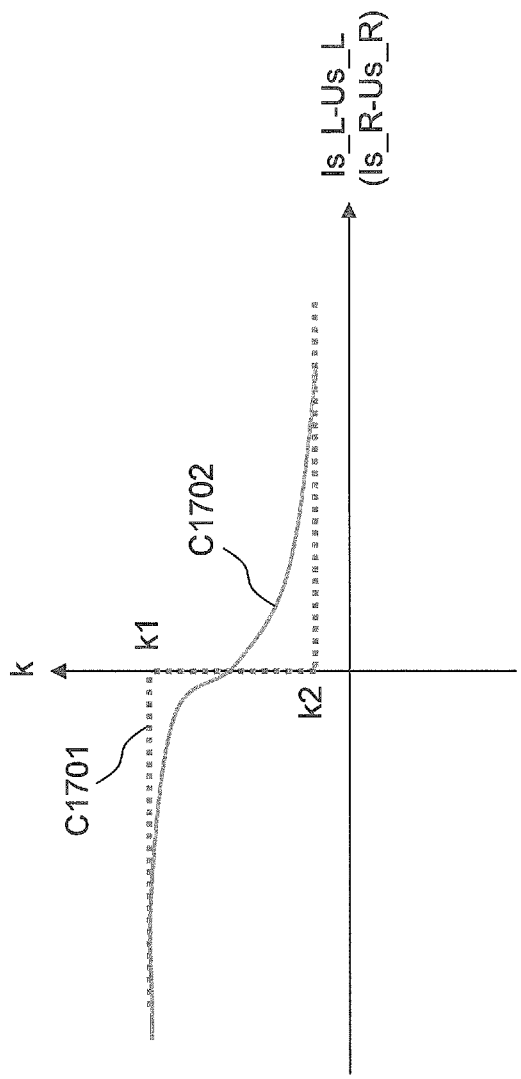
FIG. 19 is a diagram showing a relationship between (characteristics of) a coefficient k and a difference signal (IS_L−US_L).

Note that although the coefficient k is determined by the coefficient determination unit 1602 according to a characteristic C1701 shown in FIG. 19 in the above processing, there is no limitation to this, and the coefficient determination unit 1602 may determine the coefficient k according to a characteristic C1702 shown in FIG. 19 for example (the coefficient k may be varied in a continuous manner according to variation in the difference signal value (IS_L–US_L)). If the coefficient determination unit 1602 determines the coefficient k according to the characteristic C1702 shown in FIG. 19, the coefficient k varies in a continuous manner according to variation in the difference signal value (IS_L–US_L), and therefore three-dimensional images with more natural image quality can be acquired in the three-dimensional image processing device of the present embodiment.

As described above, it is possible to realize image processing for darkening shade or shadow with the three-dimensional image processing device of the present embodiment. Accordingly, three-dimensional images acquired by the three-dimensional image processing device of the present embodiment are three-dimensional images in which the shade or shadow portion is selectively enhanced. As a result, the three-dimensional images acquired by the three-dimensional image processing device of the present embodiment are three-dimensional images that reproduce more natural three-dimensional appearance and sense of perspective.

Also, similarly to the three-dimensional image processing device of the first embodiment, with the three-dimensional image processing device of the present embodiment, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

<<First Variation (Fourth Embodiment)>>

The following describes a first variation of the present embodiment.

Figure 20:
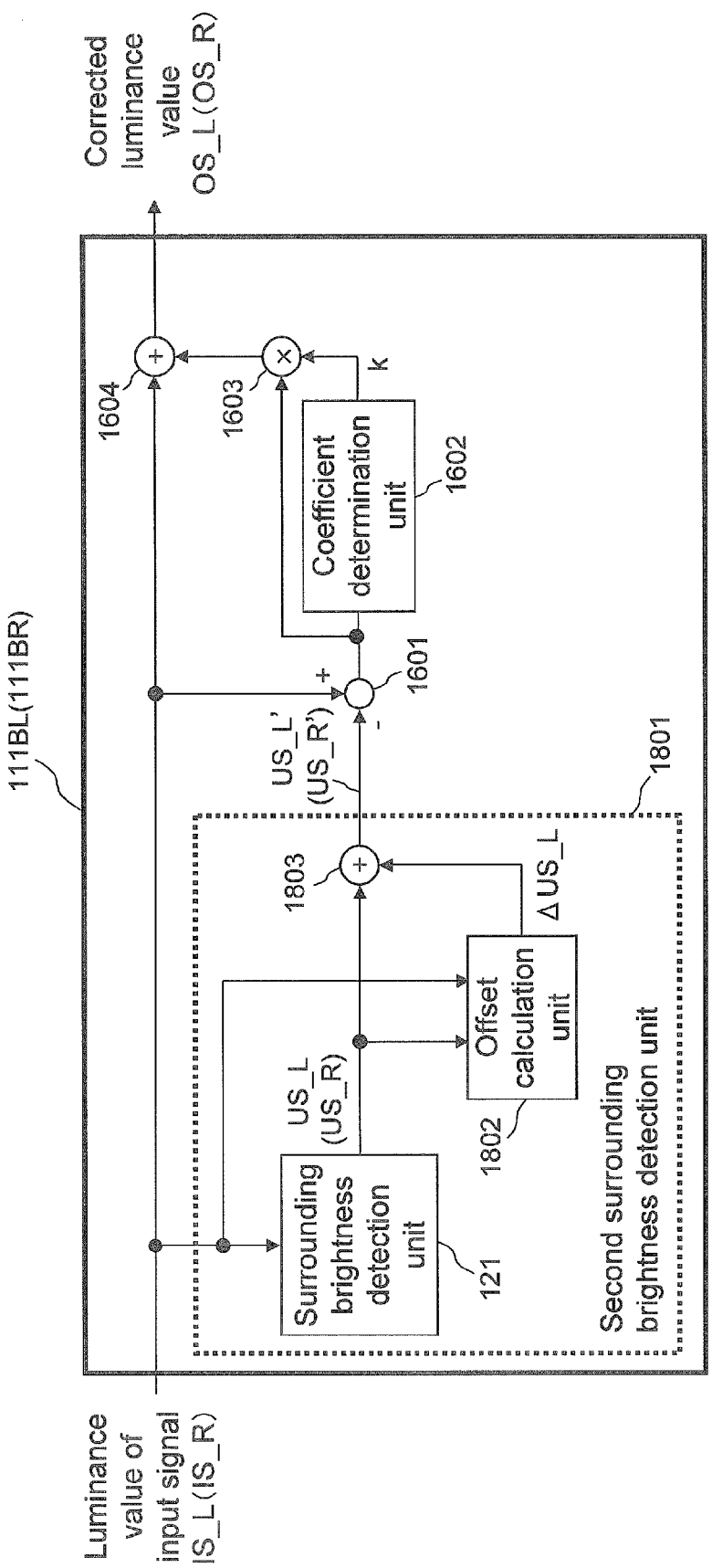
FIG. 20 is a configuration diagram of a local tone conversion unit according to a first variation of the fourth embodiment.

The three-dimensional imaging device of the present variation has a configuration in which the local tone conversion units 111AL and 111AR in the three-dimensional imaging device of the fourth embodiment have been replaced with local tone conversion units 111BL and 111BR shown in FIG. 20. More specifically, the three-dimensional imaging device of the present variation has a configuration in which the surrounding brightness detection unit 121 of the local tone conversion units 111AL and 111AR in the three-dimensional imaging device of the fourth embodiment have been replaced with a second surrounding brightness detection unit 1801 shown in FIG. 20.

Other aspects of the three-dimensional imaging device of the present variation are similar to those of the three-dimensional imaging device of the fourth embodiment.

Accordingly, the following describes the configuration and processing content of the local tone conversion units 111BL and 111BR in the three-dimensional imaging device of the present variation.

Note that similarly to the first embodiment, processing with respect to an R image is similar to processing with respect to an L image, and therefore the following describes mainly L-image processing.

Also, portions that are similar to those of the above embodiments will be indicated by the same reference signs, and will not be described in detail.

<4.2: Local Tone Conversion Unit 111BL>

As shown in FIG. 20, the local tone conversion unit 111BL includes a second surrounding brightness detection unit 1801, the subtractor 1601, the coefficient determination unit 1602, the multiplier 1603, and the adder 1604.

The subtractor 1601, the coefficient determination unit 1602, the multiplier 1603, and the adder 1604 are similar to those of the fourth embodiment.

As shown in FIG. 20, the second surrounding brightness detection unit 1801 includes the surrounding brightness detection unit 121, an offset calculation unit 1802, and an adder 1803.

The surrounding brightness detection unit 121 shown in FIG. 20 is similar to the surrounding brightness detection unit 121 shown in FIG. 18.

The offset calculation unit 1802 receives the luminance value IS_L of the L image signal and the surrounding brightness signal US_L output from the surrounding brightness detection unit 121, and calculates an offset value ΔUS_L from the luminance value IS_L of the L image signal and the surrounding brightness signal US_L. The offset calculation unit 1802 outputs the calculated offset value ΔUS_L to the adder 1803.

The offset calculation unit 1802 calculates the offset value ΔUS_L as described below, for example.

(A) Average Absolute Difference Value

Letting N (N being a natural number) be the sample number, the offset calculation unit 1802 calculates the average absolute difference value between the luminance value IS_L of the L image signal and the surrounding brightness signal US_L. The offset calculation unit 1802 then uses the calculated average value as the offset value ΔUS_L. Specifically, the offset calculation unit 1802 calculates the offset value ΔUS_L using processing that corresponds to Expression 3 below (N being the sample number (N being a natural number)). Note that in order to facilitate use in later signal processing, the range of the offset value may be adjusted according to a coefficient c1 when obtaining the offset value ΔUS_L as shown in Expression 3 below. Also, Expression 3 below represents a general function in which there is no distinction between L-image processing and R-image processing. Specifically, in Expression 3 below, in the case of L-image processing, ΔUS=ΔUS_L, IS=IS_L, and US=US_L, and in the case of R-image processing, ΔUS=ΔUS_R, IS=IS_R, and US=US_R (the same follows for Expression 4 and Expression 5 below).

$$\Delta us = c_1 \frac{1}{N} \Sigma |Is - Us| \qquad [\text{Exp. 3}]$$

(B) Variance Value

Letting N (N being a natural number) be the sample number, the offset calculation unit 1802 calculates the variance value between the luminance value IS_L of the L image signal and the surrounding brightness signal US_L. The offset calculation unit 1802 then uses the calculated variance value as the offset value ΔUS_L. Specifically, the offset calculation unit 1802 calculates the offset value ΔUS_L using processing that corresponds to Expression 4 below (N being the sample number (N being a natural number)). Note that in order to facilitate use in later signal processing, the range of the offset value may be adjusted according to a coefficient c2 when obtaining the offset value ΔUS_L as shown in Expression 4 below.

$$\Delta us = c_2 \frac{1}{N} \Sigma (Is - Us)^2 \qquad [\text{Exp. 4}]$$

(C) Standard Deviation Value

Letting N (N being a natural number) be the sample number, the offset calculation unit 1802 calculates the standard deviation value between the luminance value IS_L of the L image signal and the surrounding brightness signal US_L. The offset calculation unit 1802 then uses the calculated standard deviation value as the offset value ΔUS_L. Specifically, the offset calculation unit 1802 calculates the offset value ΔUS_L using processing that corresponds to Expression 5 below (N being the sample number (N being a natural number)). Note that in order to facilitate use in later signal processing, the range of the offset value may be adjusted according to a coefficient c3 when obtaining the offset value ΔUS_L as shown in Expression 5 below.

$$\Delta us = c_3 \frac{1}{N} \sqrt{\Sigma (Is - Us)^2} \qquad [\text{Exp. 5}]$$

Note that it is preferable that the sampling targets (N sampling targets) in the calculation processing in Expressions 3 to 5 above are N pixels in the vicinity of the processing target pixel in the image area.

The adder 1803 receives the surrounding brightness signal US_L output from the surrounding brightness detection unit 121 and the offset value ΔUS_L output from the offset calculation unit 1802, and adds together the surrounding brightness signal US_L and the offset value ΔUS_L. The adder 1803 then outputs the addition result (US_L+ΔUS_L) to the subtractor 1601 as a corrected surrounding brightness signal US_L'.

The corrected surrounding brightness signal US_L' acquired in this way has the following characteristics:

(1) has a value similar to that of the surrounding brightness signal US_L in a portion (image area) in which there is little variation in the luminance value IS_L of the L image signal, and (2) has a higher value (higher signal value) than the surrounding brightness signal US_L in a portion (image area) in which there is a large amount of variation in the luminance value IS_L of the L image signal.

Figure 21A:
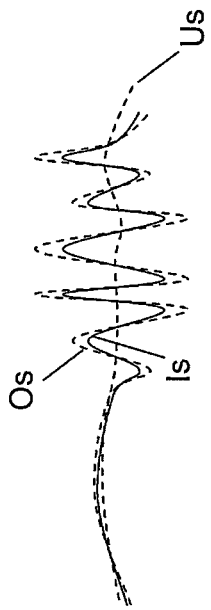
FIG. 21A is a signal waveform diagram (an example thereof) showing a luminance value IS_L (waveform Is) of an L image signal, a surrounding brightness signal US_L (waveform Us), and a corrected luminance value OS_L (waveform Os) obtained by performing local tone conversion processing (contrast enhancement processing).
Figure 21B:
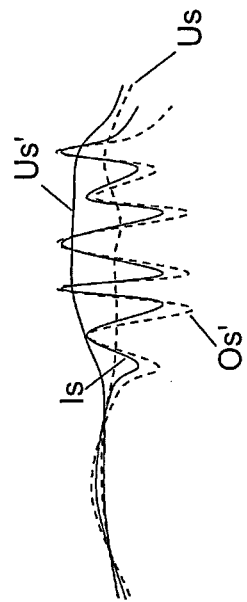
FIG. 21B is a signal waveform diagram (an example thereof) showing a luminance value IS_L (waveform Is) of an L image signal, a corrected surrounding brightness signal US_L' (waveform Us'), and a corrected luminance value OS_L (waveform Os') obtained by performing local tone conversion processing (contrast enhancement processing).

For example, as shown in FIG. 21B, if the luminance value IS_L of the L image signal has a waveform Is shown in FIG. 21B, the corrected surrounding brightness signal US_L' has a waveform Us'. As is understood from FIG. 21B, the corrected surrounding brightness signal US_L' (waveform Us') has the following characteristics:

(1) has a value similar to that of the surrounding brightness signal US_L (waveform Us) in a portion (image area) in which there is little variation in the luminance value IS_L (waveform Is) of the L image signal, and (2) has a higher value (higher signal value) than the surrounding brightness signal US_L (waveform Us) in a portion (image area) in which there is a large amount of variation in the luminance value IS_L (waveform Is) of the L image signal.

In the three-dimensional imaging device of the present variation, processing similar to the processing in the fourth embodiment is then performed using the corrected surrounding brightness signal US_L'.

Specifically, the following is performed in the local tone conversion unit 111BL of the present variation.

(1) If the signal value of the difference signal ((IS_L)−(US_L')) is negative (if IS_L<US_L'), the corrected luminance value OS_L is acquired by executing processing that corresponds to the following.

$$OS\_L = IS\_L + k1 \times ((IS\_L) - (US\_L'))$$

(2) If the signal value of the difference signal ((IS_L)−(US_L')) is not negative (if IS_L≥US_L'), the corrected luminance value OS_L is acquired by executing processing that corresponds to the following.

$$OS\_L = IS\_L + k2 \times ((IS\_L) - (US\_L'))$$

(note that k2<k1)

In other words, in the above processing:

(1) if the brightness (luminance value) of the processing target pixel is darker than the brightness determined by the corrected surrounding brightness signal US_L', the value of the coefficient k is set to the large value k1 (>k2), and the extent of unsharp masking enhancement is increased, and (2) if the brightness (luminance value) of the processing target pixel is brighter than the brightness determined by the corrected surrounding brightness signal US_L', the value of the coefficient k is set to the small value k2 (<k1), and the extent of unsharp masking enhancement is decreased.

Accordingly, image processing for darkening shade or shadow can be realized in the three-dimensional image processing device of the present variation.

Note that in case (2) of the above processing, the effect of the unsharp masking can be set to "none" by setting the value of the coefficient k to "0". Specifically, in this case, unsharp masking processing is executed only if the brightness (luminance value) of the processing target pixel is darker than the brightness determined by the corrected surrounding brightness signal US_L', and only processing for darkening the pixel value of the processing target pixel is executed (processing for enhancing the shade or shadow portion is executed) in the three-dimensional image processing device of the present variation.

Figure 22:
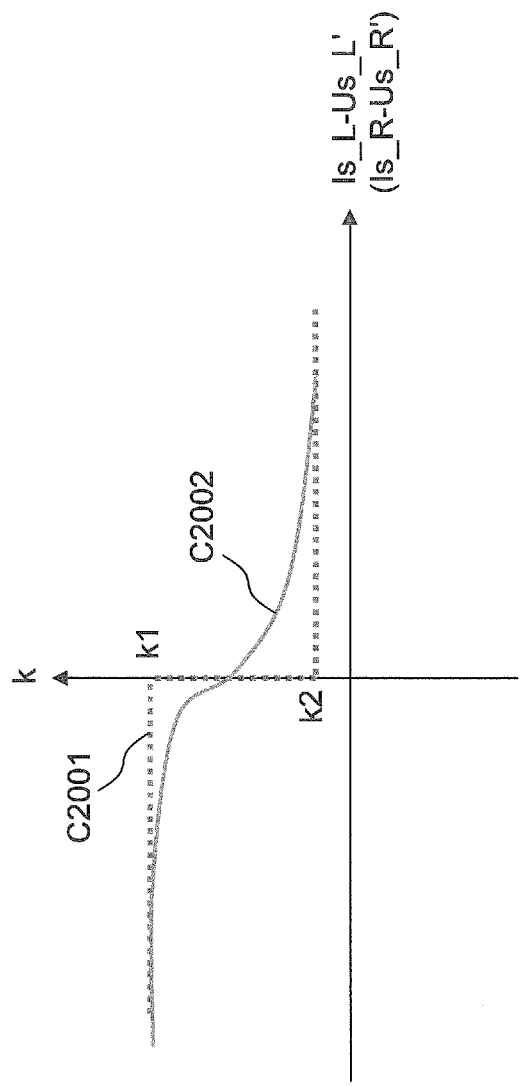
FIG. 22 is a diagram showing a relationship between (characteristics of) a coefficient k and a difference signal (IS_L−US_L').

Note that although the coefficient k is determined by the coefficient determination unit 1602 according to a characteristic C2001 shown in FIG. 22 in the above processing, there is no limitation to this, and the coefficient determination unit 1602 may determine the coefficient k according to a characteristic C2002 shown in FIG. 22 for example (the coefficient k may be varied in a continuous manner according to variation in the value of the difference signal (IS_L−US_L'). If the coefficient determination unit 1602 determines the coefficient k according to the characteristic C2002 shown in FIG. 22, the coefficient k varies in a continuous manner according to variation in the difference signal value (IS_L−US_L'), and therefore three-dimensional images with more natural image quality can be acquired in the three-dimensional image processing device of the present variation.

The following describes the corrected luminance value OS_L acquired by the three-dimensional image processing device of the present variation with reference to FIG. 21.

FIG. 21A shows the luminance value IS_L (waveform Is) of the L image signal, the surrounding brightness signal US_L (waveform Us), and the corrected luminance value OS_L (waveform Os) acquired by performing local tone conversion processing (contrast enhancement processing).

FIG. 21B shows the luminance value IS_L (waveform Is) of the L image signal, the corrected surrounding brightness signal US_L' (waveform Us'), and the corrected luminance value OS_L (waveform Os') acquired by performing local tone conversion processing (contrast enhancement processing). In other words, FIG. 21B shows an example of a signal waveform obtained by the three-dimensional image processing device of the present variation.

As is understood from FIG. 21, with the three-dimensional image processing device of the present variation, the signal value of the corrected surrounding brightness signal US_L' (waveform Us') is higher in the portion in which there is a large amount of variation in the luminance value IS_L (waveform Is) of the L image signal, and therefore there is a rise in the extent of enhancement in unsharp masking processing performed on the luminance value IS_L (waveform Is) of the L image signal that has a signal value lower than the signal value of the corrected surrounding brightness signal US_L'. As a result, as shown in FIG. 21B, processing for darkening (processing for lowering the tone value) is executed in the portion in which there is a large amount of variation in the luminance value IS_L (waveform Is) of the L image signal. Accordingly, with the three-dimensional image processing device of the present variation, it is possible to, for example, effectively enhance a shade or shadow portion in a detailed portion of an object (it is possible to effectively darken shade or shadow of the detailed portion).

As described above, the three-dimensional image processing device of the present variation enables realizing image processing for effectively darkening shade or shadow in a detailed portion or the like of an object by using the corrected surrounding brightness signal US_L'. Accordingly, three-dimensional images acquired by the three-dimensional imaging device (three-dimensional image processing device) of the present variation are three-dimensional images in which the shade or shadow portion is selectively enhanced. As a result, the three-dimensional images acquired by the three-dimensional imaging device (three-dimensional image processing device) of the present variation are three-dimensional images that reproduce more natural three-dimensional appearance and sense of perspective.

Also, similarly to the three-dimensional image processing device of the first embodiment, with the three-dimensional image processing device of the present variation, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

<<Second Variation (Fourth Embodiment)>>

The following describes a second variation of the present embodiment.

Figure 23:
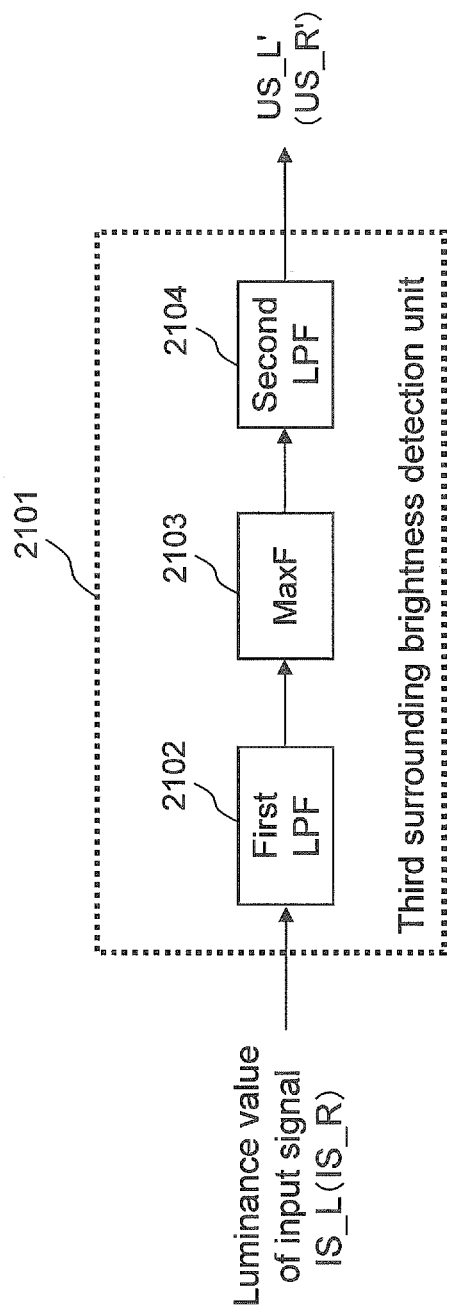
FIG. 23 is a configuration diagram of a local tone conversion unit according to a second variation of the fourth embodiment.

The three-dimensional imaging device of the present variation has a configuration in which the second surrounding brightness detection unit 1801 of the three-dimensional imaging device of the first variation of the fourth embodiment is replaced with a third surrounding brightness detection unit 2101 shown in FIG. 23.

Other aspects of the three-dimensional imaging device of the present variation are similar to those of the three-dimensional imaging device of the first variation of the fourth embodiment.

Accordingly, the following describes the configuration and processing content of the third surrounding brightness detection unit 2101 in the three-dimensional imaging device of the present variation.

Note that similarly to the above embodiments, processing with respect to an R image is similar to processing with respect to an L image, and therefore the following describes mainly L-image processing.

Also, portions that are similar to those of the above embodiments will be indicated by the same reference signs, and will not be described in detail.

<4.3: Third Surrounding Brightness Detection Unit 2101>

In the third surrounding brightness detection unit 2101, unlike the second surrounding brightness detection unit 1801, a corrected surrounding brightness signal US_L' that has a high signal value is acquired in a portion in which there is a large amount of variation in the luminance value IS_L of the L image signal without using the surrounding brightness signal US_L.

As shown in FIG. 23, the third surrounding brightness detection unit 2101 includes a first lowpass filter 2102, a max filter 2103, and a second lowpass filter 2104.

The first lowpass filter 2102 receives the luminance value IS_L of the L image signal, and executes filter processing (lowpass filter processing) for removing a fine noise component (high frequency noise component) from the received luminance value IS_L of the L image signal. The first lowpass filter 2102 then outputs the L image signal resulting from the filter processing to the max filter 2103.

The max filter 2103 receives the output from the first lowpass filter 2102, and executes max filter processing. Specifically, the max filter 2103 detects the highest pixel value among the processing target pixel and N (N being a natural number) peripheral pixels (sample points) in the vicinity of the processing target pixel in the output from the first lowpass filter 2102 (the L image signal resulting from the lowpass filter processing). The max filter 2103 then outputs the detected highest value to the second lowpass filter 2104.

The second lowpass filter 2104 receives the output from the max filter 2103, and performs lowpass filter processing on the received signal. The lowpass filter processing in the second lowpass filter 2104 is processing for removing an unnecessary high frequency component in the output from the max filter 2103. The second lowpass filter 2104 then outputs the signal resulting from the lowpass filter processing as the corrected surrounding brightness signal US_L'.

As described above, in the third surrounding brightness detection unit 2101, the highest value in a predetermined filter range (filter range determined by the processing target pixel and peripheral pixels thereof) is detected in the signal resulting from the removal of a fine noise component (output signal of the first lowpass filter 2102), and acquires a signal whose signal value is the highest value (output signal of the max filter 2103). The third surrounding brightness detection unit 2101 then acquires the corrected surrounding brightness signal US_L' by removing an unnecessary high frequency component from the output signal of the max filter 2103.

Accordingly, the third surrounding brightness detection unit 2101 can acquire a corrected surrounding brightness signal US_L' that has a high signal value in a portion in which there is a large amount of variation in the luminance value IS_L of the L image signal by using only the luminance value IS_L of the L image signal, and without using the surrounding brightness signal US_L.

The three-dimensional imaging device of the present variation enables realizing image processing for effectively darkening shade or shadow in a detailed portion or the like of an object, similarly to the first variation of the fourth embodiment, by using the corrected surrounding brightness signal US_L' acquired by the third surrounding brightness detection unit 2101. Accordingly, three-dimensional images acquired by the three-dimensional imaging device (three-dimensional image processing device) of the present variation are three-dimensional images in which the shade or shadow portion is selectively enhanced. As a result, the three-dimensional images acquired by the three-dimensional imaging device (three-dimensional image processing device) of the present variation are three-dimensional images that reproduce more natural three-dimensional appearance and sense of perspective.

Also, similarly to the three-dimensional image processing device of the first embodiment, with the three-dimensional image processing device of the present variation, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

Fifth Embodiment

The following describes a fifth embodiment.

The present embodiment also describes technology for realizing three-dimensional image processing for darkening shade or shadow.

Note that similarly to the above-described embodiments, the fifth embodiment is also described taking the example of a dual-lens three-dimensional imaging device (digital camera, video camera, or the like) as a three-dimensional image processing device. Note that the three-dimensional image processing device is not limited to being a dual-lens three-dimensional imaging device, and the three-dimensional image processing device may be a multi-view three-dimensional imaging device, for example.

The configuration of the three-dimensional imaging device of the fifth embodiment is similar to the configuration of the three-dimensional imaging device 1000 of the first embodiment.

Figure 24:
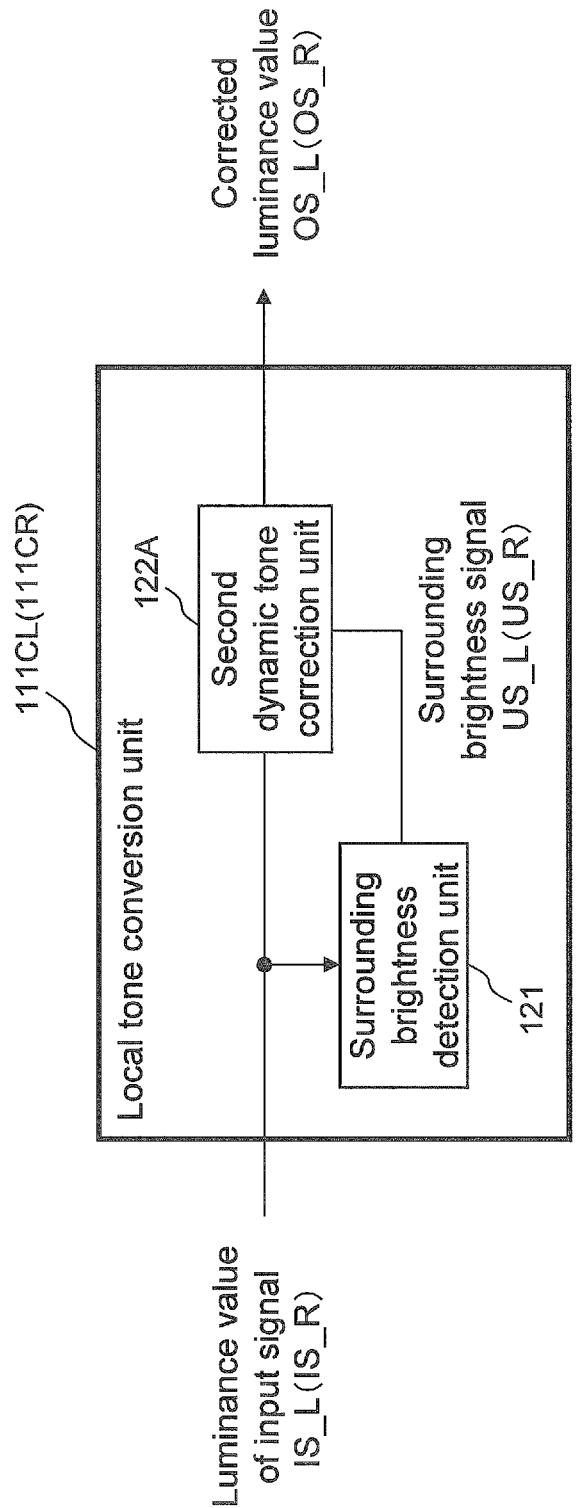
FIG. 24 is a configuration diagram of a local tone conversion unit according to a fifth embodiment.

The three-dimensional imaging device of the fifth embodiment has a configuration in which the local tone conversion units 111L and 111R of the image correction unit 104 in the three-dimensional imaging device 1000 of the first embodiment have been replaced with local tone conversion units 111CL and 111CR shown in FIG. 24. The three-dimensional imaging device of the fifth embodiment is different from the three-dimensional imaging device 1000 of the first embodiment in this aspect. Other aspects of the three-dimensional imaging device of the fifth embodiment are similar to those of the three-dimensional imaging device of the first embodiment.

Accordingly, the following describes the configuration and processing content of the local tone conversion units 111CL and 111CR in the three-dimensional imaging device of the present embodiment.

Note that similarly to the first embodiment, processing with respect to an R image is similar to processing with respect to an L image, and therefore the following describes mainly L-image processing.

Also, portions that are similar to those of the above embodiments will be indicated by the same reference signs, and will not be described in detail.

<5.1: Local Tone Conversion Unit 111CL>

As shown in FIG. 24, the local tone conversion unit 111CL includes the surrounding brightness detection unit 121 and a second dynamic tone correction unit 122A.

The surrounding brightness detection unit 121 is similar to the surrounding brightness detection unit 121 of the above-described embodiments. The surrounding brightness detection unit 121 receives the L image signal (luminance value IS_L of the L image signal) that was output from the image input unit 102 and can form an L image, and calculates a representative brightness value for an area surrounding the pixel of interest that corresponds to the luminance value IS_L of the L image signal (peripheral image area of the pixel of interest in the L image (processing target pixel in the L image)). For example, the surrounding brightness detection unit 121 calculates the average luminance value of all of the pixels included in the surrounding area. The surrounding brightness detection unit 121 then outputs the calculated representative brightness value for the peripheral image area of the pixel of interest to the second dynamic tone correction unit 122A as a surrounding brightness signal US_L.

The second dynamic tone correction unit 122A receives the L image signal (luminance value IS_L of the L image signal) that was output from the image input unit 102 and can form an L image, and also the surrounding brightness signal US_L that was output from the surrounding brightness detection unit 121. The second dynamic tone correction unit 122A performs tone conversion processing on the luminance value IS_L of the L image signal using a tone conversion characteristic that is determined based on the value of the surrounding brightness signal US_L. Examples of tone conversion characteristics of the second dynamic tone correction unit 122A are shown in FIG. 25.

Figure 25:
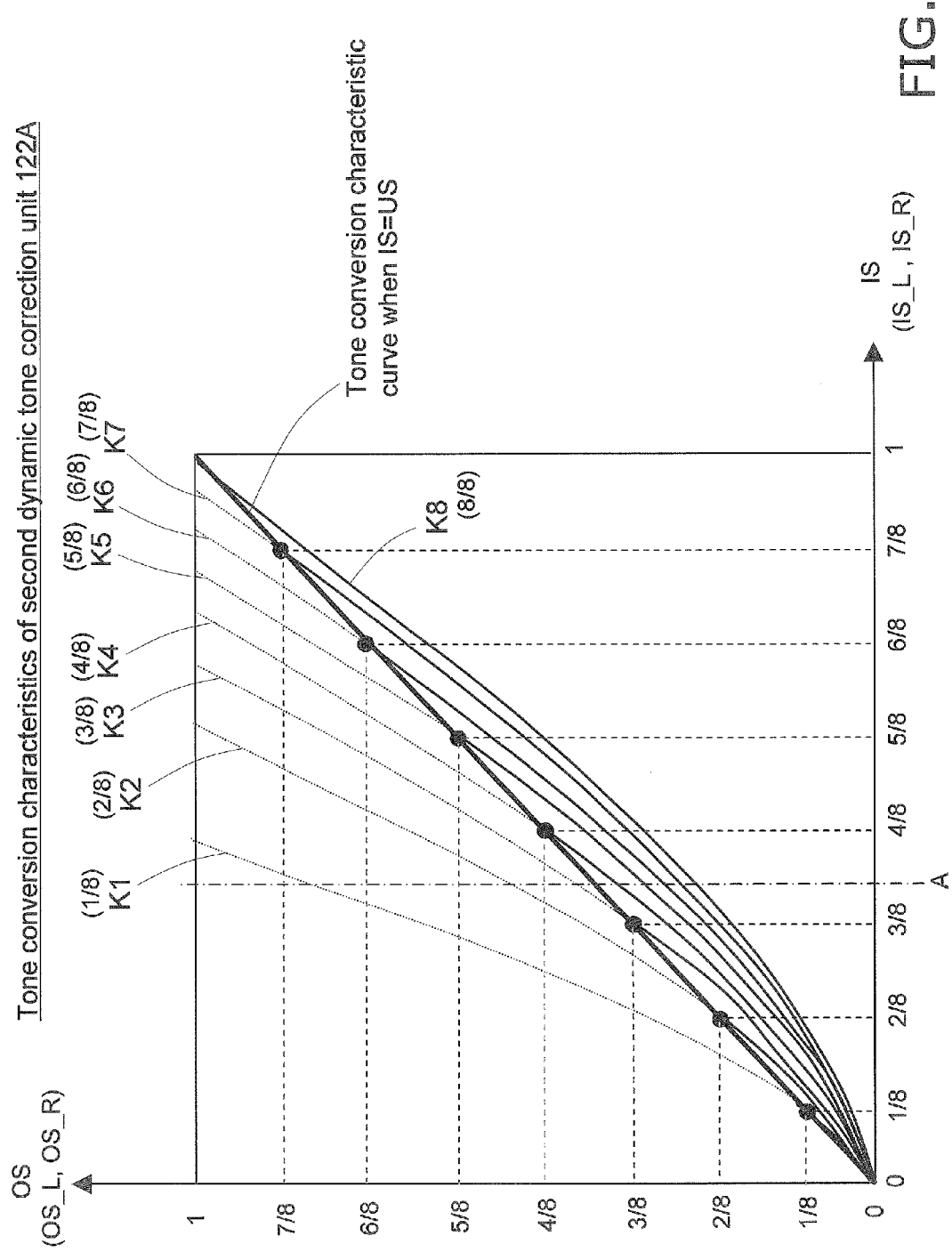
FIG. 25 is a graph showing tone conversion characteristics of a second dynamic tone correction unit according to the fifth embodiment.

The tone conversion characteristics in FIG. 25 are similar to the tone conversion characteristics in FIG. 4, but differ from the tone conversion characteristics in FIG. 4 in that when the input value IS is higher than the surrounding brightness signal value US, the input value IS is used, as is, as the output value OS.

Similarly to FIG. 4, FIG. 25 is a graph of tone conversion characteristic curves K1 to K8 that are determined by the value of the surrounding brightness signal US_L (or US_L), the value of an IS signal that is the input signal (luminance value IS_L of the L image signal or luminance value IS_R of the R image signal) being plotted on the horizontal axis, and the value of an OS signal that is the output signal (tone-converted luminance value OS_L of the L image signal or tone-converted luminance value OS_R of the R image signal) being plotted on the vertical axis.

Note that unlike the tone conversion characteristic in FIG. 4, the tone conversion characteristics in FIG. 25 are determined by the curves indicated by solid lines. Specifically, the tone conversion characteristics are determined by the tone conversion characteristic curves Kn (n being an integer from 1 to 8) only if the IS signal value is less than or equal to the surrounding brightness signal value US. If the IS signal value is higher than the surrounding brightness signal value US, the IS signal value, which is the input value, is used, as is, as the output value OS without performing tone conversion.

Due to the second dynamic tone correction unit 122A performing tone conversion using the tone conversion characteristics shown in FIG. 25, local contrast is enhanced only if the IS signal value is less than or equal to the surrounding brightness signal value US, that is to say, only if the processing target pixel is darker than the pixels in its periphery. This enables realizing tone conversion for darkening shade or shadow.

As described above, the second dynamic tone correction unit 122A acquires the OS signal (tone-converted luminance value OS_L of the L image signal or tone-converted luminance value OS_R of the R image signal) by performing dynamic tone correction processing on the IS signal (luminance value IS_L of the L image signal or luminance value IS_R of the R image signal) using tone conversion characteristics such as those shown in FIG. 25. The second dynamic tone correction unit 122A then outputs the OS signal (tone-converted luminance value OS_L of the L image signal or tone-converted luminance value OS_R of the R image signal) to the composition unit 113L (to the composition unit 113R in the case of the R image signal).

Note that the tone conversion characteristics used in the tone conversion processing performed by the second dynamic tone correction unit 122A are not limited to the tone conversion characteristics shown in FIG. 25, and may be other tone conversion characteristics as long as they enable darkening shade or shadow. For example, the second dynamic tone correction unit 122A may tone conversion processing using tone conversion characteristics according to which the extent of local contrast enhancement is lowered if the input value IS is higher than the surrounding brightness signal value US. For example, the second dynamic tone correction unit 122A may perform tone conversion processing using tone conversion characteristics determined by curves obtained by reducing the slopes of the dashed lines of the tone conversion characteristic curves K1 to K8 in FIG. 25. Performing tone conversion processing using these tone conversion characteristics enables realizing tone conversion for darkening shade or shadow while keeping a low extent of local contrast enhancement for a pixel that is brighter than the surrounding brightness.

As described above, with the three-dimensional imaging device (three-dimensional image processing device) of the present embodiment, the second dynamic tone correction unit 122A executes tone conversion processing using the tone conversion characteristics shown in FIG. 25 for example, and therefore local contrast is enhanced only if the IS signal value is less than or equal to the surrounding brightness signal value US, that is to say, only if the processing target pixel is darker than the pixels in the periphery thereof. This enables realizing tone conversion for darkening shade or shadow in the three-dimensional imaging device (three-dimensional image processing device) of the present embodiment. Accordingly, three-dimensional images acquired by the three-dimensional image processing device of the present embodiment are three-dimensional images in which the shade or shadow portion is selectively enhanced. As a result, the three-dimensional images acquired by the three-dimensional image processing device of the present embodiment are three-dimensional images that reproduce more natural three-dimensional appearance and sense of perspective.

Also, similarly to the three-dimensional image processing device of the first embodiment, with the three-dimensional image processing device of the present embodiment, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

<<First Variation (Fifth Embodiment)>>

The following describes a first variation of the present embodiment.

Figure 26:
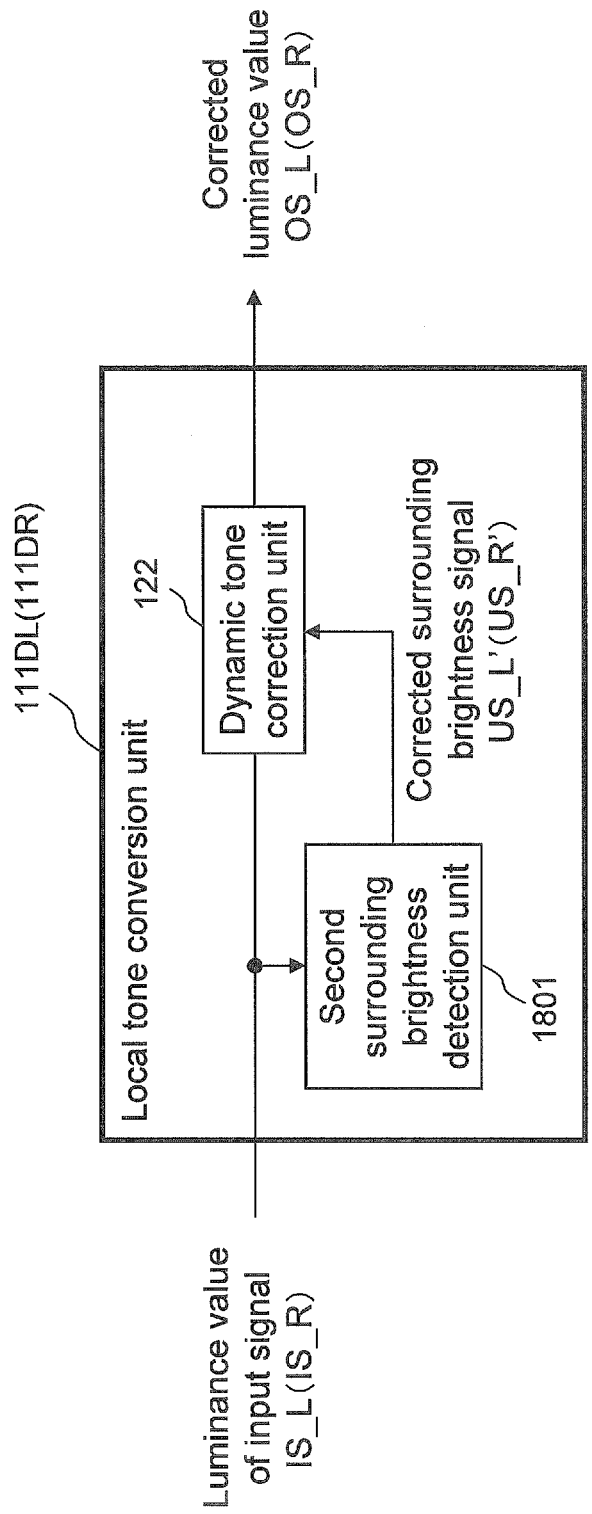
FIG. 26 is a configuration diagram of a local tone conversion unit according to a first variation of the fifth embodiment.

The three-dimensional imaging device of the present variation has a configuration in which the local tone conversion units 111CL and 111CR in the three-dimensional imaging device of the fifth embodiment have been replaced with local tone conversion units 111DL and 111DR shown in FIG. 26.

As shown in FIG. 26, the local tone conversion units 111DL and 111DR include the second surrounding brightness detection unit 1801 and the dynamic tone correction unit 122.

The second surrounding brightness detection unit 1801 is the same as that described in the previous embodiments (that shown in FIG. 20).

The dynamic tone correction unit 122 is the same as that described in the previous embodiments, and executes tone conversion according to the tone conversion characteristics shown in FIG. 4.

In the three-dimensional imaging device of the present variation, the dynamic tone correction unit 122 executes tone conversion processing using the corrected surrounding brightness signal US_L' output from the second surrounding brightness detection unit 1801. This enables performing tone conversion for darkening shade or shadow.

Specifically, the signal value of the corrected surrounding brightness signal US_L' increases in a portion in which the amount of variation in the luminance value IS_L of the L image signal is high. Accordingly, due to the dynamic tone correction unit 122 of the three-dimensional imaging device of the present variation executing tone conversion processing using the corrected surrounding brightness signal US_L', tone conversion processing for darkening shade or shadow can be executed more favorably than in the case of executing tone conversion processing using the surrounding brightness signal US_L.

The following describes an example of this with reference to FIG. 4.

For example, in the case where the luminance value IS_L of the L image signal is "4/8", the value of the surrounding brightness signal US_L is "5/8", and the value of the corrected surrounding brightness signal US_L' is "7/8" (which corresponds to a portion in which the amount of variation in the luminance value IS_L of the L image signal is high), in the three-dimensional imaging device of the present variation, the pixel value (luminance value) of the processing target pixel for which the luminance value IS_L of the L image signal is "4/8" is subjected to tone conversion so as to obtain the output value OS_L determined according to point B in FIG. 4. On the other hand, in the three-dimensional imaging device of the first embodiment, the pixel value (luminance value) of the processing target pixel for which the luminance value IS_L of the L image signal is "4/8" is subjected to tone conversion so as to obtain the output value OS_L determined according to point A in FIG. 4.

In other words, in the above case, with the tone conversion processing performed by the three-dimensional imaging device of the present variation, tone conversion is performed such that the output value is lower (darker) than in the case of the tone conversion processing performed by the three-dimensional imaging device of the first embodiment. Accordingly, the tone conversion processing performed by the three-dimensional imaging device of the present variation enables enhancing shade or shadow (darkening shade or shadow) to a greater extent than the tone conversion processing performed by the three-dimensional imaging device of the first embodiment.

As described above, with the three-dimensional imaging device of the present variation, the dynamic tone correction unit 122 executes tone conversion processing using the corrected surrounding brightness signal US_L', and therefore processing for darkening (processing for lowering the tone value) is executed in a portion in which the amount of variation in the luminance value IS_L of the L image signal is high. Accordingly, with the three-dimensional image processing device of the present variation, it is possible to, for example, effectively enhance a shade or shadow portion in a detailed portion of an object (it is possible to effectively darken shade or shadow of the detailed portion).

Accordingly, three-dimensional images acquired by the three-dimensional imaging device (three-dimensional image processing device) of the present variation are three-dimensional images in which the shade or shadow portion is selectively enhanced. As a result, the three-dimensional images acquired by the three-dimensional imaging device (three-dimensional image processing device) of the present variation are three-dimensional images that reproduce more natural three-dimensional appearance and sense of perspective.

Also, similarly to the three-dimensional image processing device of the first embodiment, with the three-dimensional image processing device of the present variation, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

Note that the present variation may be combined with the above-described embodiments. This enables realizing three-dimensional image processing that achieves the effects of the present variation in the three-dimensional image processing techniques of the above-described embodiments.

Also, in the three-dimensional image processing device of the present variation, the corrected surrounding brightness signal US_L' may be generated using the third surrounding brightness detection unit 2101 shown in FIG. 21 instead of the second surrounding brightness detection unit 1801.

Sixth Embodiment

The following describes a sixth embodiment.

Normally, it is often the case that the light source in many scenes is not an infinite light source. For example, in the case of a point light source, a shadow diffuses and becomes blurred as the distance to the shadow increases. Shadows also become blurred in scenes having multiple light sources. In this way, it is thought that shade or shadow normally becomes blurred according to the shape of recessions and projections on an actual object, and those light-dark changes are sensed as shade or shadow in human vision.

In view of this, blurring the shade or shadow component is thought to be effective in enhancing shade or shadow in a more natural manner. The inventors of the present invention actually confirmed this effect through an evaluation experiment.

The sixth embodiment describes three-dimensional image processing technology in which more visually natural shade or shadow enhancement is performed by reducing the high frequency component of the shade or shadow component that is added, thus enabling acquiring three-dimensional images that realize more natural three-dimensional appearance and sense of perspective.

Note that similarly to the above-described embodiments, the sixth embodiment is also described taking the example of a dual-lens three-dimensional imaging device (digital camera, video camera, or the like) as a three-dimensional image processing device. Note that the three-dimensional image processing device is not limited to being a dual-lens three-dimensional imaging device, and the three-dimensional image processing device may be a multi-view three-dimensional imaging device, for example.

The configuration of the three-dimensional imaging device of the sixth embodiment is similar to the configuration of the three-dimensional imaging device of the fourth embodiment.

Figure 27:
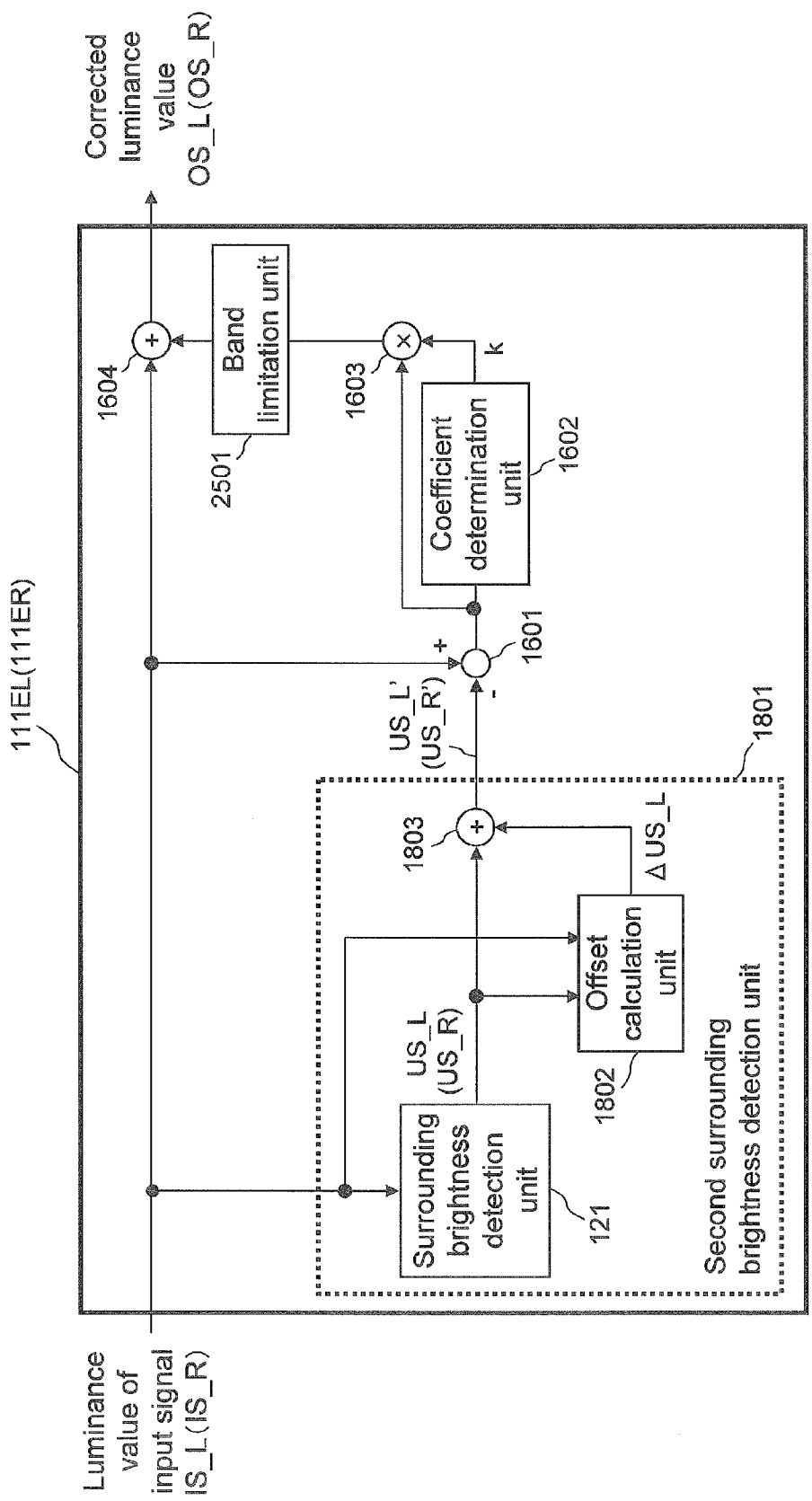
FIG. 27 is a configuration diagram of a local tone conversion unit according to a sixth embodiment.

The three-dimensional imaging device of the sixth embodiment has a configuration in which the local tone conversion units 111AL and 111AR in the three-dimensional imaging device of the fourth embodiment have been replaced with local tone conversion units 111EL and 111ER shown in FIG. 27. The three-dimensional imaging device of the sixth embodiment is different from the three-dimensional imaging device of the fourth embodiment in this aspect. Other aspects of the three-dimensional imaging device of the sixth embodiment are similar to those of the three-dimensional imaging device of the fourth embodiment.

Accordingly, the following describes the configuration and processing content of the local tone conversion units 111FL and 111ER in the three-dimensional imaging device of the present embodiment.

Note that similarly to the above embodiments, processing with respect to an R image is similar to processing with respect to an L image, and therefore the following describes mainly L-image processing.

<6.1: Local Tone Conversion Unit 111EL>

As shown in FIG. 27, the local tone conversion unit 111EL has a configuration in which a band limitation unit 2501 has been added between the multiplier 1603 and the adder 1604 in the local tone conversion unit 111BL shown in FIG. 20. Other aspects of the local tone conversion unit 111EL are similar to those of the local tone conversion unit 111BL shown in FIG. 20.

The band limitation unit 2501 receives output from the multiplier 1603, performs band limitation processing on the input signal (multiplication signal($k \times ((IS\_L)-(US\_L'))$)), and outputs the signal resulting from the band limitation processing ($LPF(k \times ((IS\_L)-(US\_L')))$) to the adder 1604.

Note that LPF( ) is a function indicating the band limitation processing, and is a function for outputting a signal value acquired through lowpass filter processing or the like.

The band limitation processing performed by the band limitation unit 2501 needs only be processing for reducing the high frequency component of the multiplication signal ($k \times ((IS\_L)-(US\_L'))$) that is the signal input to the band limitation unit 2501. For example, LPF processing may be used as the band limitation processing performed by the band limitation unit 2501.

Note that it is preferable that in the band limitation processing performed by the band limitation unit 2501, the cutoff frequency for band limiting is set to a frequency that is one digit or more higher than the signal band of the surrounding brightness signal US_L. For example, if the target image is 1024 pixels vertically and 768 pixels horizontally, it is preferable to generate a surrounding brightness signal US_L from an area that is 80 pixels vertically and horizontally or more, and in this case, it is preferable that the cutoff frequency for the band limiting in the band limitation processing performed by the band limitation unit 2501 is set to a frequency that is one digit higher or more than the cutoff frequency for the band limiting in the processing for acquiring the surrounding brightness signal US_L (e.g., LPF processing).

The adder 1604 adds the signal resulting from the band limitation processing ($LPF(k \times ((IS\_L)-(US\_L')))$) that was output from the band limitation unit 2501 and the luminance value IS_L of the L image signal.

Specifically, the local tone conversion unit 111EL of the present embodiment executes processing that corresponds to the following.

$$OS\_L = IS\_L + LPF(k \times ((IS\_L)-(US\_L')))$$

In the above expression, it is though that $((IS\_L)-(US\_L'))$ corresponds to the shade or shadow component, and that $(k \times ((IS\_L)-(US\_L')))$ corresponds to the added shade or shadow component, and therefore $LPF(k \times ((IS\_L)-(US\_L')))$ corresponds to the result of blurring the added shade or shadow component (result of band limiting).

Accordingly, the corrected L image signal (corrected luminance value) OS_L that is output from the local tone conversion unit 111EL of the present embodiment is a signal in which the shade or shadow is blurred, and also the shade or shadow is enhanced.

As described above, it is possible to realize image processing for blurring shade or shadow and darkening shade or shadow (enhancing shade or shadow) with the three-dimensional image processing device of the present embodiment. Accordingly, three-dimensional images acquired by the three-dimensional image processing device of the present embodiment are three-dimensional images in which the shade or shadow portion is blurred and the shade or shadow portion is selectively enhanced. As a result, the three-dimensional images acquired by the three-dimensional image processing device of the present embodiment are three-dimensional images that reproduce more natural three-dimensional appearance and sense of perspective.

Also, similarly to the three-dimensional image processing device of the first embodiment, with the three-dimensional image processing device of the present embodiment, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

Note that the present embodiment may be combined with other embodiments described above. This enables realizing three-dimensional image processing for blurring shade or shadow and darkening shade or shadow (enhancing shading) with the three-dimensional image processing technology of the other embodiments described above as well.

Also, in the local tone conversion unit 111EL of the present embodiment, the second surrounding brightness detection unit 1801 may be replaced with the third surrounding brightness detection unit 2101 shown in FIG. 23. Effects similar to those of the three-dimensional image processing device of the present embodiment can be achieved in this case as well.

<<First Variation (Sixth Embodiment)>>

The following describes a first variation of the present embodiment.

Figure 28:
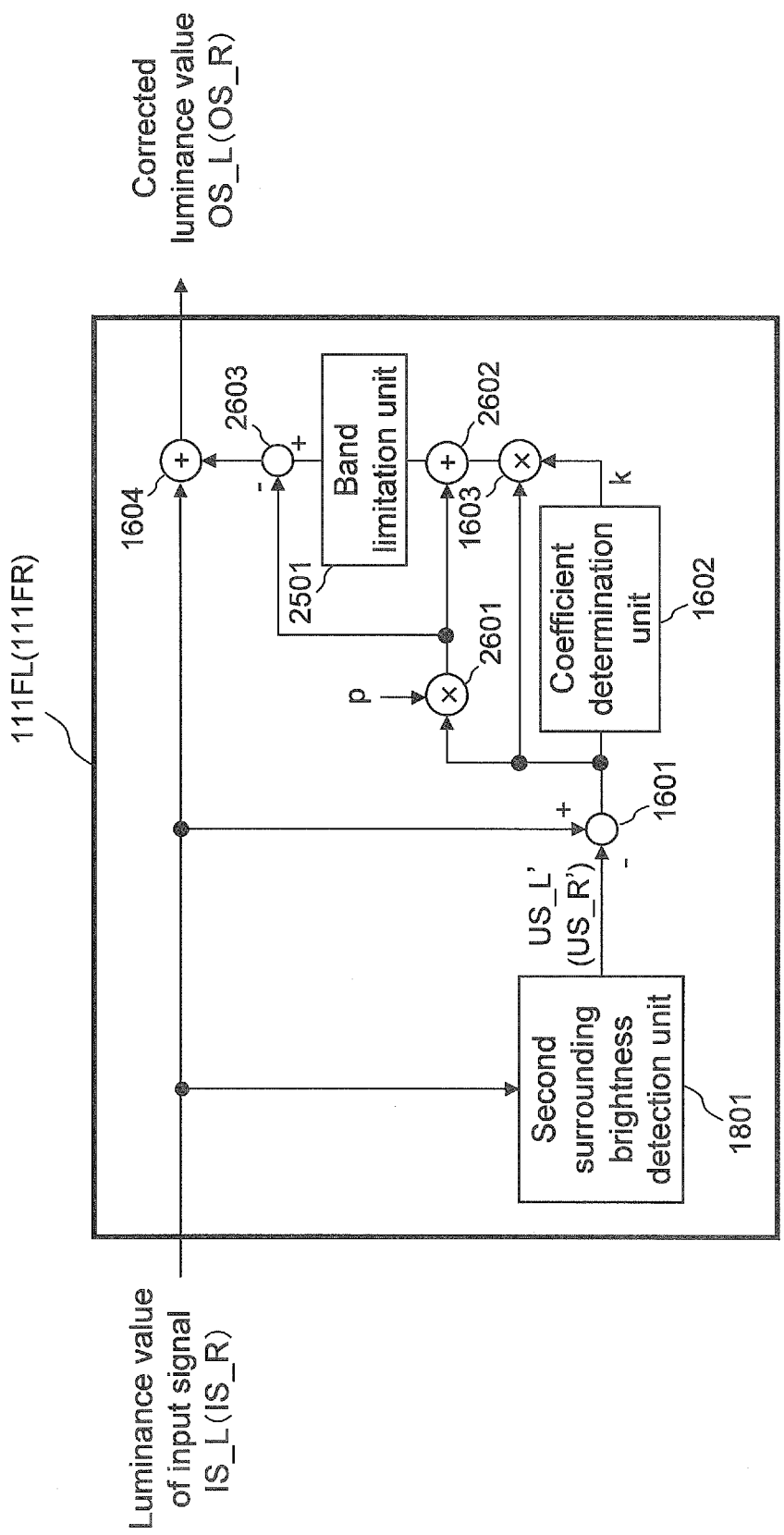
FIG. 28 is a configuration diagram of a local tone conversion unit according to a first variation of the sixth embodiment.

The three-dimensional imaging device of the present variation has a configuration in which the local tone conversion units 111EL and 111ER in the three-dimensional imaging device of the sixth embodiment have been replaced with local tone conversion units 111FL and 111FR shown in FIG. 28.

Other aspects of the three-dimensional imaging device of the present variation are similar to those of the three-dimensional imaging device of the sixth embodiment.

Accordingly, the following describes the configuration and processing content of the local tone conversion units 111FL and 111FR in the three-dimensional imaging device of the present variation.

Note that similarly to the first embodiment, processing with respect to an R image is similar to processing with respect to an L image, and therefore the following describes mainly L-image processing.

Also, portions that are similar to those of the above embodiments will be indicated by the same reference signs, and will not be described in detail.

As shown in FIG. 28, the local tone conversion unit 111FL includes the second surrounding brightness detection unit 1801, the subtractor 1601, the coefficient determination unit 1602, the multiplier 1603, and the adder 1604.

As shown in FIG. 28, the local tone conversion unit 111FL further includes the multiplier 2601, the adder 2602, the band limitation unit 2501, the subtractor 2603, and the adder 1604.

The local tone conversion unit 111FL executes processing that corresponds to the following.

$$OS\_L = IS\_L - p \times (IS\_L - US\_L') + LPF((k+p) \times (IS\_L - US\_L')) \quad \text{(A0)}$$

(p: 0≤p≤1)

The following describes the reason for the local tone conversion unit 111FL executing processing that corresponds to the above expression.

First, consider the processing of Expression A1 below.

$$OS\_L = US\_L' + (k+1) \times (IS\_L - US\_L') \quad \text{(A1)}$$

The second right-hand member in Expression A1 is thought to represent (original shading component in original image)+(added shading component).

When band limitation processing (which corresponds to processing by the function LPF( )) is performed on the second right-hand member of the Expression A1, it is possible to blur the added shading component and the original shading component in the original image.

In other words, executing processing that corresponds to the following enables blurring the added shading component and the original shading component in the original image.

$$OS\_L = US\_L' + LPF((k+1) \times (IS\_L - US\_L')) \quad \text{(A2)}$$

On the other hand, the processing performed in the sixth embodiment (processing for blurring only the added shading component) corresponds to the following.

$$OS\_L = IS\_L + LPF(k \times ((IS\_L) - (US\_L))) \quad \text{(A3)}$$

Although the processing that corresponds to Expression A2 enables representing an intensified sense of shading, there is the side effect of blurring portions other than the actual shading.

In view of this, processing that enables setting the blurring method of Expression A2 or Expression A3 (which corresponds to the sixth embodiment) is preferable.

Processing that corresponds to Expression A0 realizes this.

When p=0 in Expression A0, Expression A0 is the same as Expression A3 (which corresponds to the sixth embodiment), and processing for blurring only the added shading component is executed.

However, when p=1, Expression A0 is the same as Expression A2, and processing for blurring the added shading component and the original shading component is executed.

In other words, due to the local tone conversion unit 111FL executing processing that corresponds to Expression A0, it is possible to realize processing that enables setting the blurring method of Expression A2 or Expression A3 (which corresponds to the sixth embodiment).

Note that p for determining the extent of the blurring method is determined by a control unit or the like that is not shown.

Also, it is preferable that p is set so as to satisfy 0≤p<0.5 since favorable shading enhancement is realized in this case.

As described above, it is possible to realize image processing for blurring shading and darkening shading (enhancing shading) with the three-dimensional image processing device of the present variation. Furthermore, the extent of shading blurring can be adjusted in the three-dimensional image processing device of the present variation. Accordingly, three-dimensional images acquired by the three-dimensional imaging device (three-dimensional image processing device) of the present variation are three-dimensional images in which the shading portion is appropriately blurred, and the shading portion is selectively enhanced. As a result, three-dimensional images acquired by the three-dimensional image processing device of the present variation are three-dimensional images that reproduce more natural three-dimensional appearance and sense of perspective.

Also, similarly to the three-dimensional image processing device of the first embodiment, with the three-dimensional image processing device of the present variation, processing is executed based on the depth value, and therefore even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high).

Note that the present embodiment may be combined with other embodiments described above. This enables realizing three-dimensional image processing for appropriately blurring shading and darkening shading (enhancing shading) with the three-dimensional image processing technology of the other embodiments described above as well.

Also, in the local tone conversion unit 111FL of the present embodiment, the second surrounding brightness detection unit 1801 may be replaced with the third surrounding brightness detection unit 2101 shown in FIG. 23. Effects similar to those of the three-dimensional image processing device of the present embodiment can be achieved in this case as well. Also, in the local tone conversion unit 111FL of the present embodiment, the second surrounding brightness detection unit 1801 may be replaced with the surrounding brightness detection unit 121.

Seventh Embodiment

The following describes a seventh embodiment.

Similarly to the fourth to sixth embodiments, the present embodiment describes technology for realizing three-dimensional image processing for darkening shading.

Note that similarly to the above-described embodiments, the seventh embodiment is also described taking the example of a dual-lens three-dimensional imaging device (digital camera, video camera, or the like) as a three-dimensional image processing device. Note that the three-dimensional image processing device is not limited to being a dual-lens three-dimensional imaging device, and the three-dimensional image processing device may be a multi-view three-dimensional imaging device, for example.

The configuration of the three-dimensional imaging device of the seventh embodiment is similar to the configuration of the three-dimensional imaging device of the second embodiment.

The three-dimensional imaging device of the seventh embodiment has a configuration in which the second local tone conversion units 511L and 511R of the image correction unit 504 in the three-dimensional imaging device of the second embodiment have been replaced with local tone conversion units 111AAL and 111AAR. The three-dimensional imaging device of the seventh embodiment is different from the three-dimensional imaging device of the second embodiment in this aspect. Other aspects of the three-dimensional imaging device of the seventh embodiment are similar to those of the three-dimensional imaging device of the second embodiment.

Accordingly, the following describes the configuration and processing content of the local tone conversion units 111AAL and 111AAR in the three-dimensional imaging device of the present embodiment.

Note that similarly to the second embodiment, processing with respect to an R image is similar to processing with respect to an L image, and therefore the following describes mainly L-image processing.

Also, portions that are similar to those of the above embodiments will be indicated by the same reference signs, and will not be described in detail.

<7.1: Local Tone Conversion Unit 111AAL>

Figure 29:
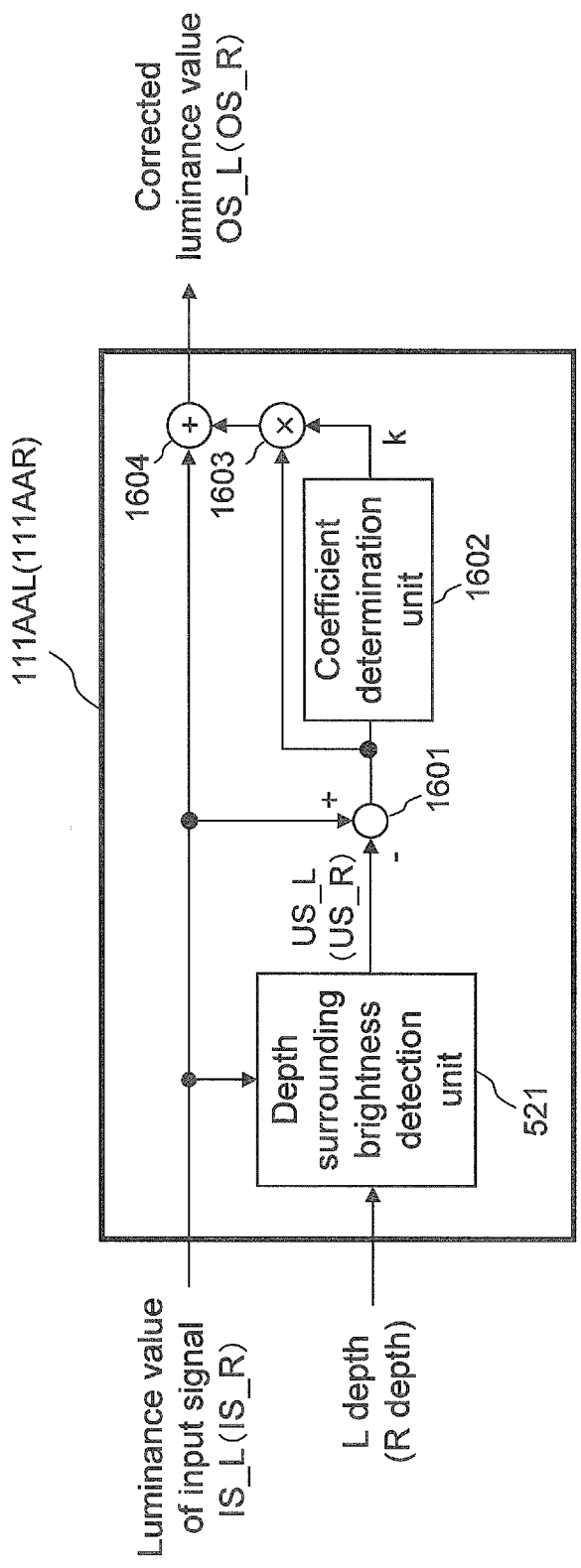
FIG. 29 is a configuration diagram of a local tone conversion unit according to a seventh embodiment.

As shown in FIG. 29, the local tone conversion unit 111AAL includes the depth surrounding brightness detection unit 521, the subtractor 1601, the coefficient determination unit 1602, the multiplier 1603, and the adder 1604. As shown in FIG. 29, the local tone conversion unit 111AAL has a configuration in which the surrounding brightness detection unit 121 in the local tone conversion unit 111AL in FIG. 18 has been replaced with the depth surrounding brightness detection unit 521.

The depth surrounding brightness detection unit 521 is similar to the depth surrounding brightness detection unit 521 of the above-described embodiments. The depth surrounding brightness detection unit 521 receives the L image signal (luminance value IS_L of the L image signal) that was output from the image input unit 102 and can form an L image as well as the L depth value that was output from the depth obtainment unit 103, and using Expression 2 similarly to the second embodiment, calculates a representative brightness value for an area surrounding the pixel of interest that corresponds to the luminance value IS_L of the L image signal (peripheral image area of the pixel of interest in the L image (processing target pixel in the L image)). For example, the depth surrounding brightness detection unit 521 calculates the average luminance value of all of the pixels included in the surrounding area. The depth surrounding brightness detection unit 521 then outputs the calculated representative brightness value for the peripheral image area of the pixel of interest to the subtractor 1601 as a surrounding brightness signal US_L.

The aspects of the subsequent processing are similar to those in the fourth embodiment.

In this way, with the three-dimensional image processing device of the present embodiment, processing is executed using the surrounding brightness signal US_L in which the influence of pixels at different distances (subject distances) is suppressed. Accordingly, with the three-dimensional image processing device of the present embodiment, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high), and it is also possible to realize image processing for darkening shading. As a result, three-dimensional images acquired by the three-dimensional imaging device of the present embodiment are three-dimensional images in which natural shading enhancement is realized.

<<First Variation (Seventh Embodiment)>>

The following describes a first variation of the present embodiment.

Figure 30:
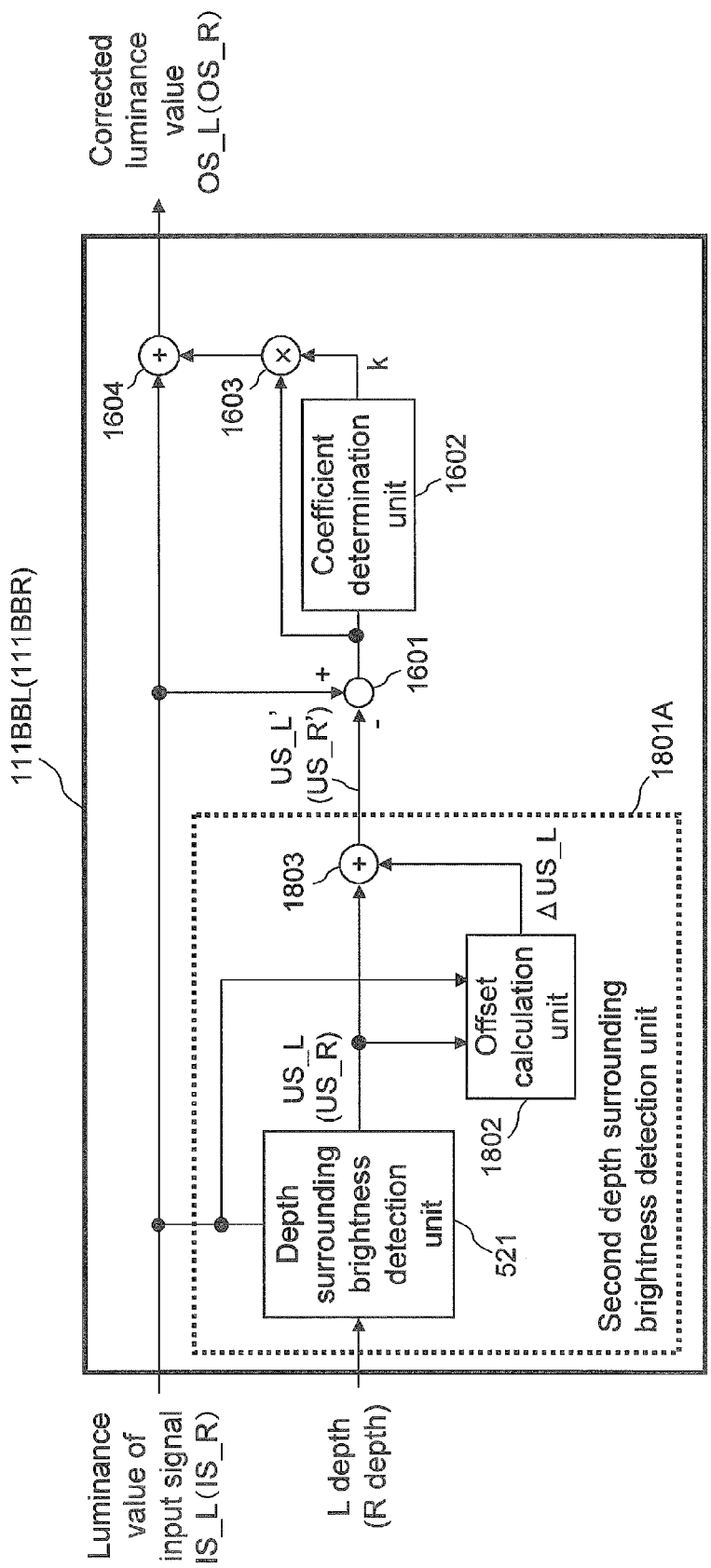
FIG. 30 is a configuration diagram of a local tone conversion unit according to a first variation of the seventh embodiment.

The three-dimensional imaging device of the present variation has a configuration in which the local tone conversion units 111AAL and 111AAR in the three-dimensional imaging device of the seventh embodiment have been replaced with local tone conversion units 111BBL and 111BBR shown in FIG. 30. More specifically, the three-dimensional imaging device of the present variation has a configuration in which the depth surrounding brightness detection unit 521 of the local tone conversion units 111AAL and 111AAR in the three-dimensional imaging device of the seventh embodiment has been replaced with a second depth surrounding brightness detection unit 1801A shown in FIG. 30.

Other aspects of the three-dimensional imaging device of the present variation are similar to those of the three-dimensional imaging device of the seventh embodiment.

Accordingly, the following describes the configuration and processing content of the local tone conversion units 111BBL and 111BBR in the three-dimensional imaging device of the present variation.

Note that similarly to the above embodiments, processing with respect to an R image is similar to processing with respect to an L image, and therefore the following describes mainly L-image processing.

Also, portions that are similar to those of the above embodiments will be indicated by the same reference signs, and will not be described in detail.

<7.2: Local Tone Conversion Unit 111BBL>

As shown in FIG. 30, the local tone conversion unit 111BBL includes the second depth surrounding brightness detection unit 1801A, the subtractor 1601, the coefficient determination unit 1602, the multiplier 1603, and the adder 1604.

The subtractor 1601, the coefficient determination unit 1602, the multiplier 1603, and the adder 1604 are similar to those of the seventh embodiment.

As shown in FIG. 30, the second depth surrounding brightness detection unit 1801A includes the depth surrounding brightness detection unit 521, the offset calculation unit 1802, and the adder 1803. In other words, the second depth surrounding brightness detection unit 1801A has a configuration in which the surrounding brightness detection unit 121 in the second surrounding brightness detection unit 1801 shown in FIG. 20 has been replaced with the depth surrounding brightness detection unit 521.

The depth surrounding brightness detection unit 521 is similar to the depth surrounding brightness detection unit 521 of the above-described embodiments. The depth surrounding brightness detection unit 521 receives the L image signal (luminance value IS_L of the L image signal) that was output from the image input unit 102 and can form an L image as well as the L depth value that was output from the depth obtainment unit 103, and using Expression 2 similarly to the second embodiment, calculates a representative brightness value for an area surrounding the pixel of interest that corresponds to the luminance value IS_L of the L image signal (peripheral image area of the pixel of interest in the L image (processing target pixel in the L image)). For example, the depth surrounding brightness detection unit 521 calculates the average luminance value of all of the pixels included in the surrounding area. The depth surrounding brightness detection unit 521 then outputs the calculated representative brightness value for the peripheral image area of the pixel of interest to the subtractor 1601 as a surrounding brightness signal US_L.

The aspects of the subsequent processing are similar to those in the first variation of the fourth embodiment.

In this way, with the three-dimensional image processing device of the present variation, processing is executed using the surrounding brightness signal US_L in which the influence of pixels at different distances (subject distances) is suppressed. Accordingly, with the three-dimensional image processing device of the present variation, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high), and it is also possible to realize image processing for darkening shading. As a result, three-dimensional images acquired by the three-dimensional imaging device of the present variation are three-dimensional images in which natural shading enhancement is realized.

Eighth Embodiment

The following describes an eighth embodiment.

The present embodiment also describes technology for realizing three-dimensional image processing for darkening shading.

Note that similarly to the above-described embodiments, the eighth embodiment is also described taking the example of a dual-lens three-dimensional imaging device (digital camera, video camera, or the like) as a three-dimensional image processing device. Note that the three-dimensional image processing device is not limited to being a dual-lens three-dimensional imaging device, and the three-dimensional image processing device may be a multi-view three-dimensional imaging device, for example.

The configuration of the three-dimensional imaging device of the eighth embodiment is similar to the configuration of the three-dimensional imaging device of the second embodiment.

Figure 31:
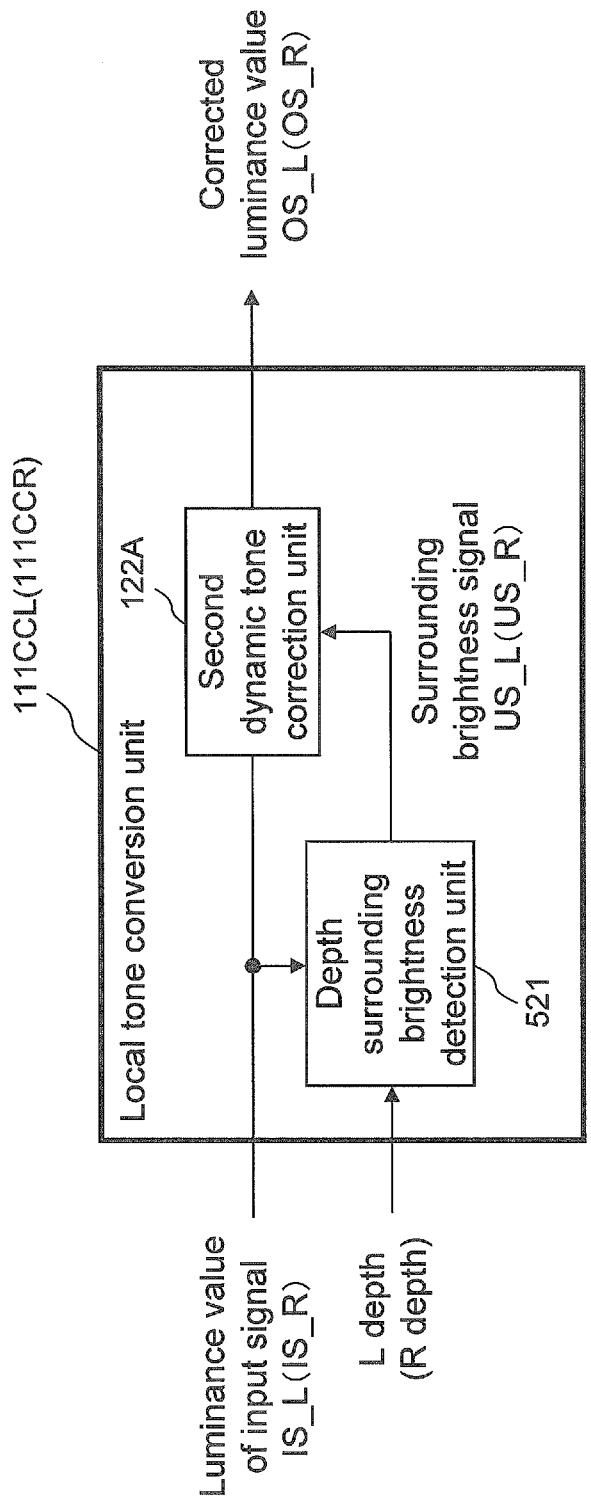
FIG. 31 is a configuration diagram of a local tone conversion unit according to an eighth embodiment.

The three-dimensional imaging device of the eighth embodiment has a configuration in which the second local tone conversion units 511L and 511R of the image correction unit 104 in the three-dimensional imaging device of the second embodiment have been replaced with local tone conversion units 111CCL and 111CCR shown in FIG. 31. The three-dimensional imaging device of the eighth embodiment is different from the three-dimensional imaging device of the second embodiment in this aspect. Other aspects of the three-dimensional imaging device of the eighth embodiment are similar to those of the three-dimensional imaging device of the second embodiment.

Accordingly, the following describes the configuration and processing content of the local tone conversion units 111CCL and 111CCR in the three-dimensional imaging device of the present embodiment.

Note that similarly to the second embodiment, processing with respect to an R image is similar to processing with respect to an L image, and therefore the following describes mainly L-image processing.

Also, portions that are similar to those of the above embodiments will be indicated by the same reference signs, and will not be described in detail.

<8.1: Local Tone Conversion Unit 111CCL>

As shown in FIG. 31, the local tone conversion unit 111CCL includes the depth surrounding brightness detection unit 521 and a second dynamic tone correction unit 122A.

The depth surrounding brightness detection unit 521 is similar to the depth surrounding brightness detection unit 521 of the above-described embodiments.

The second dynamic tone correction unit 122A is similar to the previously-described second dynamic tone correction unit 122A.

With the three-dimensional image processing device of the present embodiment, the depth surrounding brightness detection unit 521 executes processing using the surrounding brightness signal US_L in which the influence of pixels at different distances (subject distances) is suppressed. Accordingly, with the three-dimensional image processing device of the present embodiment, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high), and it is also possible to realize image processing for darkening shading. As a result, three-dimensional images acquired by the three-dimensional imaging device of the present embodiment are three-dimensional images in which natural shading enhancement is realized.

<<First Variation (Eighth Embodiment)>>

The following describes a first variation of the present embodiment.

Figure 32:
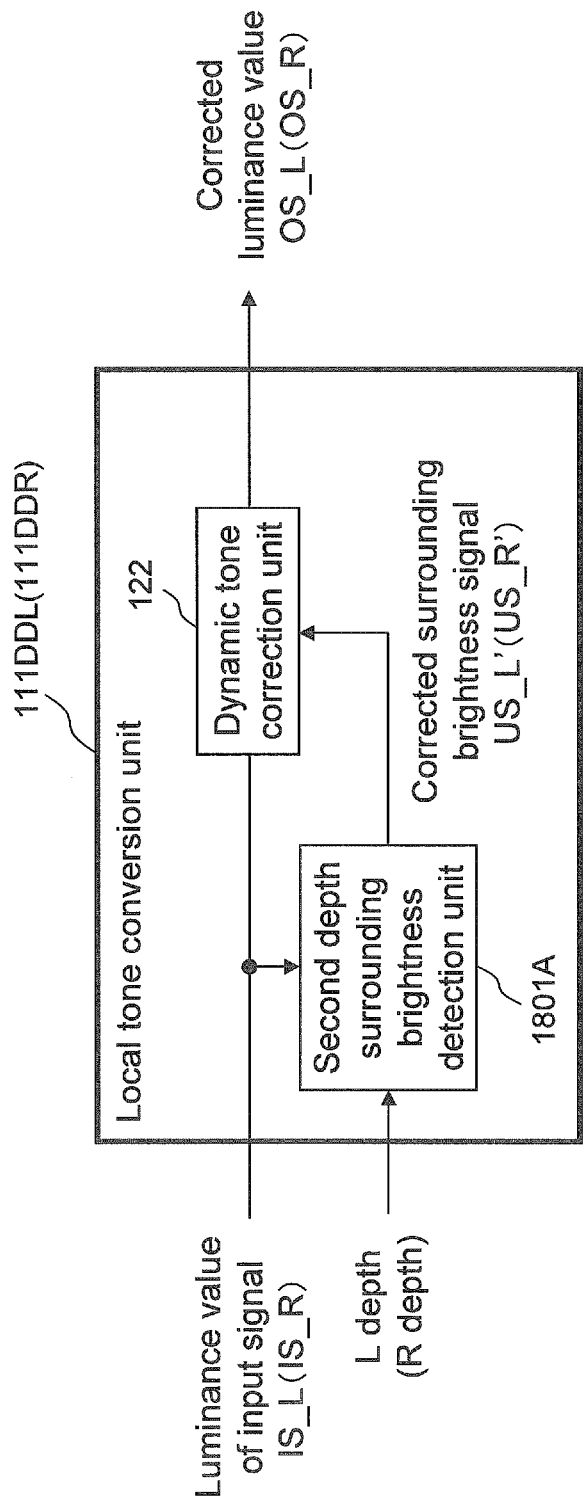
FIG. 32 is a configuration diagram of a local tone conversion unit according to a first variation of the eighth embodiment.

The three-dimensional imaging device of the present variation has a configuration in which the local tone conversion units 111CCL and 111CCR in the three-dimensional imaging device of the eighth embodiment have been replaced with local tone conversion units 111DDL and 111DDR shown in FIG. 32.

As shown in FIG. 32, the local tone conversion units 111DDL and 111DDR include the second depth surrounding brightness detection unit 1801A and the dynamic tone correction unit 122.

The second depth surrounding brightness detection unit 1801A is the same as that described in the previous embodiments (that shown in FIG. 30).

With the three-dimensional image processing device of the present variation, the second depth surrounding brightness detection unit 1801A executes processing using the corrected surrounding brightness signal US_L' in which the influence of pixels at different distances (subject distances) is suppressed. Accordingly, with the three-dimensional image processing device of the present variation, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high), and it is also possible to realizing image processing for darkening shading. As a result, three-dimensional images acquired by the three-dimensional imaging device of the present variation are three-dimensional images in which natural shading enhancement is realized.

Ninth Embodiment

The following describes a ninth embodiment.

Similarly to the sixth embodiment, the ninth embodiment describes three-dimensional image processing technology in which more visually natural shading enhancement is performed by reducing the high frequency component of the shading component that is added, thus enabling acquiring three-dimensional images that realize more natural three-dimensional appearance and sense of perspective.

Note that similarly to the above-described embodiments, the ninth embodiment is also described taking the example of a dual-lens three-dimensional imaging device (digital camera, video camera, or the like) as a three-dimensional image processing device. Note that the three-dimensional image processing device is not limited to being a dual-lens three-dimensional imaging device, and the three-dimensional image processing device may be a multi-view three-dimensional imaging device, for example.

The configuration of the three-dimensional imaging device of the ninth embodiment is similar to the configuration of the three-dimensional imaging device of the first variation of the seventh embodiment.

Figure 33:
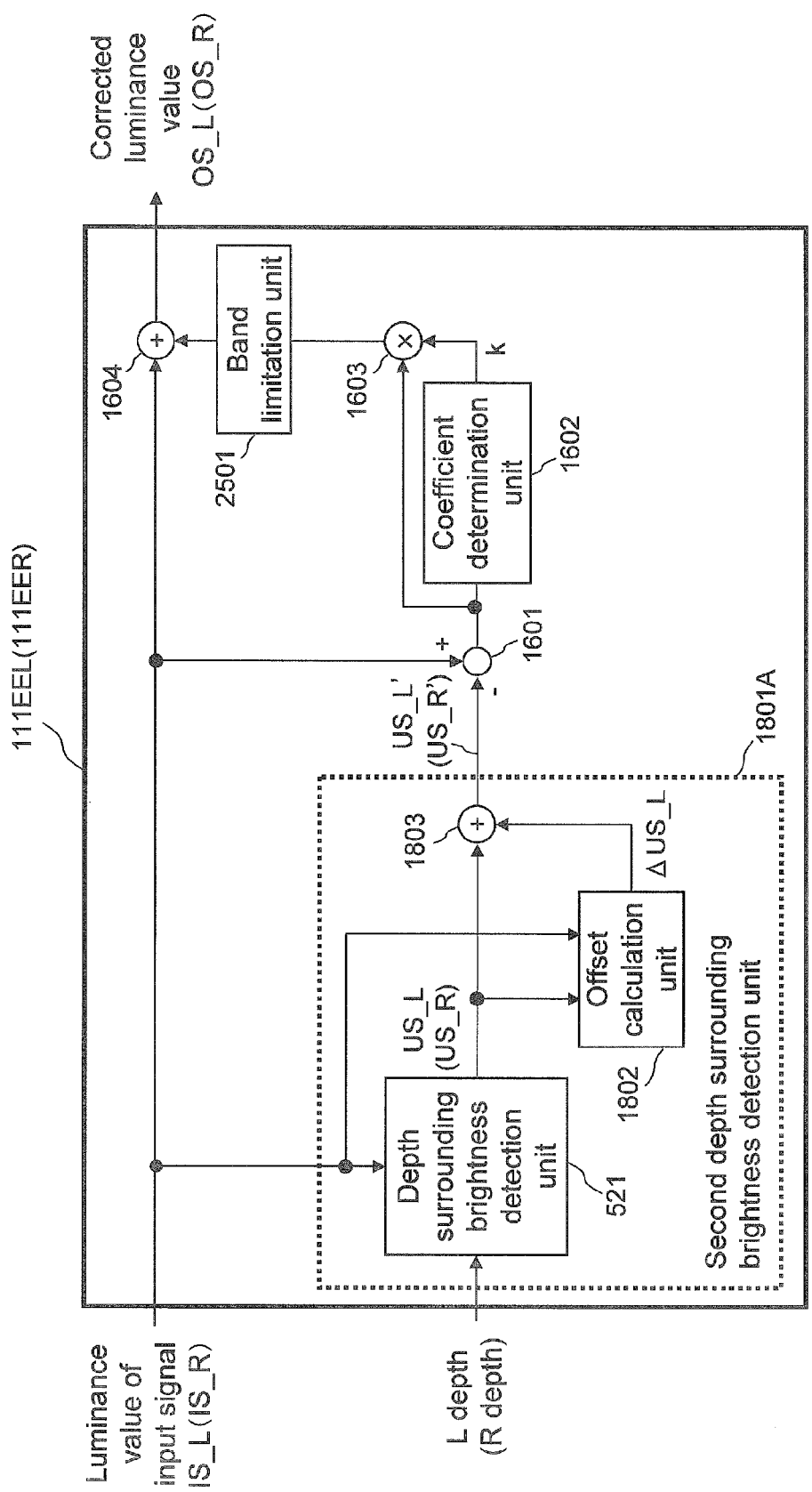
FIG. 33 is a configuration diagram of a local tone conversion unit according to a ninth embodiment.

The three-dimensional imaging device of the ninth embodiment has a configuration in which the local tone conversion units 111BBL and 111BBR in the three-dimensional imaging device of the first variation of the seventh embodiment have been replaced with local tone conversion units 111EEL and 111EER shown in FIG. 33. The three-dimensional imaging device of the ninth embodiment is different from the three-dimensional imaging device of the seventh embodiment in this aspect. Other aspects of the three-dimensional imaging device of the ninth embodiment are similar to those of the three-dimensional imaging device of the seventh embodiment.

Accordingly, the following describes the configuration and processing content of the local tone conversion units 111EEL and 111EER in the three-dimensional imaging device of the present embodiment.

Note that similarly to the above embodiments, processing with respect to an R image is similar to processing with respect to an L image, and therefore the following describes mainly L-image processing.

Also, portions that are similar to those of the above embodiments will be indicated by the same reference signs, and will not be described in detail.

<9.1: Local Tone Conversion Unit 111EEL>

As shown in FIG. 33, the local tone conversion unit 111EEL has a configuration in which a band limitation unit 2501 has been added between the multiplier 1603 and the adder 1604 in the local tone conversion unit 111BBL shown in FIG. 30. Other aspects of the local tone conversion unit 111EEL are similar to those of the local tone conversion unit 111BBL shown in FIG. 30.

Also, the band limitation unit 2501 is similar to the band limitation unit 2501 shown in FIG. 27.

With the three-dimensional image processing device of the present embodiment, the second depth surrounding brightness detection unit 1801A executes processing using the corrected surrounding brightness signal US_L' in which the influence of pixels at different distances (subject distances) is suppressed. Accordingly, with the three-dimensional image processing device of the present embodiment, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high), and it is also possible to realizing image processing for darkening shading. As a result, three-dimensional images acquired by the three-dimensional imaging device of the present embodiment are three-dimensional images in which natural shading enhancement is realized.

<<First Variation (Ninth Embodiment)>>

The following describes a first variation of the present embodiment.

Figure 34:
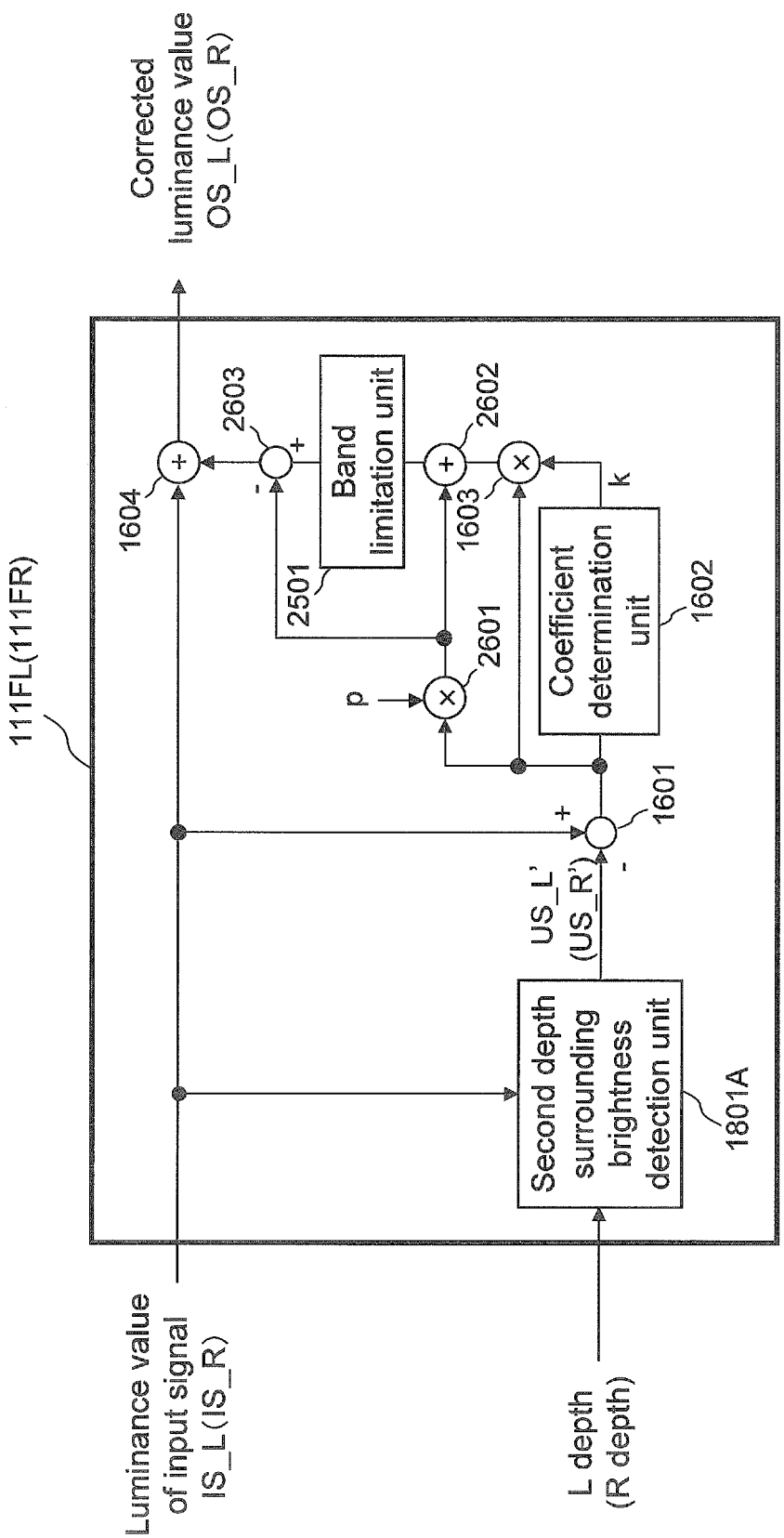
FIG. 34 is a configuration diagram of a local tone conversion unit according to a first variation of the ninth embodiment.

The three-dimensional imaging device of the present variation has a configuration in which the local tone conversion units 111EEL and 111EER in the three-dimensional imaging device of the ninth embodiment have been replaced with local tone conversion units 111FFL and 111FFR shown in FIG. 34.

Other aspects of the three-dimensional imaging device of the present variation are similar to those of the three-dimensional imaging device of the ninth embodiment.

Accordingly, the following describes the configuration and processing content of the local tone conversion units 111FFL and 111FFR in the three-dimensional imaging device of the present variation.

Note that similarly to the above embodiments, processing with respect to an R image is similar to processing with respect to an L image, and therefore the following describes mainly L-image processing.

Also, portions that are similar to those of the above embodiments will be indicated by the same reference signs, and will not be described in detail.

As shown in FIG. 34, the local tone conversion unit 111FFL includes the second depth surrounding brightness detection unit 1801A, the subtractor 1601, the coefficient determination unit 1602, the multiplier 1603, and the adder 1604.

As shown in FIG. 34, the local tone conversion unit 111FFL further includes the multiplier 2601, the adder 2602, the band limitation unit 2501, the subtractor 2603, and the adder 1604.

Note that the subtractor 1601, the coefficient determination unit 1602, the multiplier 1603, the adder 1604, the multiplier 2601, the adder 2602, the band limitation unit 2501, and the subtractor 2603 of the local tone conversion unit 111FFL are similar to those of the local tone conversion unit 111FL (111FR) of the sixth embodiment.

It is possible to realize image processing for blurring shading and darkening shading (enhancing shading) with the three-dimensional image processing device of the present variation. Furthermore, the extent of shading blurring can be adjusted in the three-dimensional image processing device of the present variation. Accordingly, three-dimensional images acquired by the three-dimensional imaging device (three-dimensional image processing device) of the present variation are three-dimensional images in which the shading portion is appropriately blurred, and the shading portion is selectively enhanced. As a result, three-dimensional images acquired by the three-dimensional image processing device of the present variation are three-dimensional images that reproduce more natural three-dimensional appearance and sense of perspective.

Also, with the three-dimensional image processing device of the present variation, the second depth surrounding brightness detection unit 1801A executes processing using the corrected surrounding brightness signal US_L' in which the influence of pixels at different distances (subject distances) is suppressed. Accordingly, with the three-dimensional image processing device of the present variation, even in the case where objects (subjects) that are at different subject distances and have a high contrast are near each other in three-dimensional images, it is possible to appropriately avoid inappropriate contrast enhancement due to the influence of the image area in which the objects are near each other (the image area in which the contrast is high), and it is also possible to realizing image processing for darkening shading. As a result, three-dimensional images acquired by the three-dimensional imaging device of the present variation are three-dimensional images in which natural shading enhancement is realized.

Note that the present embodiment may be combined with other embodiments described above. This enables realizing three-dimensional image processing for appropriately blurring shading and darkening shading (enhancing shading) with the three-dimensional image processing technology of the other embodiments described above as well.

Also, in the local tone conversion unit 111FFL of the present embodiment, the second surrounding brightness detection unit 1801 may be replaced with the third surrounding brightness detection unit 2101 shown in FIG. 23. Effects similar to those of the three-dimensional image processing device of the present embodiment can be achieved in this case as well. Also, in the local tone conversion unit 111FFL of the present embodiment, the second surrounding brightness detection unit 1801 may be replaced with the surrounding brightness detection unit 121.

Other Embodiments

Note that a three-dimensional image processing device may be realized by a combination of the above-described embodiments.

For example, with a technique similar to the technique described in the third embodiment, a three-dimensional image processing device may be realized by a combination of any one of the fourth to sixth embodiments and any one of the seventh to ninth embodiments.

Also, although a configuration according to which an R image and an L image are input to the image input unit 102 is described in the above embodiments, there is no limitation to this, and for example, a configuration is possible in which an R image and an L image are selected from among N (N being a natural number greater than or equal to 2) images acquired by a multi-viewpoint system, and the selected R image (signal) and L image (signal) are input to the image input unit 102.

Also, it is not necessarily necessary for the R image and the L image to be internally acquired in the three-dimensional image processing device. For example, the R image and the L image may be input to the three-dimensional image processing device from an external device.

Furthermore, it is not necessarily necessary for R depth information and L depth information to be internally acquired in the three-dimensional image processing device. For example, the R depth information and L depth information may be input to the three-dimensional image processing device from an external device. In this case, the depth obtainment unit 103 can be omitted from the three-dimensional image processing device. In other words, the three-dimensional image processing device may include only the image correction unit 104.

Also, a configuration is possible in which in the three-dimensional image processing device, a two-dimensional video including depth information is input, and the processing described in the above embodiments is executed using the depth information. For example, a configuration is possible in which an R image and an L image are generated from the two-dimensional video including depth information, the generated R image and L image are input to the image correction unit 104 of the three-dimensional image processing device along with the depth information included in the two-dimensional image, and the processing described in any of the above embodiments is executed in the three-dimensional image processing device using the depth information.

Furthermore, a configuration is possible in which in the three-dimensional image processing device, if a two-dimensional video including depth information is input, a two-dimensional video having darkened shading is acquired by performing the shading enhancement processing described in any of the above embodiments on the two-dimensional video. In this case, processing may be performed by one system in the three-dimensional image processing device (processing corresponding to the L-image processing or the R-image processing may be performed), for example. In this case, the three-dimensional image processing device may be configured by only the processing system that corresponds to either the L-image processing or the R-image processing.

Also, a configuration is possible in which in the three-dimensional image processing device, a video obtained by converting a two-dimensional video into a three-dimensional video (a 2D-3D converted video) is received, and the processing of any of the above-described embodiments is executed using estimated depth information in the 2D-3D conversion processing. For example, a configuration is possible in which an R image and an L image acquired through the 2D-3D conversion processing is input to the image correction unit 104 of the three-dimensional image processing device along with depth information acquired by estimation processing, and the processing described in any of the above embodiments is executed in the three-dimensional image processing device.

Also that the various blocks of the three-dimensional imaging device described in the aforementioned embodiments may be implemented as single individual chips by employing semiconductor devices such as LSIs, or some or all of the blocks may be implemented as a single chip.

Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, reconfigurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

Also, the various processing in the above embodiments may be realized by hardware, or may be realized by software (including the case of being realized together with an OS (operating system), middleware, or a predetermined library). Furthermore, such processing may be realized by a combination of software and hardware. It goes without saying that it is necessary to adjust the timing at which to execute each process in the case where the three-dimensional imaging device according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiments is not necessarily limited to the descriptions in the aforementioned embodiments, and the order of execution can be interchanged without departing from the spirit of the invention.

Also, the case of acquiring (capturing) stereo images (left eye images and right eye images) using two imaging units is described in the above embodiments. However, there is no limitation to this, and for example, left eye images and right eye images may be acquired alternately by time division by one imaging element, or left eye images and right eye images may be obtained by bisecting the imaging element plane of one imaging element.

A computer program for causing a computer to execute the above-described method and a computer-readable recording medium recording the program are encompassed in the present invention. Here, examples of the computer-readable recording medium include a flexible disk, a hard disk, a CD-ROM, an MO, a DVD, a DVD-ROM, a DVD-RAM, a BD (Blue-ray Disc), and a semiconductor memory.

The computer program is not limited to being recorded on the recording medium, and may be transmitted via, for example, an electrical communication line, a wireless or wired communication line, or a network typified by the Internet.

Also, it is possible to realize a three-dimensional display device, a television, a portable information terminal, a personal computer, a digital still camera, a video camera, an information recording/playback device, a video recording/playback device, or the like that is equipped with the depth obtainment unit 103 and the image correction unit 104 described in any of the above embodiments. Note that in this case, the R image and the L image may be input to the device from an external device.

It should also be noted that specific configurations of the present invention are not intended to be limited to the above embodiments, and various modifications and variations can be made without deviating from the spirit of the invention.

According to a three-dimensional image processing device, a three-dimensional image processing method, and a program of the present invention, it is possible to acquire high-quality three-dimensional images by giving a natural three-dimensional appearance to an image that was captured with little disparity and is poor in terms of three-dimensional appearance. The present invention is therefore useful in the video-related industries, and can be carried out in such fields.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the three-dimensional image processing apparatus, three-dimensional image processing method, and program. Accordingly, these terms, as utilized to describe the technology disclosed herein should be interpreted relative to the three-dimensional image processing apparatus, three-dimensional image processing method, and program.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified teen such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A three-dimensional image processing device for performing image correction processing on a three-dimensionally-viewed image, comprising:
   a first pixel value being a pixel value of a pixel of interest, the pixel of interest being a processing target;
   a second pixel value being a pixel value of a peripheral pixel of the pixel of interest;
   an n-th pixel in a first viewpoint image included in the three-dimensionally-viewed image;
   a corresponding pixel in a second viewpoint image included in the three-dimensionally-viewed image, the corresponding pixel located in the same spatial location as the n-th pixel;
   a conversion unit that generates a converted image by performing tone conversion on a third pixel value in an object included in the three-dimensionally-viewed image based on a relationship between the first pixel value and the second pixel value; and
   a composition unit that synthesizes the n-th pixel and the corresponding pixel using a distribution ratio based on a subject distance of the n-th pixel.

2. The three-dimensional image processing device according to claim 1, wherein:
   the composition unit synthesizes an n-th pixel value and a corresponding pixel value such that the distribution ratio for the corresponding pixel value becomes greater as the subject distance of the n-th pixel value becomes smaller.

3. The three-dimensional image processing device according to claim 2, wherein:
   the composition unit synthesizes the n-th pixel value and the corresponding pixel value such that the distribution ratio for the corresponding pixel value becomes smaller as the subject distance of the n-th pixel value becomes greater.

4. The three-dimensional image processing device according to claim 3, wherein:
   the conversion unit performs shade or shadow emphasis processing on the pixel of interest by contrast emphasis processing.

5. The three-dimensional image processing device according to claim 3, wherein:
   the conversion unit performs shade or shadow emphasis processing on the pixel of interest by local contrast emphasis processing through visual processing.

6. The three-dimensional image processing device according to claim 3, wherein:
   the conversion unit performs shade or shadow emphasis processing on the pixel of interest by darkening a shade or a shadow.

7. The three-dimensional image processing device according to claim 2, wherein:
the conversion unit performs shade or shadow emphasis processing on the pixel of interest by contrast emphasis processing.

8. The three-dimensional image processing device according to claim 2, wherein:
the conversion unit performs shade or shadow emphasis processing on the pixel of interest by local contrast emphasis processing through visual processing.

9. The three-dimensional image processing device according to claim 2, wherein:
the conversion unit performs shade or shadow emphasis processing on the pixel of interest by darkening shade or shadow.

10. The three-dimensional image processing device according to claim 1, wherein:
the conversion unit further performs shade or shadow emphasis processing on the pixel of interest by contrast emphasis processing.

11. The three-dimensional image processing device according to claim 1, wherein:
the conversion unit further performs shade or shadow emphasis processing on the pixel of interest by local contrast emphasis processing through visual processing.

12. The three-dimensional image processing device according to claim 1, wherein:
the conversion unit further performs shade or shadow emphasis processing on the pixel of interest by darkening a shade or a shadow.

13. The three-dimensional image processing device according to claim 1, wherein:
when a brightness value of the pixel of interest is lower than a brightness value of the peripheral pixel and the first value is fixed to a predetermined value, the conversion unit performs the tone conversion using a tone conversion characteristic in which the value of the tone-converted pixel of interest decreases as the value of the peripheral pixel increases.

14. The three-dimensional image processing device according to claim 13, wherein:
when the brightness value of the pixel of interest is higher than the brightness value of the peripheral pixel, the conversion unit outputs the value of the pixel of interest as a pixel value for the converted image without performing the tone conversion.

15. The three-dimensional image processing device according to claim 13, further including:
an offset value based on a variation in pixel values located in a predetermined area including the pixel of interest; and
wherein the conversion unit adds the offset value to the brightness value of the peripheral pixel, and performs the tone conversion on the pixel of interest based on a result of the addition.

* * * * *